US010113332B2

(12) United States Patent
Morales, Jr.

(10) Patent No.: US 10,113,332 B2
(45) Date of Patent: Oct. 30, 2018

(54) METHOD FOR INSTALLING DOOR LOCKS

(71) Applicant: PUNCH POINT TOOLS, L.L.C., Houma, LA (US)

(72) Inventor: Richard J. Morales, Jr., Houma, LA (US)

(73) Assignee: PUNCH POINT TOOLS, L.L.C., Houma, LA (US)

( * ) Notice: Subject to any disclaimer, the term of this patent is extended or adjusted under 35 U.S.C. 154(b) by 274 days.

(21) Appl. No.: 15/147,594

(22) Filed: May 5, 2016

(65) Prior Publication Data

US 2016/0333605 A1 Nov. 17, 2016

Related U.S. Application Data

(60) Provisional application No. 62/162,699, filed on May 16, 2015, provisional application No. 62/194,501, filed on Jul. 20, 2015, provisional application No. 62/253,764, filed on Nov. 11, 2015, provisional application No. 62/280,396, filed on Jan. 19, 2016, provisional application No. 62/308,991, filed on Mar. 16, 2016.

(51) Int. Cl.
*E05B 17/06* (2006.01)
*B23P 19/10* (2006.01)
*B23P 19/12* (2006.01)

(52) U.S. Cl.
CPC ............ *E05B 17/06* (2013.01); *B23P 19/10* (2013.01); *B23P 19/12* (2013.01); *Y10T 29/4978* (2015.01); *Y10T 29/49778* (2015.01)

(58) Field of Classification Search
CPC .......... E05B 17/06; B23P 19/10; B23P 19/12; Y10T 29/4978; Y10T 29/49778; Y10T 29/49867; Y10T 29/4981; Y10T 29/49895
See application file for complete search history.

(56) References Cited

U.S. PATENT DOCUMENTS

| | | | |
|---|---|---|---|
| 877,879 | A | 1/1908 | Ash |
| 912,052 | A | 2/1909 | Albertson |
| 948,598 | A | 2/1910 | Stuart |
| 1,314,336 | A | 8/1919 | Kemp |
| 1,315,716 | A | 9/1919 | Forester |
| 1,377,458 | A | 5/1921 | Block |
| 1,599,256 | A | 9/1926 | Viehweger |
| 1,853,456 | A | 4/1932 | Ross |
| 2,041,625 | A | 5/1936 | Schmidt |
| 2,272,241 | A | 2/1942 | Fendring |
| 2,572,999 | A | 10/1951 | Elliot |
| 2,581,534 | A | 1/1952 | Hungerford |
| 2,841,879 | A | 7/1958 | Lanksi |
| 2,862,302 | A * | 12/1958 | Lucia ............. E05B 17/06 33/197 |

(Continued)

*Primary Examiner* — Jermie Cozart
(74) *Attorney, Agent, or Firm* — Brett A. North

(57) ABSTRACT

A method and apparatus for marking positions for installing door lock elements of a door, the door attached to a frame having a header including comprising the steps of providing a positioning member, at least partially opening the door; attaching the positioning member to the door, while the door is closed causing the positioning member to attach to the door frame; and opening the door and removing the positioning member from the door; and using the at least one mark to install a strike plate, deadbolt receiving plate, and/or electric strike.

27 Claims, 69 Drawing Sheets

(56) References Cited

U.S. PATENT DOCUMENTS

| | | |
|---|---|---|
| 2,964,346 A | 12/1960 | Check |
| 3,095,021 A | 6/1963 | Schlage et al. |
| 3,107,934 A | 10/1963 | Lee |
| 3,171,518 A | 3/1965 | Bergmann |
| 3,330,525 A | 7/1967 | Weinstein |
| 3,516,165 A | 6/1970 | Pfeffer |
| 3,560,690 A | 2/1971 | Luce et al. |
| 3,764,173 A | 10/1973 | Griffith |
| 3,815,945 A | 6/1974 | Lamphere |
| 4,005,890 A | 2/1977 | Murch |
| 4,033,044 A | 7/1977 | Michaels |
| 4,060,905 A | 12/1977 | Light |
| 4,065,162 A | 12/1977 | Schlage |
| 4,074,484 A | 2/1978 | Queren |
| 4,174,862 A | 11/1979 | Shane |
| 4,186,954 A | 2/1980 | Detlefs |
| 4,211,442 A | 7/1980 | Hansen |
| 4,345,381 A * | 8/1982 | Brislin ............... E05B 17/06 156/240 |
| 4,363,173 A | 12/1982 | Caldera |
| 4,369,994 A | 1/1983 | Vorves |
| 4,382,337 A | 5/1983 | Bendick |
| 4,389,790 A | 6/1983 | Dunlap |
| 4,416,087 A | 11/1983 | Ghatak |
| 4,453,751 A | 6/1984 | Hamilton |
| 4,473,957 A | 10/1984 | Faulkner |
| 4,499,666 A | 2/1985 | Smith |
| 4,520,571 A | 6/1985 | Harding |
| 4,527,337 A | 7/1985 | Dreiling |
| 4,531,633 A | 7/1985 | Evans |
| 4,547,009 A | 10/1985 | Allen |
| 4,550,939 A | 11/1985 | Babb, Jr. et al. |
| 4,640,019 A * | 2/1987 | Paley ............... E05B 17/06 33/197 |
| 4,649,652 A | 3/1987 | Dickinson et al. |
| 4,684,160 A | 8/1987 | Nelson |
| 4,687,165 A | 8/1987 | Blackburn |
| 4,690,445 A | 9/1987 | Hartley |
| 4,791,731 A | 12/1988 | Dickinson et al. |
| 4,802,701 A | 2/1989 | Mazie |
| 4,872,717 A | 10/1989 | McEvoy et al. |
| 4,890,868 A | 1/1990 | Horvath et al. |
| 4,893,776 A | 1/1990 | Floyd |
| 4,903,010 A | 2/1990 | Greene |
| 4,993,168 A | 2/1991 | Acuna |
| 5,004,879 A | 4/1991 | Bernhardt et al. |
| 5,008,648 A | 4/1991 | Conemac |
| 5,088,682 A | 2/1992 | Gibbs |
| 5,088,780 A | 2/1992 | Doherty |
| 5,109,611 A | 5/1992 | Houck |
| 5,129,154 A | 7/1992 | Aydelott |
| 5,375,339 A | 12/1994 | Noel, Jr. |
| 5,476,020 A | 12/1995 | Garvey et al. |
| 5,544,536 A | 8/1996 | Kim |
| 5,547,239 A | 8/1996 | Allenbaugh |
| 5,570,917 A | 11/1996 | Cutrer |
| D376,094 S | 12/1996 | Hubbard |
| 5,593,194 A | 1/1997 | Liau |
| 5,671,538 A | 9/1997 | Lautenschlager |
| 5,769,473 A | 6/1998 | Sovis |
| 5,772,380 A | 6/1998 | Cloud et al. |
| 5,906,404 A | 5/1999 | Mcghee |
| 5,937,613 A | 8/1999 | Vess, Sr. |
| 6,021,578 A | 2/2000 | DeVingo |
| 6,077,000 A | 6/2000 | Gibbons et al. |
| 6,185,831 B1 | 2/2001 | Pluciennik |
| 6,286,803 B1 | 9/2001 | Pellino et al. |
| 6,508,011 B1 | 1/2003 | Lee |
| 6,612,629 B2 | 9/2003 | O'Hanlon |
| 6,719,260 B1 | 4/2004 | Hart |
| 6,837,527 B1 | 1/2005 | Laurenzana |
| 6,871,566 B2 | 3/2005 | Niwayama et al. |
| 6,907,675 B1 | 6/2005 | Hutchings |
| 6,971,184 B2 | 12/2005 | Prevost |
| 7,021,597 B2 | 4/2006 | Vogt |
| 7,040,034 B2 | 5/2006 | Nielson et al. |
| 7,095,320 B2 | 8/2006 | Wang |
| 7,234,245 B2 | 6/2007 | Tatum |
| 7,293,925 B1 | 11/2007 | Sanseviero |
| 7,316,078 B2 | 1/2008 | Hagman |
| D571,171 S | 6/2008 | Albritton et al. |
| 7,396,055 B2 | 7/2008 | Arneson et al. |
| 8,684,426 B2 | 4/2014 | Morales, Jr. |
| 2004/0177527 A1 | 9/2004 | Prevost |
| 2006/0096111 A1 | 5/2006 | Dolenz et al. |
| 2007/0126576 A1 | 6/2007 | Script et al. |

* cited by examiner

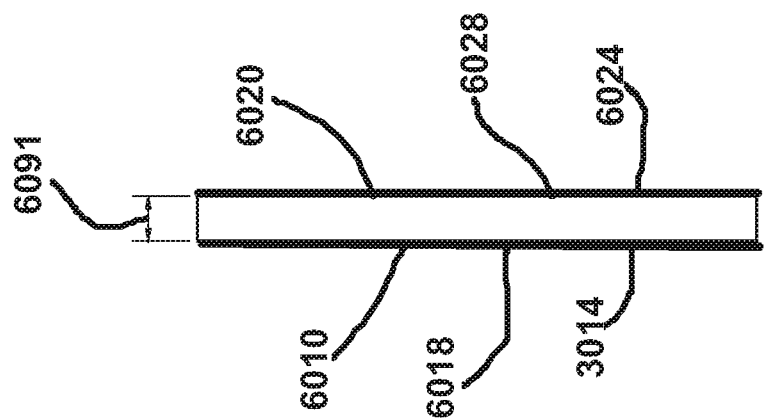
FIG. 3
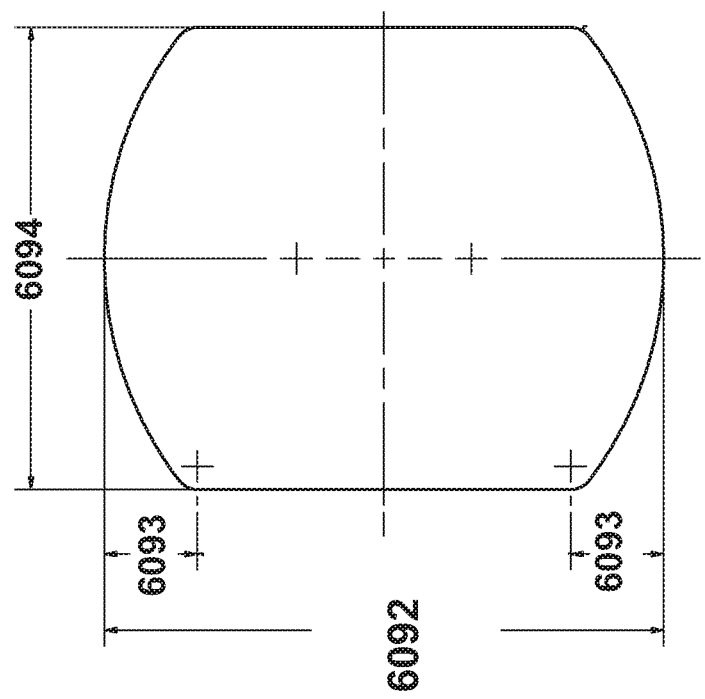
FIG. 2
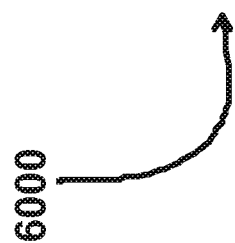

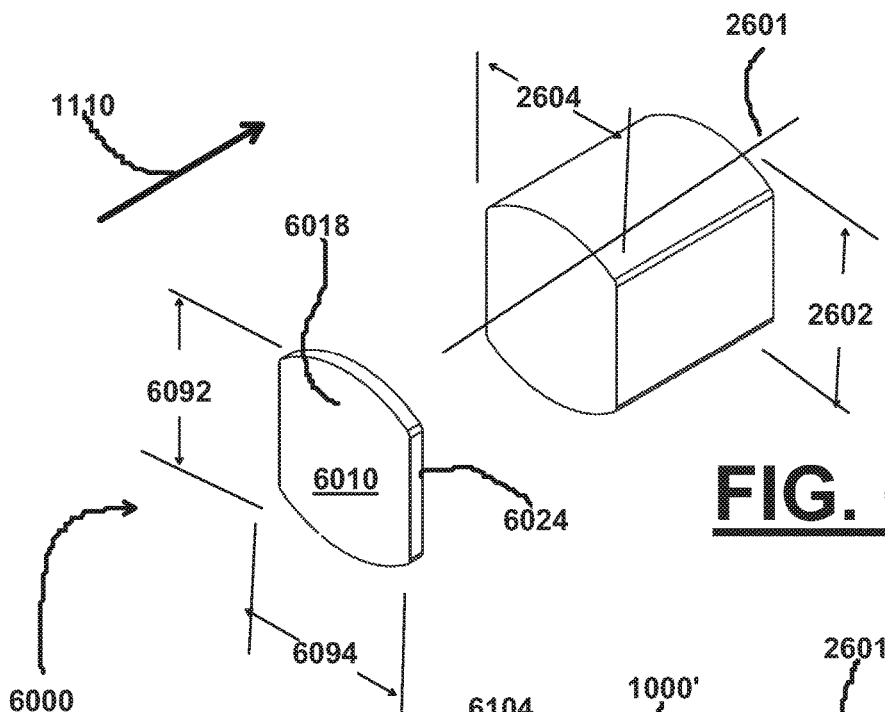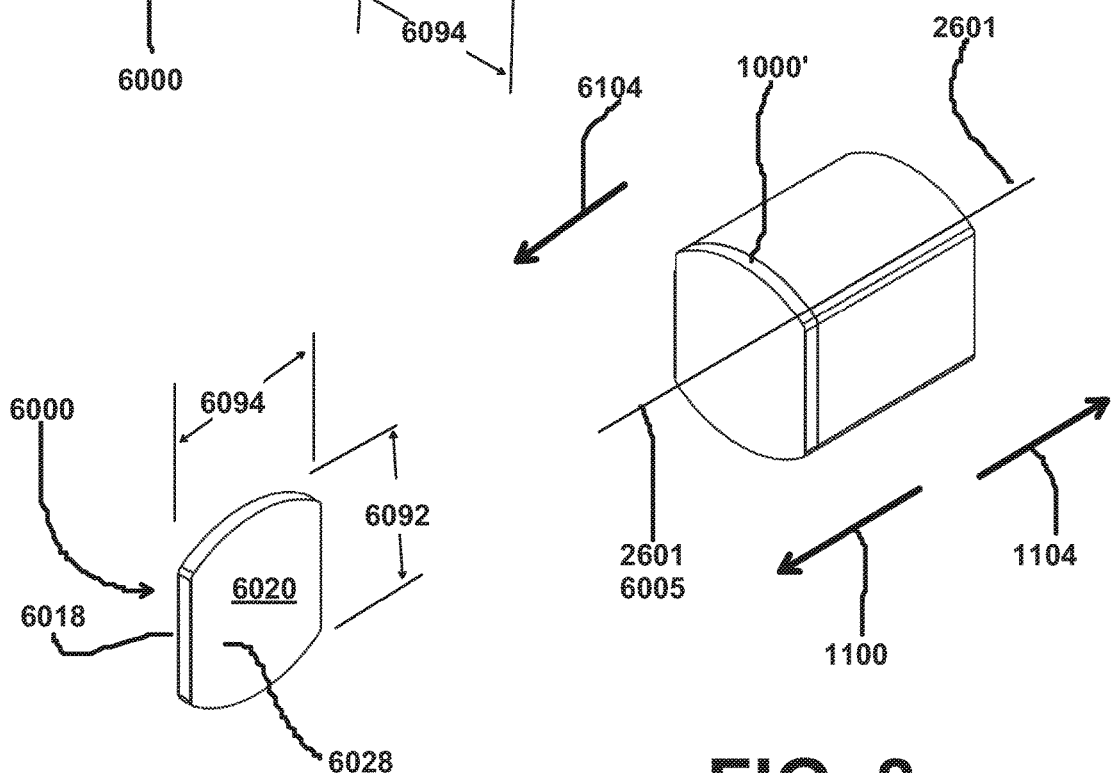

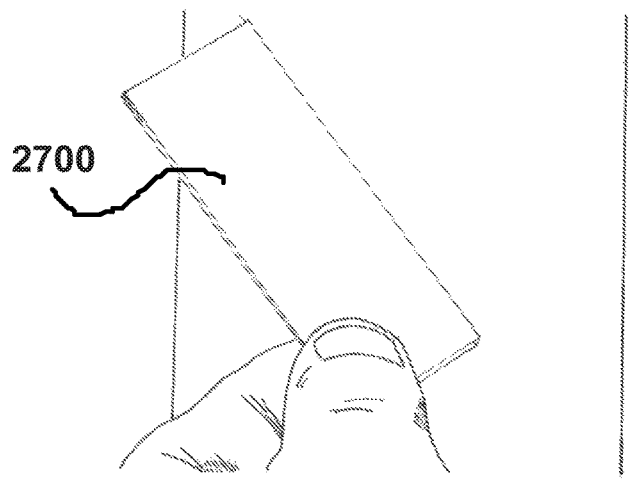
FIG. 24
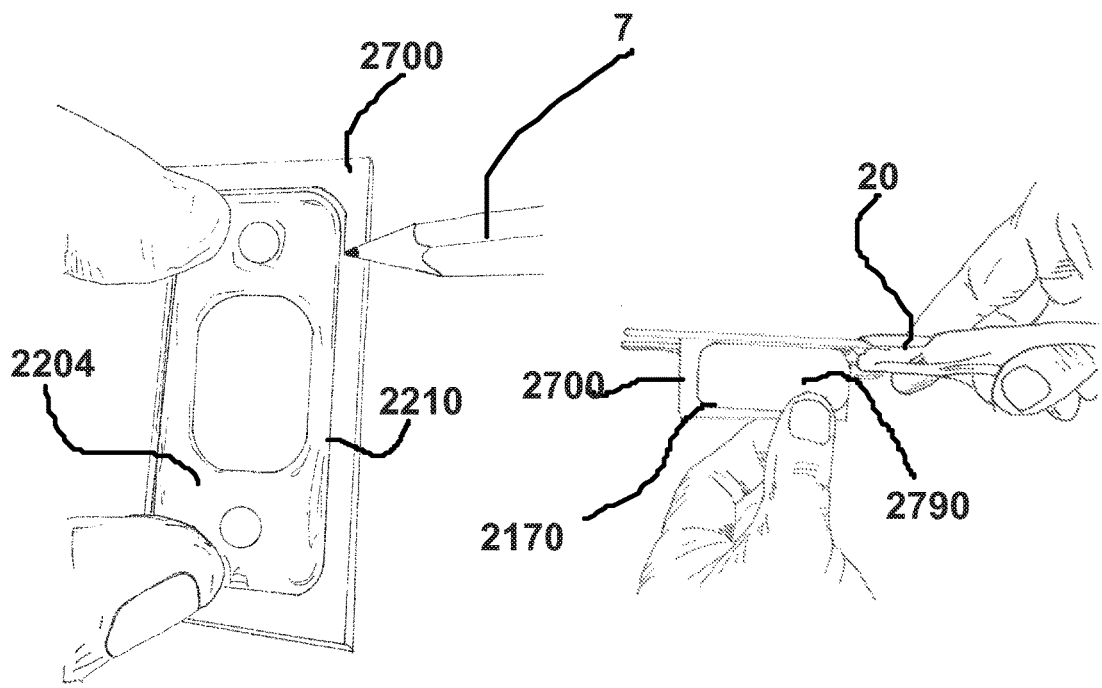
FIG. 25
FIG. 26

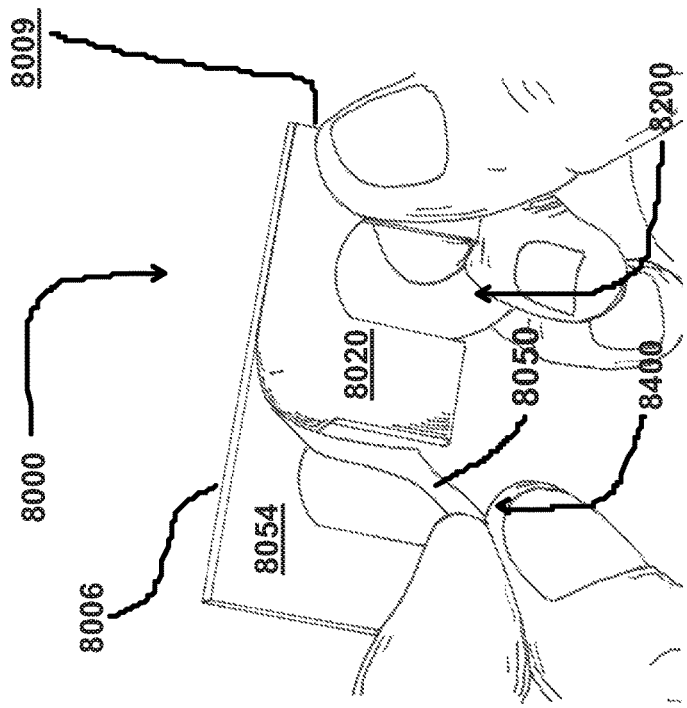
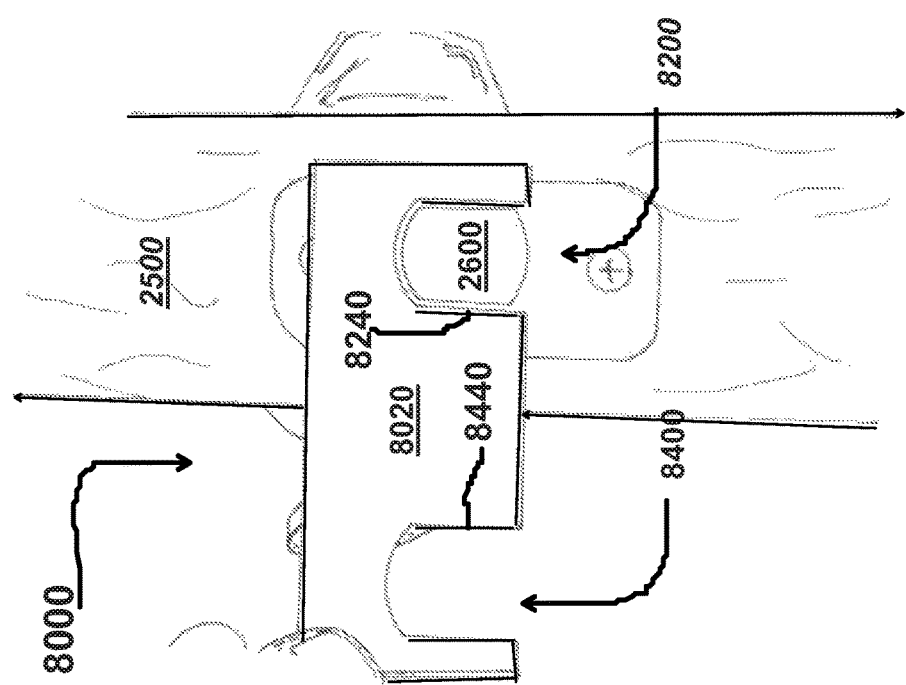
FIG. 72
FIG. 71

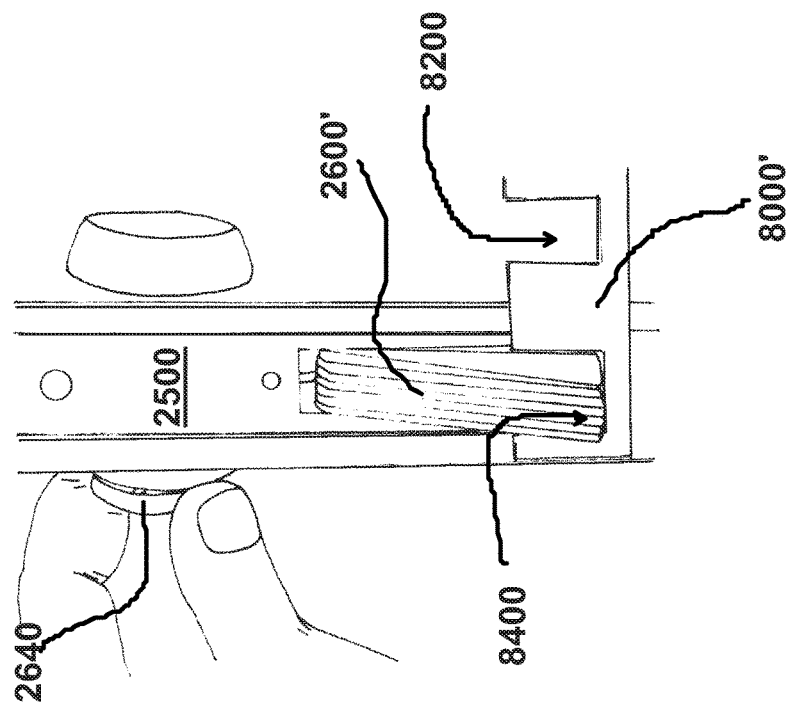
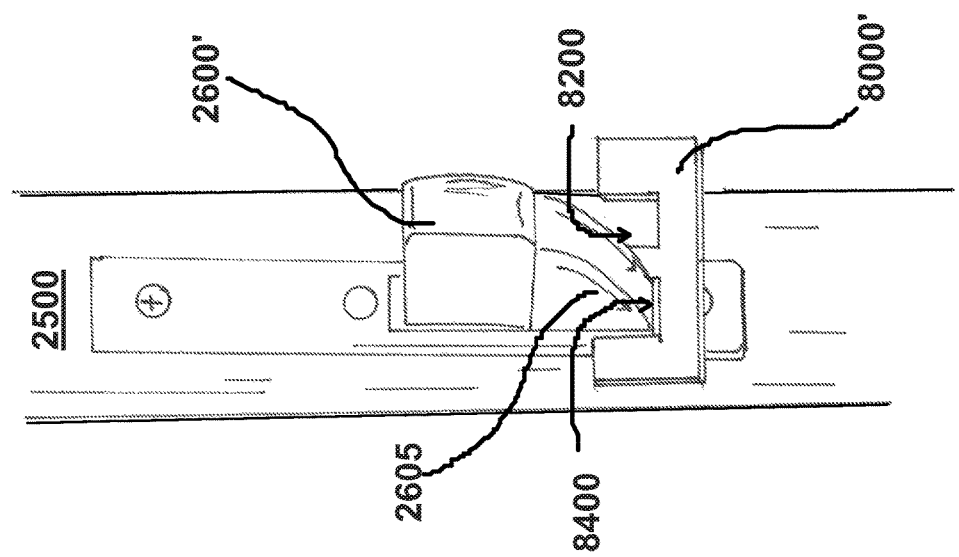
FIG. 86
FIG. 85

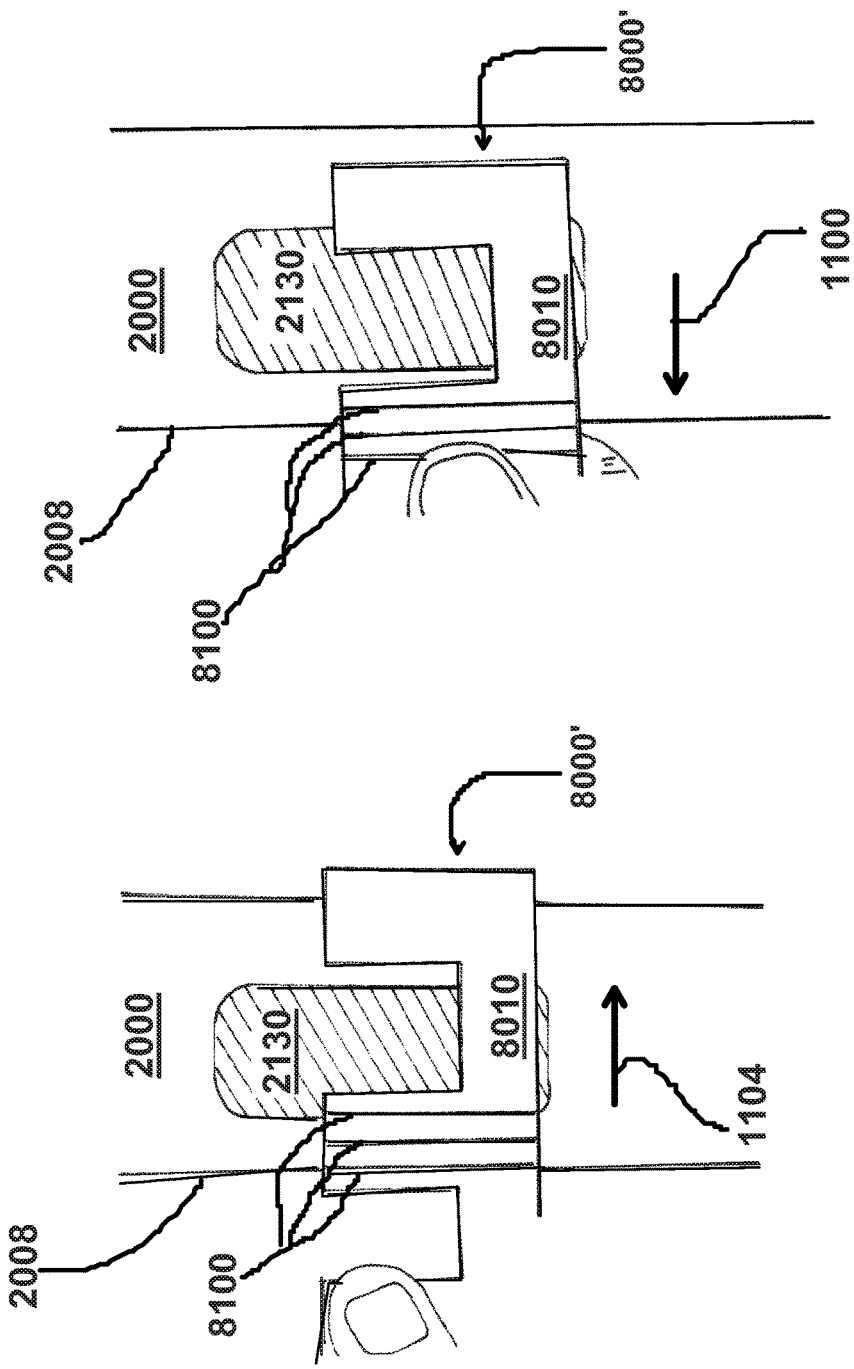

METHOD FOR INSTALLING DOOR LOCKS

CROSS-REFERENCE TO RELATED APPLICATIONS

Incorporated herein by reference are U.S. Patent Application Ser. No. 62/308,991, filed 16 Mar. 2016; U.S. Patent Application Ser. No. 62/280,396, filed 19 Jan. 2016; U.S. Patent Application Ser. No. 62/253,764, filed 11 Nov. 2015; U.S. Patent Application Ser. No. 62/194,501, filed 20 Jul. 2015; U.S. Patent Application Ser. No. 62/162,699, filed 16 May 2015, priority of which are hereby claimed.

U.S. Application Ser. No. 62/140,031, filed 30 Mar. 2015; U.S. Application Ser. No. 62/121,889, filed 27 Feb. 2015; U.S. patent application Ser. No. 14/228,389, filed 28 Mar. 2014; U.S. patent application Ser. No. 12/964,068, filed 9 Dec. 2010; and U.S. Patent Application Ser. No. 61/363,904, filed 13 Jul. 2010, are each incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND

The present invention relates to installation of burglar alarms and installation of door latches, and/or locks, and/or lock hardware.

Most manufacturers have pre-drilled the majority of doors for doorknobs (with cross bores and latch bores), and their measurements will be standard. One challenge with installing doors is to properly position the deadbolt receiving plate, latch bore and/or the strike plate on the door frame. This is currently done with the installer approximating the aligned position of the strike plate.

There is a need to provide quick and convenient methods for marking holes to be drilled for installing door latches, and/or strike plates, and/or other locking hardware.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

BRIEF SUMMARY

In one is provided a method of installing a latch or door plate on a door frame attached to a door, comprising the steps of:

(a) providing a positioning member, the positioning member having a perimeter with a perimeter shape and size;

(b) partially opening the door, the door including a deadbolt having a cross sectional shape and size;

(c) attaching the positioning member to the deadbolt wherein the perimeter shape and size of the positioning member generally matches the cross sectional shape and size of the deadbolt;

(d) while the door is closed in the door frame and the positioning member is attached to the deadbolt, causing the deadbolt to extend towards the door frame which extension towards the door frame causing the positioning member to attach to the door frame at an attached position and alignment state, and subsequently causing the deadbolt to at least partially retract which retraction causing the positioning member to detach from the deadbolt while remaining attached to the door frame;

(e) after step "d", using the attached position and alignment state of the positioning member a basis for installing the latch or door plate on the frame.

In one embodiment is provided a method of installing a latch or bolt plate on a door frame having a door attached to the frame with an extendable and retractable deadbolt, comprising the steps of:

(a) providing a positioning member and attaching the positioning member to the deadbolt;

(b) while the positioning member is attached to the deadbolt, closing the door in the door frame;

(c) while the door is closed, causing the deadbolt to extend which extension in turn causing the positioning member to attach to the door frame at an attached position state; and (d) opening the door and using the attached position state of the positioning member to install a plate on the door frame for receiving the latch or dead bolt.

In one embodiment is provided a method of installing a latch or bolt plate on a door frame having a door attached to the frame with an extendable and retractable deadbolt with a deadbolt cross sectional shape, comprising the steps of:

(a) providing a marking apparatus, the marking apparatus including a marking apparatus shape;

(b) placing the marking apparatus on the deadbolt and aligning the marking apparatus shape with the deadbolt cross sectional shape;

(c) while the marking apparatus is on the deadbolt, closing the door in the door frame;

(d) while the door is closed, causing the deadbolt to extend causing the marking apparatus to be transposed from attachment to the deadbolt to attachment to the door frame;

(e) opening the door and exposing the marking apparatus now attached to the door frame at a location;

(f) using the location of the transposed marking apparatus on the door frame to install a plate on the door frame for receiving the latch or dead bolt.

In various embodiments the methods further comprise the step of using a positioning template in combination with the positioning member or marking apparatus to install the plate on the door frame.

In various embodiments the plate to be installed on the door frame is used as the template.

In various embodiments the door frame has an opening, and before transposing the positioning member or marking apparatus from the deadbolt to the door frame, a cover or marking tape is placed on the door frame to at least partially cover the opening, and during step "d" the positioning member or marking apparatus at least partially attaches to the cover or marking tape and at least partially extends over the opening in the door frame.

In various embodiments the cover or marking tape can be transparent and/or substantially translucent allowing a user to see behind the cover or marking tape when the cover or marking tape is placed on the door frame. In various embodiments the transparency and/or translucency of the cover or marking tape can be used by an installer in properly positioning the item being installed on the door frame relative to existing mortised areas by allowing the user to see the portions of the existing mortised areas located behind the cover or marking tape. In various embodiments the cover or marking tape is strong enough to resist forces applied by the deadbolt during an extension of the deadbolt from the door when the positioning member is transferred from attachment to the deadbolt to attachment to the door frame.

In various embodiments the door frame includes a support pad and the positioning member or marking apparatus at least in part attaches to the door frame by attaching to the support pad.

In various embodiments the methods further comprise wherein in step "a" a plurality of positioning members or marking apparatuses are provided each have generally the same perimeter shape and size.

In various embodiments the methods further comprise wherein in step "a" a plurality of positioning members or marking apparatuses are provided each have generally the same perimeter shape and size of a deadbolt.

In various embodiments the methods can include the step of providing a plurality of positioning members or marking apparatuses each having generally the same perimeter shapes and sizes of a plurality of varying types of deadbolts, the plurality of deadbolts having different shapes and/or sizes including rectangular, square, and/or round shapes, and/or these shapes themselves having rounded edges.

In various embodiments plurality of positioning members match a plurality of deadbolts of varying sizes and/or shapes. In various embodiments the shapes and/or sizes of deadbolt can vary for different manufacturers or different model numbers.

In various embodiments positioning members can have perimeter shapes which match a set of deadbolts having varying roundnesses between the members of the set.

In various embodiments the methods further comprise wherein in step "a" a plurality of positioning members or marking apparatuses are provided each have generally the same perimeter shape and size of a latch bolt.

In various embodiments the methods can include the step of providing a plurality of positioning members or marking apparatuses each having generally the same perimeter shapes and sizes of a plurality of varying types of latch bolts, the plurality of latch bolts having different shapes and/or sizes including rectangular, square, and/or round shapes, and/or these shapes themselves having rounded edges.

In various embodiments plurality of positioning members match a plurality of latch bolts of varying sizes and/or shapes. In various embodiments the shapes and/or sizes of latch bolt can vary for different manufacturers or different model numbers.

In various embodiments positioning members can have perimeter shapes which match a set of latch bolts having varying roundnesses between the members of the set.

In various embodiments the methods further comprise wherein in step "a" the positioning member or marking apparatus has first and second faces with first and second removable backing to reveal first and second adhesive areas on the first and second faces.

In various embodiments the methods further comprise wherein in step "a" the positioning member or marking apparatus has first and second faces with adhesive bonding on the first and second faces, but with the adhesive bonding on the first face being substantially stronger than the adhesive bonding on the second face.

In various embodiments the methods further comprise wherein the adhesive bonding on the first face is at least 25 percent stronger than the adhesive bonding on the second face.

In various embodiments the methods further comprise wherein the adhesive bonding on the first face is at least 100 percent stronger than the adhesive bonding on the second face.

In various embodiments the methods further comprise the step of using a positioning template in combination with the positioning member to install the plate on the door frame.

In one embodiment is provided a method of installing a latch or door plate on a door frame attached to a door, comprising the steps of:

(a) providing a positioning member, the positioning member having a perimeter with a perimeter shape and size;

(b) partially opening the door, the door including a deadbolt having a cross sectional shape and size;

(c) placing the positioning member in contact with the deadbolt;

(d) after step "c", while the door is closed in the door frame, causing the positioning member in contact with the deadbolt to slide relative to the deadbolt and towards the door frame to become attached to the door frame at an attached position and alignment state;

(e) after step "d", causing the deadbolt to at least partially retract so that the positioning member is no longer in contact with the deadbolt;

(f) after step "e", using the attached position and alignment state of the positioning member as a basis for installing the latch or door plate on the frame.

In various embodiments the methods further comprise the step of, wherein in step "d" the positioning member remains in continuous contact with the deadbolt.

In various embodiments the methods further comprise the step of, wherein in step "d" the positioning member is supported by the deadbolt.

In various embodiments the methods further comprise the step of, wherein in step "d" the positioning member is located above the deadbolt.

In various embodiments the methods further comprise the step of, wherein in step "d" vertical movement of the positioning member is restricted by the deadbolt.

In various embodiments the methods further comprise the step of, wherein in step "d" horizontal movement of the positioning member in at least one direction is restricted by the deadbolt.

In various embodiments the methods further comprise the step of, wherein in step "d" horizontal movement of the positioning member in two directions is restricted by the deadbolt.

In various embodiments the methods further comprise the step of, wherein in step "d" the positioning member is located below the deadbolt.

In various embodiments the methods further comprise the step of, wherein in step "d" the positioning member has a deadbolt receiving area which fits snugly around the deadbolt.

In various embodiments the methods further comprise the step of wherein in step "d" the positioning member has two deadbolt receiving areas of similar shape and size, one of which deadbolt receiving areas fits snugly around the deadbolt.

In various embodiments the methods further comprise the step of, wherein in step "d" the positioning member has a rectangular outer perimeter and a deadbolt receiving area which intersects the rectangular outer perimeter at only one side of the rectangular perimeter.

In various embodiments the methods further comprise the step of wherein in step "d" the positioning member has a rectangular outer perimeter and a deadbolt receiving area which intersects the rectangular outer perimeter at two sides the rectangular perimeter.

In various embodiments the methods further comprise the step of, wherein the positioning member has a vertical locating indicia, and during step "d" the vertical locating indicia is used by the user to align the positioning member with the door frame.

In various embodiments the methods further comprise the step of, wherein the vertical locating indicia includes a plurality of vertical parallel lines.

In various embodiments the methods further comprise the step of, wherein in step "e" the user traces around at least part of the deadbolt receiving area to mark the door frame.

In various embodiments the methods further comprise the step of, wherein in step "e" the user traces around at least 50 percent of the deadbolt receiving area to mark the door frame, using this traced marking on the door frame as a basis for installing the latch, deadbolt, or door plate on the door frame.

In various embodiments the methods further comprise the step of, wherein in step "e" the user traces around all of the deadbolt receiving area to mark the door frame, using this traced marking on the door frame as a basis for installing the latch or door plate on the frame.

In various embodiments the methods further comprise the step of using a positioning template in combination with the positioning member to install the plate on the door frame.

In various embodiments the methods further comprise the step of, wherein a template is the plate to be installed on the door frame and the plate having an exterior perimeter and interior receiving opening, wherein the step "e" the plate is used to create an outline of the perimeter of the plate on the door frame.

In various embodiments the methods further comprise the step of, wherein the door frame has an opening, and before step "d" a cover or marking tape is placed on the door frame to at least partially cover the opening, and during step "d" the positioning member at least partially attaches to the cover or marking tape and at least partially extends over the opening in the door frame.

In various embodiments the methods further comprise the step of, wherein the door frame includes a support pad and the positioning member in step "d" at least in part attaches to the door frame by attaching to the support pad.

In various embodiments the methods further comprise the step of, wherein in step "a" the positioning member has first and second faces with the first side having removable backing to reveal an adhesive area, and the second face has a vertical locating indicia which includes a plurality of vertical parallel lines.

In various embodiments the methods further comprise the step of, wherein in step "d" the positioning member has two deadbolt receiving areas of similar shape and size, and each of the two deadbolt receiving areas points in the same direction.

In various embodiments the methods further comprise the step of, wherein in step "d" the positioning member has two deadbolt receiving areas of similar shape and size, and each of the two deadbolt receiving areas points in opposite directions.

In various embodiments, the shapes of different deadbolt location tapes can be made to specifically match or fit deadbolts of different particular shapes and/or the latch bolt location cards can be made to specifically match or fit the different outer shapes of particular latches (with or with out a deadlocking plunger). In various embodiments specifically matched items address that fact that different lock manufacturers utilize deadbolts and/or latch bolts of different shapes and sizes, and some manufacturers include shapes that more closely resemble squares, and some include rounded instead of sharp corners, etc.

The drawings constitute a part of this specification and include exemplary embodiments to the invention, which may be embodied in various forms.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is an end view of one embodiment of a positioning member which is transferable, while the door is closed, from being attached to the deadbolt of the door to being attached to the door frame.

FIG. 3 is a side view of the transferable positioning member shown in FIG. 2.

FIG. 6 is perspective diagram showing the transferable positioning member of FIG. 2 being attached to the deadbolt of a door.

FIG. 7 is a rear perspective view of the transferable positioning member of FIG. 2.

FIG. 8 is perspective diagram showing the transferable positioning member of FIG. 2 now attached to the deadbolt of a door.

FIG. 24 is a perspective view of a gap filler/reducer which can be trimmed by an installer to fill the gap left by existing mortised area with the removal of the non-aligned existing strike plate.

FIG. 25 shows a trace line made by tracing the exterior of the existing strike plate onto the gap filler/reducer of FIG. 24.

FIG. 26 shows the gap filler/reducer of FIG. 25 being trimmed to size.

FIG. 71 is a perspective view showing the deadbolt locator card of FIGS. 46 and 47 (before the adhesive liner is removed from the card) positioned around the dead bolt of the door and illustrating how the card is dimensioned to fit snugly around the dead bolt.

FIG. 72 is a perspective view showing the liner being removed from the deadbolt locator card of FIGS. 46 and 47 exposing adhesive on the locating card.

FIG. 85 is a perspective view showing an alternative embodiments of a hook or deadbolt locator card which can be used for mortising areas for installing hook or deadbolt receiving plates, with the locator card being plated on a door having a hook or deadbolt and schematically indicating that the hook or deadbolt is retracting and extending, and illustrating how the card is dimensioned to fit snugly around the hook or deadbolt.

FIG. 86 is a side view of the door in FIG. 85.

FIG. 90 is a perspective view of the deadbolt locator card of FIG. 85 attached to a door frame, and schematically illustrating the step of, after the locator card has been attached to the door frame and following the opening of the door, the installer uses the now positioned locator card on the door frame to make positioning marks or indicia for installing a hook or deadbolt receiving plate, such as by tracing a part of the shape of the locator card onto the door frame.

FIG. 91 is a perspective view of the deadbolt locator card of FIG. 85 attached to a door frame, and schematically illustrating the step of, after the locator card has been attached to the door frame and following the opening of the door, the installer uses the now positioned locator card on the door frame to make positioning marks or indicia for installing a hook bolt receiving plate, such as by tracing a part of the shape of the locator card onto the door frame, where the correctly positioned and aligned hook bolt receiving plate in this figure is closer to the existing mortised area compared to the correctly positioned and aligned hook bolt receiving plate in FIG. 90.

TRANSFERABLE POSITIONING MEMBER

Figure 1:
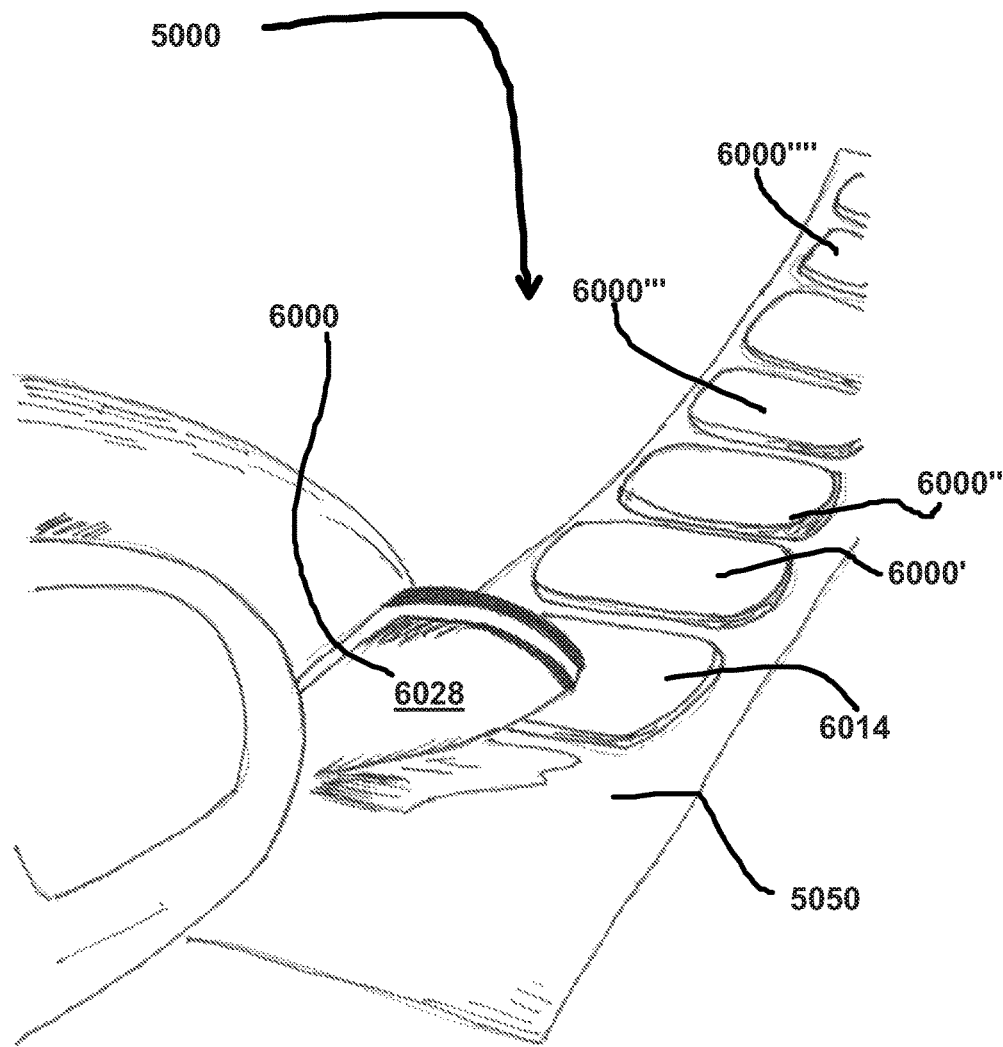
FIG. 1 is a strip of a plurality of transferable positioning members which are the shape of the cross section of a deadbolt for later detachable connection to the deadbolt, the individual positioning members of the plurality of positioning members each being transferable, while the door is closed, from the deadbolt to the door frame.

FIG. 2 is an end view of one embodiment of a positioning member 6000 which is transferable, while the door 2500 is closed, from being attached to the deadbolt 2600 of the door 2500 to being attached to the door frame 2000 at a correctly positioned and aligned location. FIG. 1 is a perspective view showing a strip 5000 of a plurality of transferable positioning members 6000,6000',6000'',6000''', etc. which can be the shape and size of the cross section of a deadbolt 2260 for later detachable connection to the deadbolt 2600, the individual positioning members 6000 of the plurality of positioning members each being transferable, while the door 2500 is closed, from the deadbolt 2600 to the door frame 2000.

In various embodiments the methods further comprise wherein in step "a" a plurality of positioning members or marking apparatuses 6000,6000',6000'',6000''', etc. are provided each have generally the same perimeter shape and size of a deadbolt 2600.

In various embodiments the methods can include the step of providing a plurality of positioning members or marking apparatuses 6000,6000',6000'',6000''', etc. each having generally the same perimeter shapes and sizes of a plurality of varying types of deadbolts 2600, 2600', 2600'', 2600''', etc., the plurality of deadbolts 2600, 2600', 2600'', 2600''', etc., having different shapes and/or sizes including rectangular, square, and/or round shapes, and/or these shapes themselves having rounded edges.

In various embodiments plurality of positioning members 6000,6000',6000'',6000''', etc. match a plurality of deadbolts 2600, 2600', 2600'', 2600''', etc. of varying sizes and/or shapes. In various embodiments the shapes and/or sizes of the plurality of deadbolts 2600, 2600', 2600'', 2600', etc. can vary for different manufacturers or different model numbers.

In various embodiments positioning members 6000, 6000',6000'',6000''', etc. can have perimeter shapes which match a set of deadbolts 2600, 2600', 2600'', 2600''', etc. having varying roundnesses between the members of the set.

Figure 4:
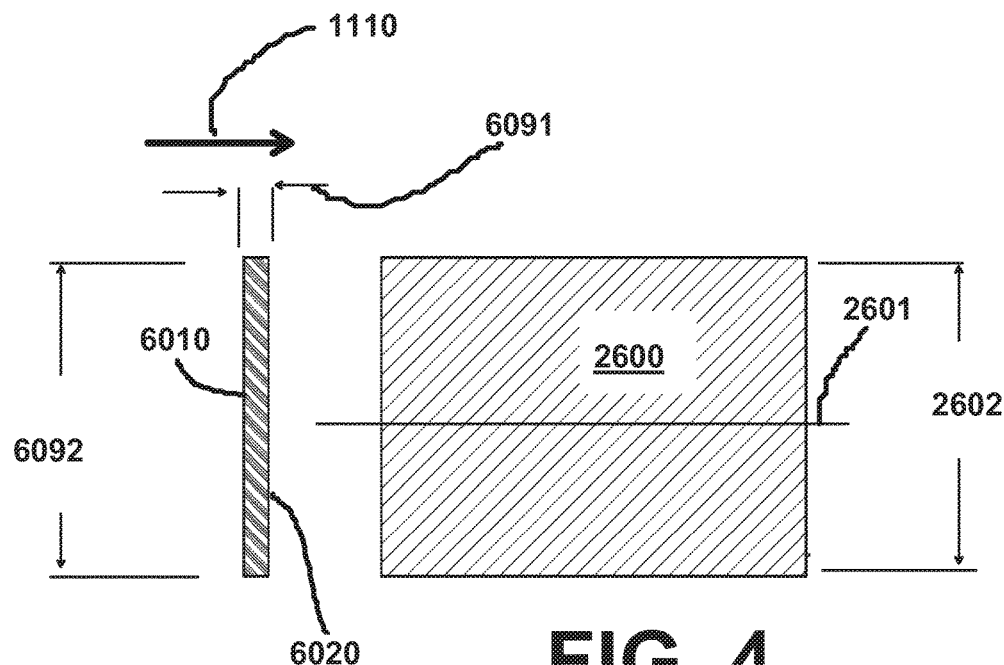
FIG. 4 is side view schematic diagram showing the transferable positioning member of FIG. 2 being attached to the deadbolt of a door.
Figure 5:
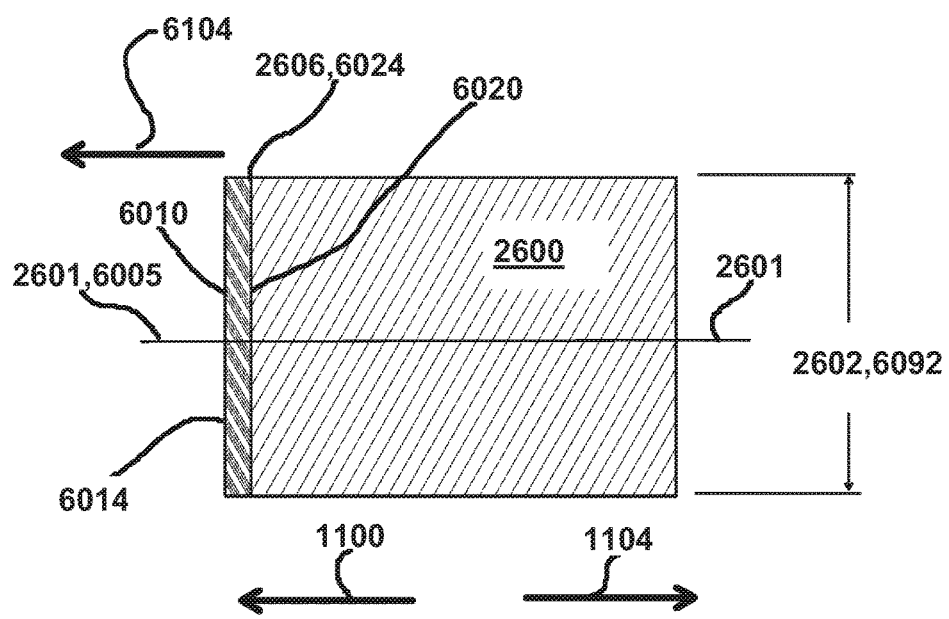
FIG. 5 is schematic diagram showing the transferable positioning member of FIG. 2 now attached to the deadbolt of a door.

FIG. 3 is a side view of the transferable positioning member 6000. FIG. 4 is side view schematic diagram showing the transferable positioning 6000 being attached to the deadbolt 2600 of a door 2500. FIG. 5 is schematic diagram showing the transferable positioning member 6000 now attached to the deadbolt 2600. FIG. 6 is perspective diagram showing the transferable positioning member 6000 being attached to the deadbolt 2600 of a door 2500. FIG. 7 is a rear perspective view of the transferable positioning member 6000. FIG. 8 is perspective diagram showing the transferable positioning member 600 now attached to the deadbolt 2600 of a door 2500.

Positioning member 6000 can include body 6004 having a first end 6010, second end 6020, and a thickness 6091. Body 6004 can have a width dimension 6094 and a height dimension 6092, and can have rounded corners (indicated by reduced dimensions 6093). On first end 6010 can be adhesive 6014 and backing material 618. On second end 6020 can be adhesive 6024 and backing material 6028 for positioning member 6000 to be detachably connected to the front surface 2606 of a deadbolt 2600.

Body 6004 can have a thickness 6091. Thickness 6091 can be about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.5, 2.6, 2.7, 2.8, 2.9, 3, and 4 millimeters. In various embodiments thickness can fall within a range of any two of the above referenced possible thickness dimensions.

Preferably, positioning member 6000's width dimension 6094 is substantially the same as deadbolt 2600's width dimension 2604, and height dimension is substantially as height dimension 2602. These matching height/width dimensions will allow the user to better line up longitudinal axis 6005 of positioning member 6000 with the longitudinal axis 2601 of deadbolt 2604 when attaching positioning member 6000 to deadbolt 2600 and ensure that any mark left by marking tip 1050 on frame 2000 will intersect the extended longitudinal axis 2601 of deadbolt 2600.

In a preferred embodiment adhesive 6014 on first end 6010 is substantially stronger than adhesive 6024 on second end 6020. In various embodiments adhesive 6014 contact strength on door frame 2000 is at least 5, 10, 15, 20, 25, 50, 75, 100, 150, 200, 300, 400, and 500 percent stronger than the adhesive 6020 contact strength on deadbolt 2600. In various embodiments adhesive 6014 can be stronger within a range of any two of the above referenced percentage numbers in this paragraph.

Figures 9, 10:
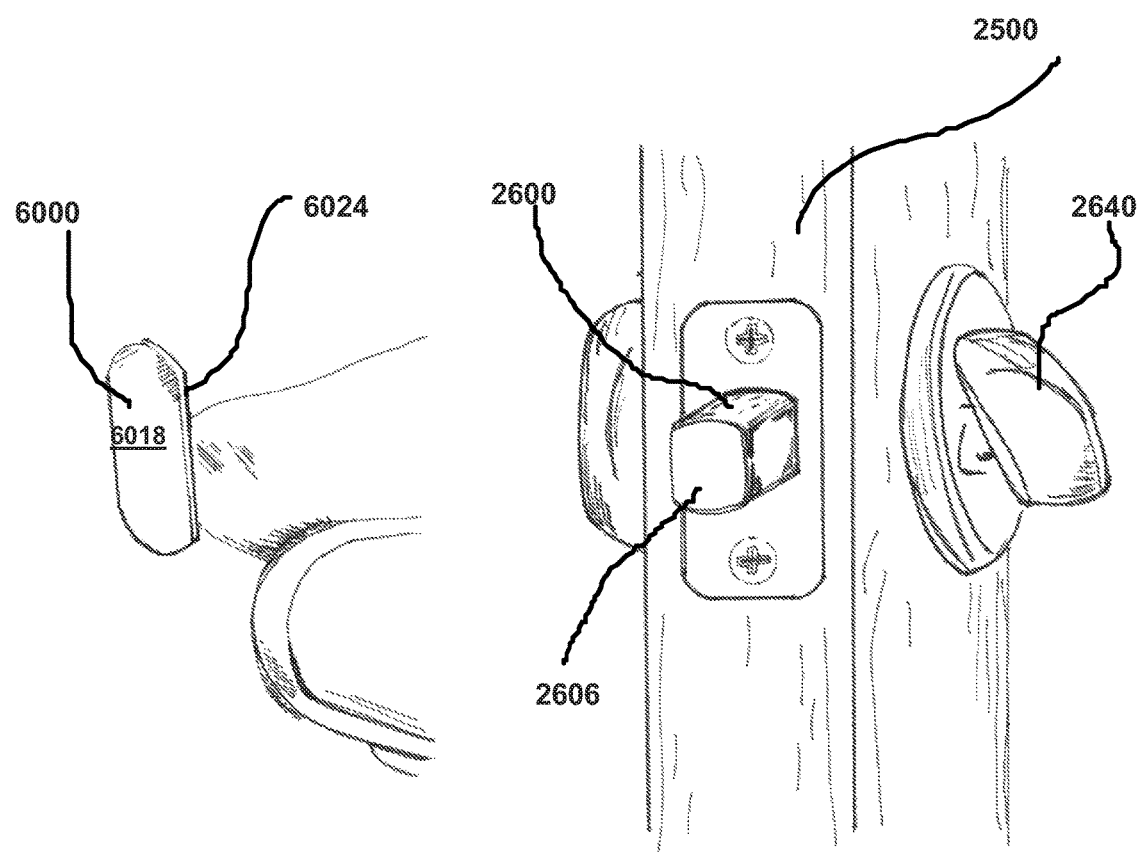
FIG. 9 is a perspective view of one of the plurality of transferable members of FIG. 1 (one embodiment of which is shown in FIGS. 4 through 8) removed from the strip and ready for attachment to a deadbolt.
FIG. 10 shows the transferable positioning member now attached to the deadbolt of the door.
Figure 11:
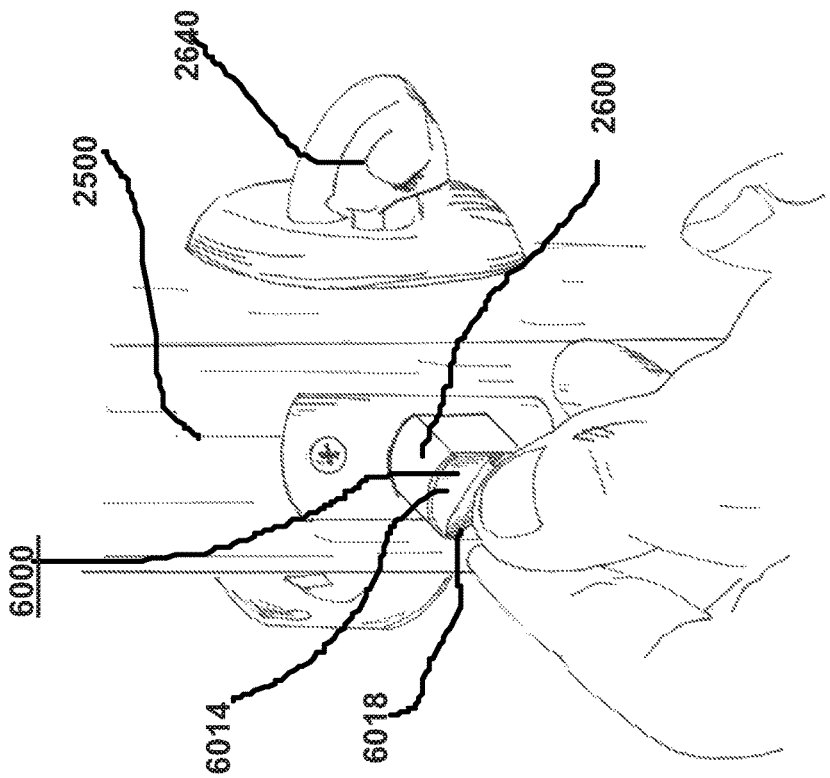
FIG. 11 is perspective view showing a user removing a backing layer from the transferable positioning member attached to the deadbolt of a door while the deadbolt is in an extended state.

FIG. 9 is a perspective view of one of the plurality of transferable members 5000 (one embodiment of which is shown in FIGS. 4 through 8) removed from the strip 5050 and ready for attachment to a deadbolt 2600. FIG. 10 shows a deadbolt 2600 ready to receive the transferable positioning member 6000. FIG. 11 is perspective view showing a user, after placing the positioning member 6000 on the deadbolt, the user removing a backing layer 6018 from the transferable positioning member 6000 and exposing adhesive 6014, and while the deadbolt 2600 is in an extended state.

Figure 12:
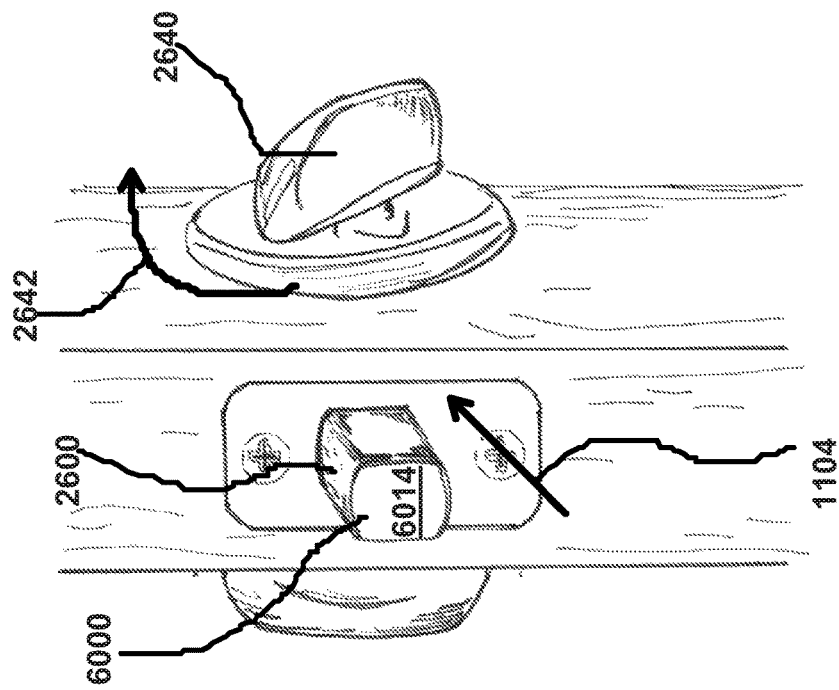
FIG. 12 is perspective view showing the transferable positioning member attached to the deadbolt of a door in an extended state, with the backing layer removed, and schematically indicating that the deadbolt is about to be retracted into the door.

FIG. 12 is perspective view showing the transferable positioning member 6000 attached to the deadbolt 2600 in an extended state, with the backing layer 6018 removed, and schematically indicating that the deadbolt 2600 is about to be retracted into the door 2500 (arrow 2642 schematically indicating that knob 2640 is rotated to cause retraction of the deadbolt 2600 in the direction of arrow 1104).

Figure 13:
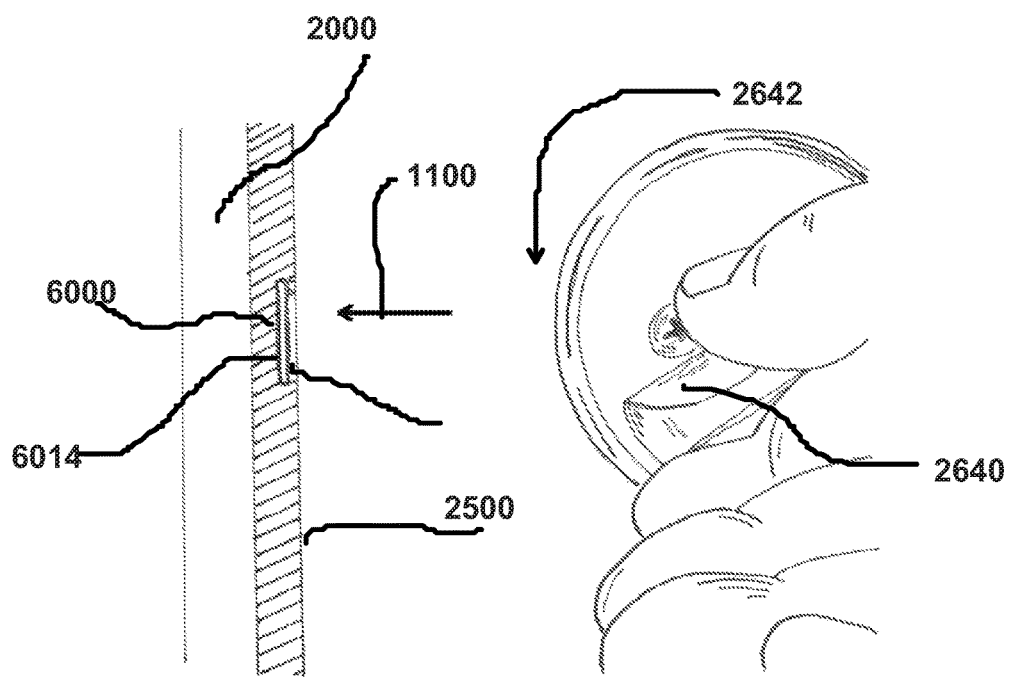
FIG. 13 is front perspective view of the door now closed in the door frame with transferable positioning member attached to the deadbolt while the deadbolt is in a retracted state, and a user starting the extension of the deadbolt from the door.
Figure 14:
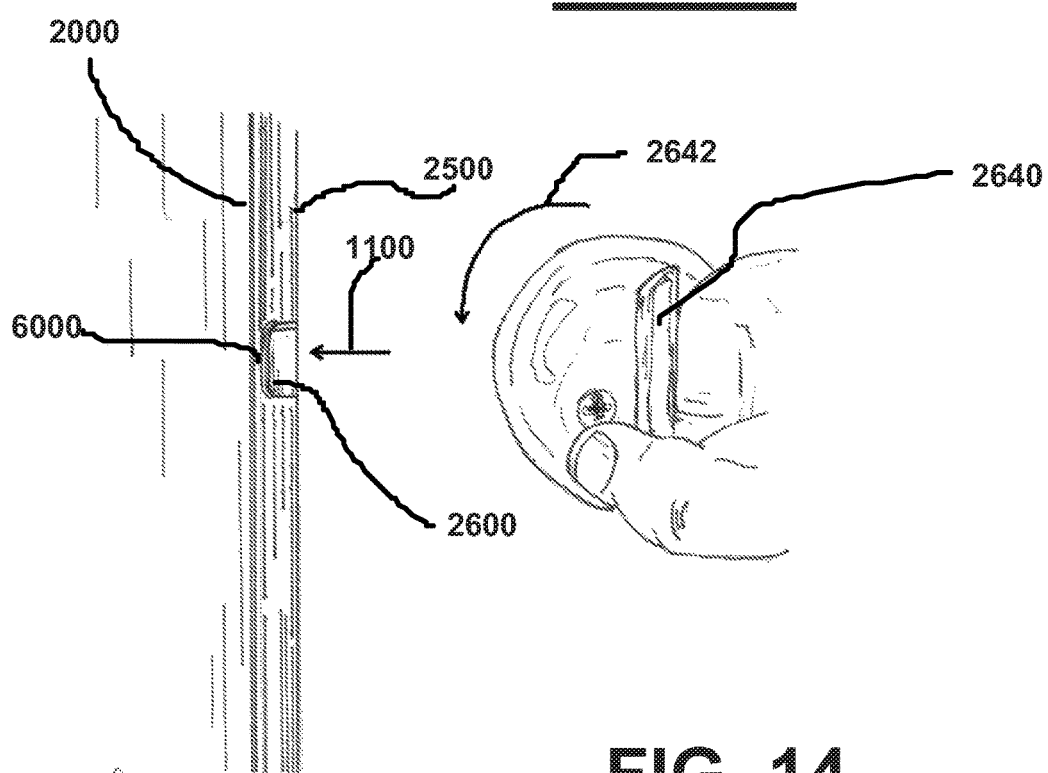
FIG. 14 is front perspective view of the door showing a user extending the deadbolt with attached transferable positioning member.
Figure 15:
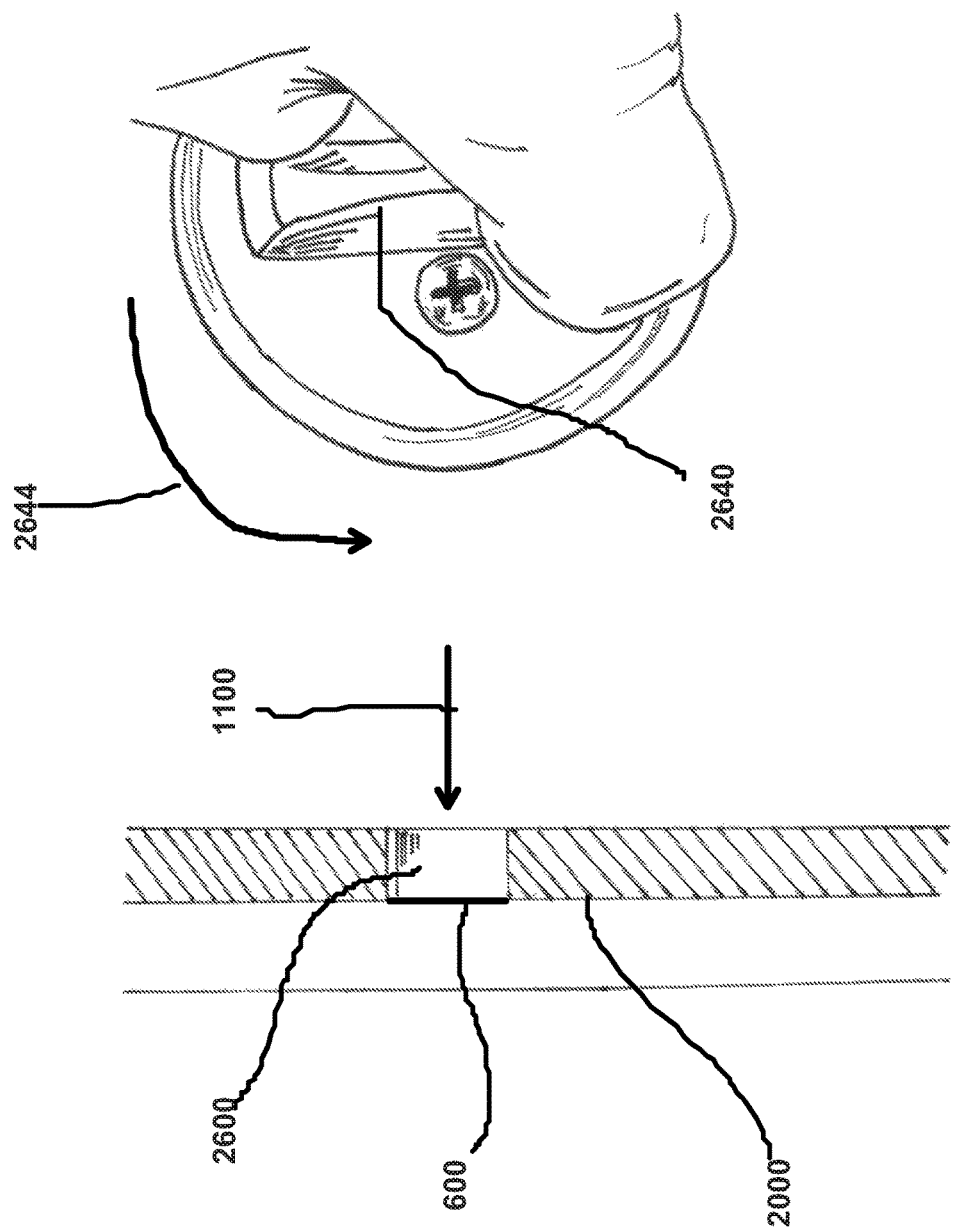
FIG. 15 is front perspective view of the door showing a user extending to its maximum limit the deadbolt with attached transferable positioning member now in contact with the door frame, and causing the transferable positioning member to become attached to the door frame.

FIG. 13 is front perspective view of the door 2500 now closed in the door frame 2000 with transferable positioning member 6000 attached to the deadbolt 2600 while the deadbolt 2600 is in a retracted state, and a user starting the extension of the deadbolt 2600 from the door 2500. Arrow 2642 schematically indicating that knob 2640 is rotated to cause extension of the deadbolt 2600 in the direction of arrow 1100. FIG. 14 is front perspective view of the door showing a user continuing to extend the deadbolt 2600 with attached transferable positioning member 6000 towards the door frame 2000 (in the direction of arrow 1100). FIG. 15 is front perspective view of the door 2500 showing a user now extending to its maximum limit the deadbolt 2600 with attached transferable positioning member 6000 in the direction of arrow 1100 such that the positioning member is now in contact with the door frame 2000, which contact causing the transferable positioning member 6000 to become attached to the door frame 2000 through contact of the adhesive 2014 with the door frame 2000.

Figure 16:
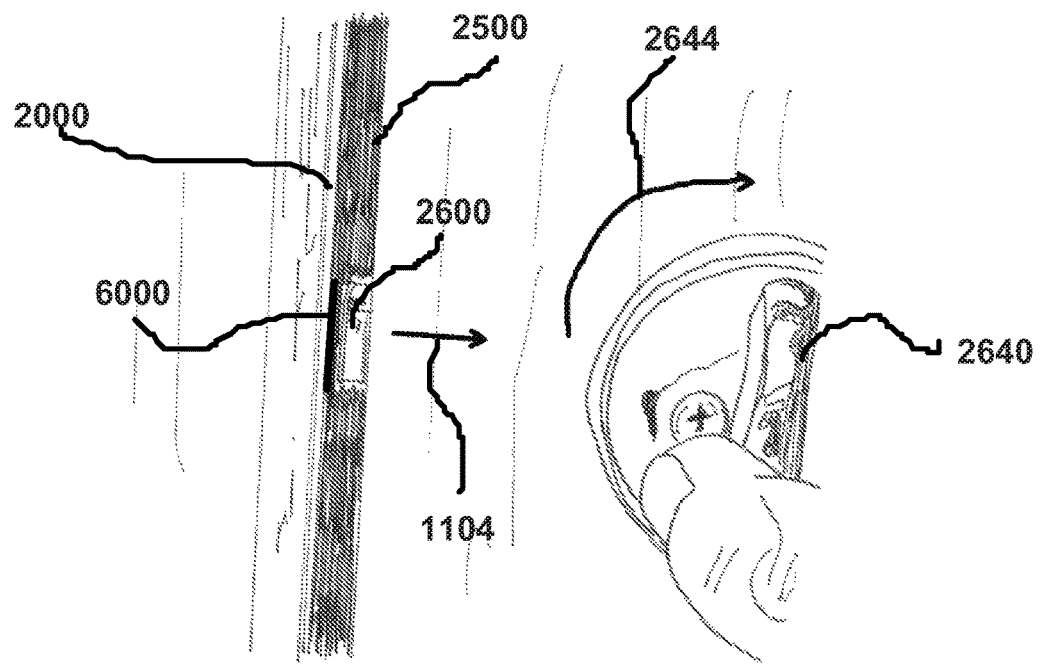
FIG. 16 is front perspective view of the door showing a user now starting to retract the deadbolt with detachably connected transferable positioning member initially connected to the deadbolt, but where the retraction of the deadbolt will cause the transferable positioning member to become detached from the deadbolt and transfer to the door frame.
Figure 17:
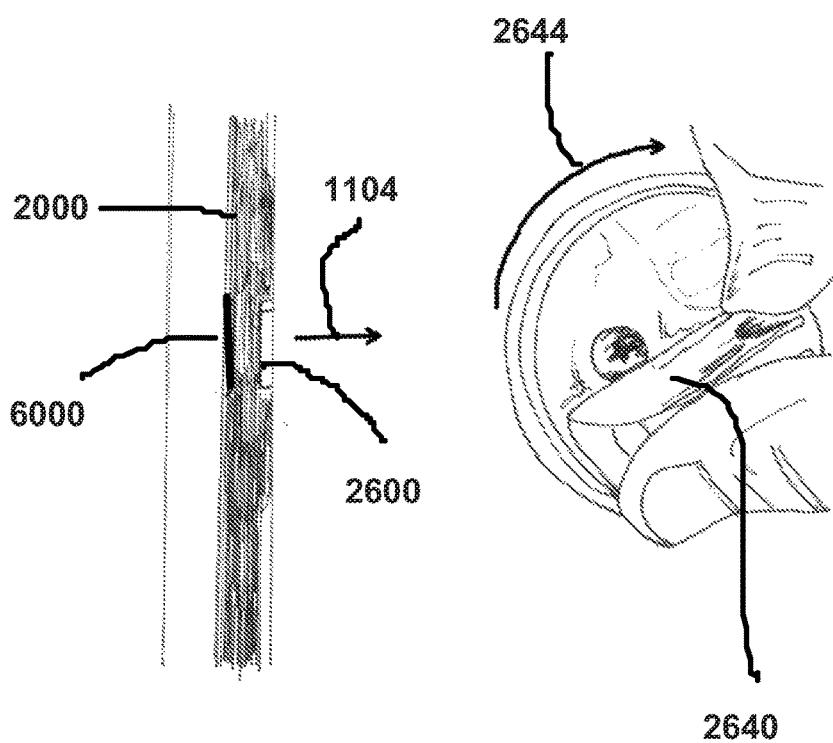
FIG. 17 is front perspective view of the door showing the deadbolt now in a retracted state and the transferable positioning member having been transferred from the deadbolt to the door frame.

FIG. 16 is front perspective view of the door 2500 showing a user now starting to retract the deadbolt 2600 away from frame 2000 and into door 2500 with detachably connected transferable positioning member 6000 initially connected to both the deadbolt 2600 and door frame 2000 (connection to door frame via adhesive 2014 and connection to deadbolt via adhesive 6024), but where the retraction of deadbolt 2600 in the direction of arrow 1104 causing the transferable positioning member 6000 to detach from deadbolt 2600 and transfer connection to the door frame 2000 (adhesive 6014 loses contact with deadbolt 2600 compared to adhesive 6014 maintaining contact with door frame 2000). FIG. 17 is front perspective view of the closed door 2500 showing the deadbolt 2600 now in a retracted state and the transferable positioning member 2600 having been transferred from the deadbolt 2600 to the door frame 2000.

Figure 18:
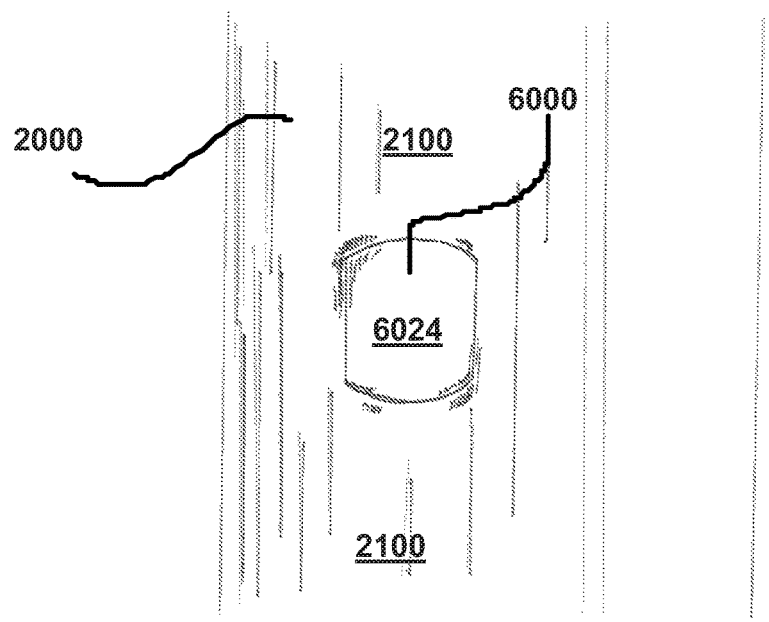
FIG. 18 is a perspective view of the door frame showing the transferred positioning member now attached to the door frame.

FIG. 18 is a perspective view of the door frame 2000 showing the transferred positioning member 6000 now attached to the door frame 2000. The now attached location of positioning member 6000 on door frame 2000 can be used by an installer to both correctly position and/or align a deadbolt receiving plate 2204 for installation on the door frame 2000.

Figure 19:
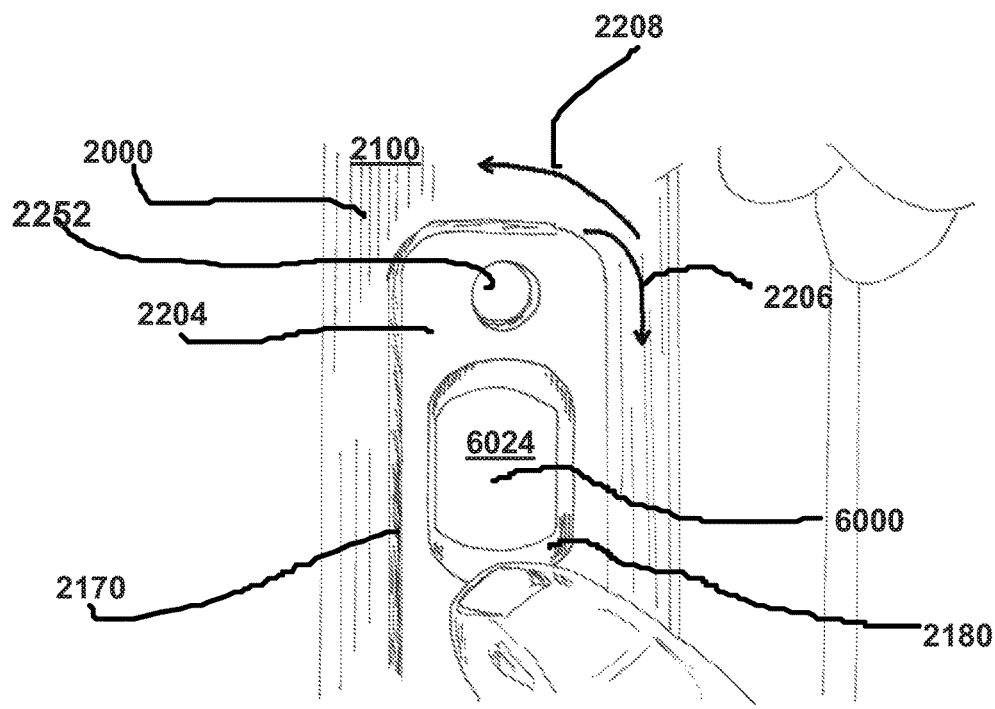
FIG. 19 is a perspective view of the door frame with attached transferred positioning member and showing an installer positioning a deadbolt receiving plate around the transferred positioning member with the transferred positioning member being used to both position and align the deadbolt receiving plate on the door frame.

FIG. 19 is a perspective view of the door frame 2000 with attached transferred positioning member 6000 and showing an installer positioning a deadbolt receiving plate 2204 around the transferred positioning member 6000 with the transferred positioning member 6000 being used to both position and align the deadbolt receiving plate 2204 on the door frame 2000. Arrows 2206 and 2208 schematically indicate the user both positioning and aligning deadbolt receiving plate 2204 relative to the transferred location of positioning member 6000 on door frame 2000.

Figure 20:
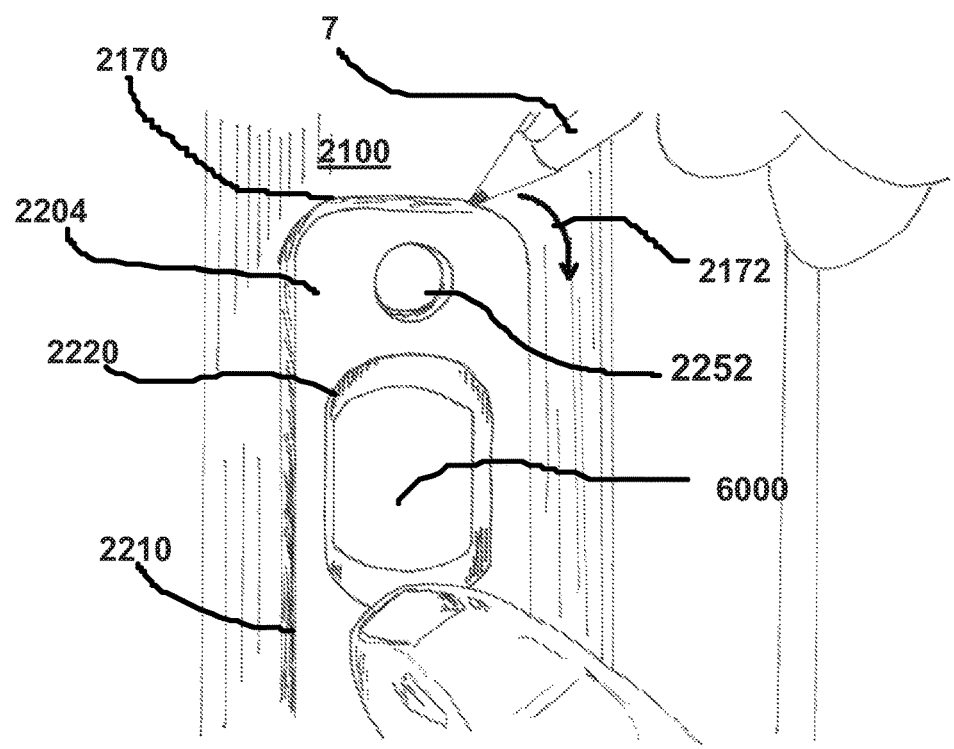
FIG. 20 is a perspective view of the door frame showing a user tracing around the outside perimeter of the now positioned and aligned deadbolt receiving plate.
Figure 21:
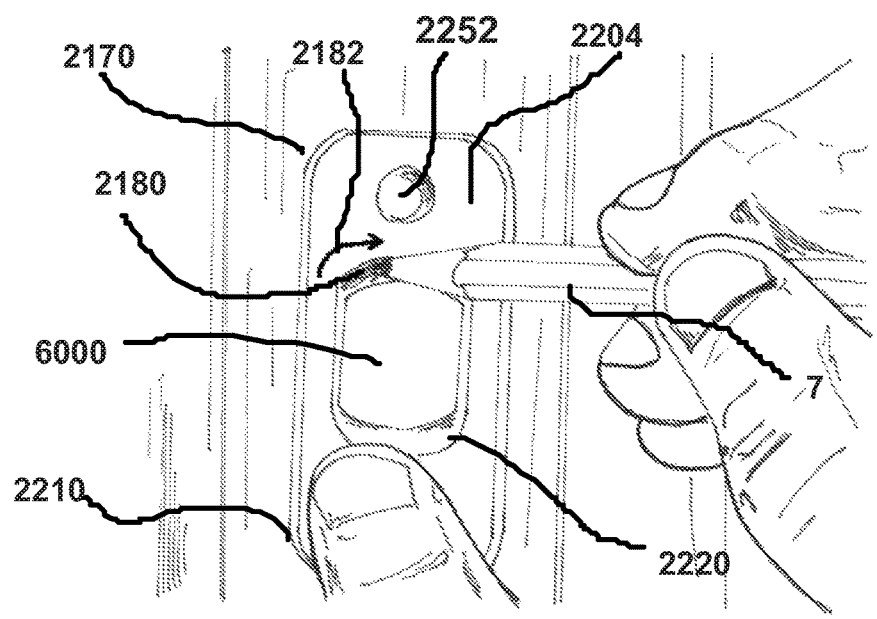
FIG. 21 is a perspective view of the door frame showing a user tracing around the inside perimeter of the now positioned and aligned deadbolt receiving plate, with the transferred positioning member remaining on the door frame to facilitate continued correct positioning and alignment of the deadbolt receiving plate.

FIG. 20 is a perspective view of the door frame 2000 showing a user using a marking tool 7 (such as a pencil) to trace around the outside perimeter 2210 of the now positioned and aligned deadbolt receiving plate 2204. Arrow 2172 schematically indicates that trace line 2170 is being placed around outer perimeter 2210. FIG. 21 is a perspective view of the door frame 2000 showing a user tracing around the inside perimeter 2220 of the now positioned and aligned deadbolt receiving plate 2204, with the transferred positioning member 6000 remaining on the door frame 2000 to facilitate continued correct positioning and alignment of the deadbolt receiving plate. Arrow 2182 schematically indicates that trace line 2180 is being placed around inner perimeter 2220. Similarly, the user can also trace the inside perimeters of mounting screw openings 2252 and 2254 of deadbolt receiving plate 2204 to provide an indication on door frame 2000 of where to create the screw hole openings for installing deadbolt receiving plate 2204 on door frame 2000.

Figure 22:
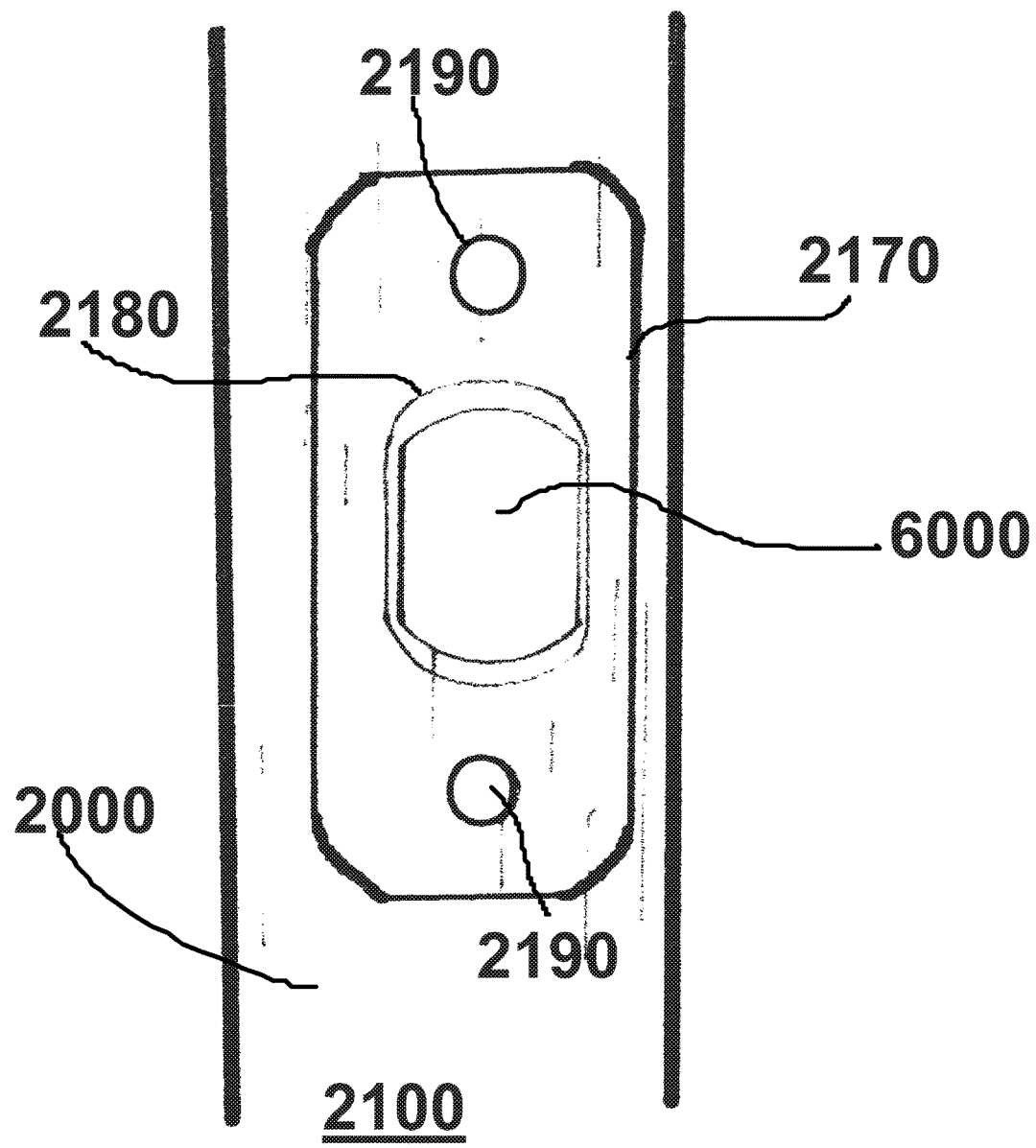
FIG. 22 is a perspective view shown the traced outside and inside perimeters of the strike plate to be mortised.

FIG. 22 is a perspective view showing the traced outside 2210 and inside 2220 perimeters of the strike plate 2204 to be mortised. Trace line 2170 was made from outside perimeter 2210. Trace line 2180 was made from inside perimeter 2220. Trace lines 2190 were made from mounting screw openings 2252 and 2254. Transferred positioning member 6000 is shown as remaining on face 2100 of door frame 2000. These tracings can now be used to install deadbolt receiving plate 2204 in the correctly positioned and aligned location on door frame 2000 to receive deadbolt 2600. Here the installer can mortise inside the interior of trace line 2170 and create a bore for receiving deadbolt 2600 based on trace line 2180, and create screw hole openings based on trace lines 2190.

Figure 23:
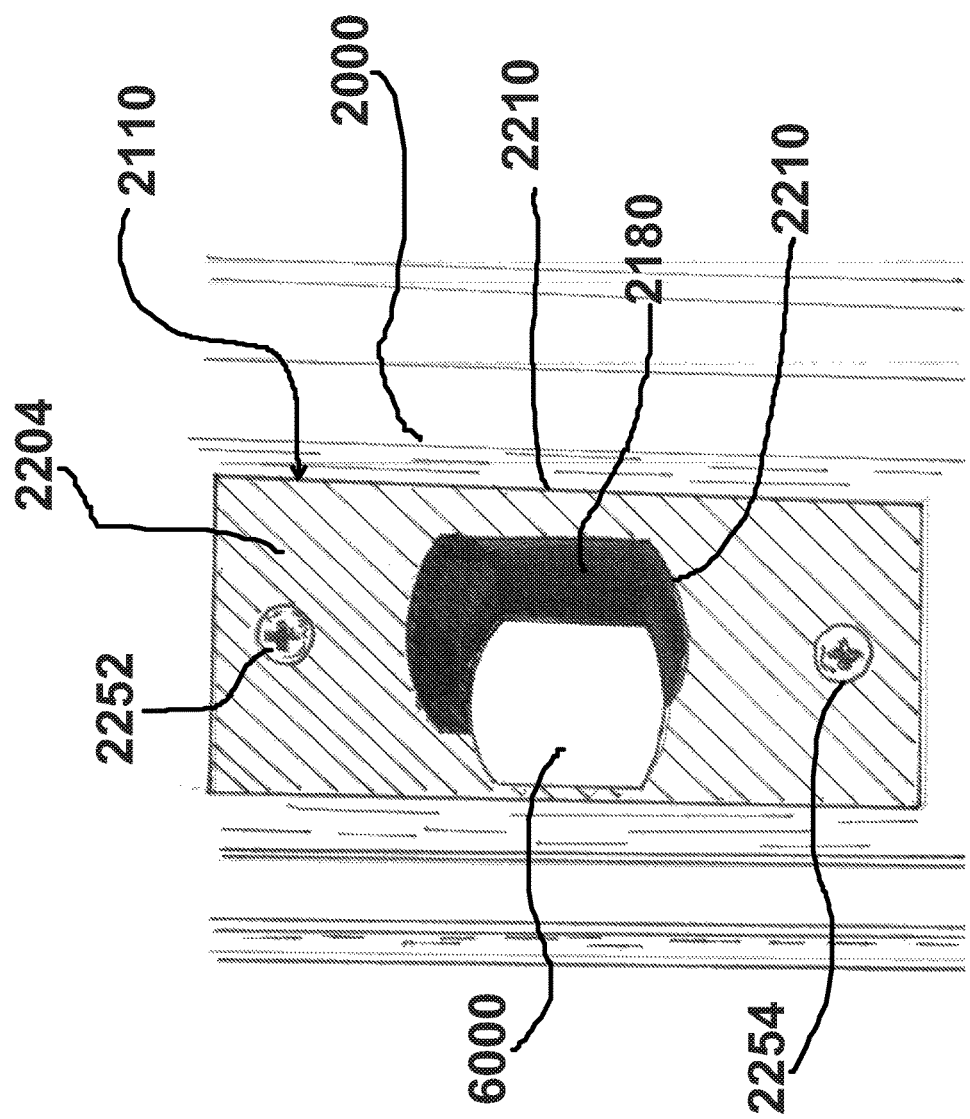
FIG. 23 is a perspective view showing an "alignment testing" transferable positioning member which was placed on the deadbolt and transferred using substantially the same steps as described above, with the location of the transferred "alignment testing" positioning member indicating that the position and/or alignment of the already installed deadbolt receiving plate is incorrectly positioned and/or aligned for receiving the door's deadbolt.

FIG. 23 is a perspective view showing an "alignment testing" transferable positioning member 6000 which was placed on the deadbolt 2600 and transferred using substantially the same steps as described above, with the location of the transferred "alignment testing" positioning member 6000 indicating that the position and/or alignment of the already installed deadbolt receiving plate 2204 is incorrectly positioned and/or aligned for receiving the door's deadbolt 2600.

FIG. 24 is a perspective view of a gap filler/reducer 2700 which can be trimmed by an installer to fill the recess left by existing mortised area 21110 with the removal of the non-aligned existing strike plate 2204.

FIG. 25 shows a trace line 2170 made by tracing the exterior 2210 of the existing strike plate 2204 onto the gap filler/reducer 2700.

FIG. 26 shows the gap filler/reducer 2700 being trimmed to size.

Figure 27:
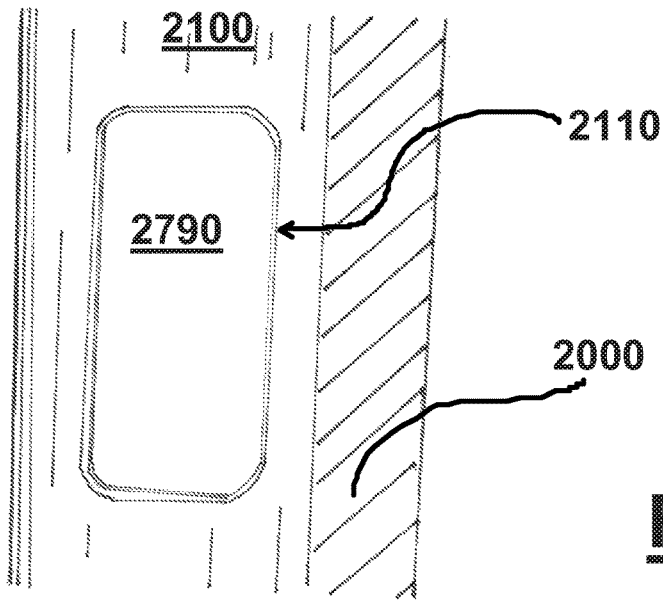
FIG. 27 is a perspective view showing a gap filler inserted into an existing mortised area of a door frame.

FIG. 27 is a perspective view showing a trimmed gap filler 2790 inserted into an existing mortised area 2110 of a door frame 2000.

Figure 28:
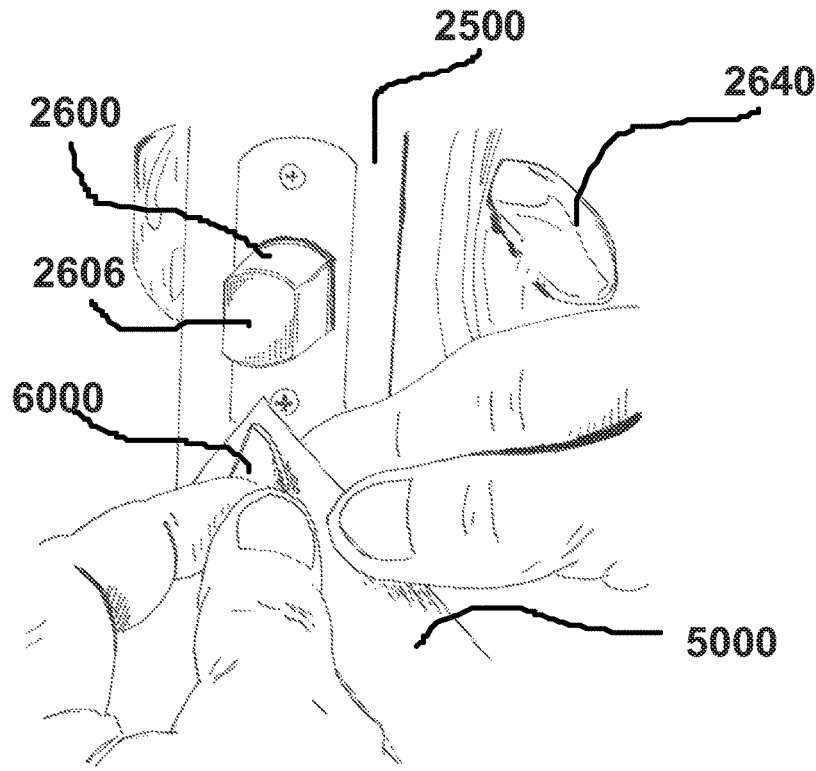
FIG. 28 shows the transferable positioning member of FIG. 2 being detachably attached to the deadbolt shown in FIG. 10.

FIG. 28 shows the transferable positioning member 6000 being detachably attached to the deadbolt 2600.

Figure 29:
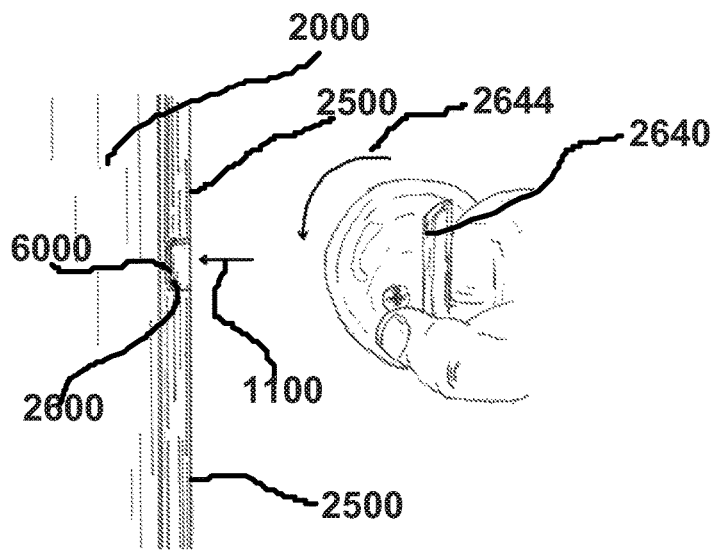
FIG. 29 is front perspective view of the door with the deadbolt in a retracted state and the transferable positioning member attached to the deadbolt with its front adhesive exposed, and the user about to extend the deadbolt with transferable positioning member.

FIG. 29 is front perspective view of the door 2500 with the deadbolt 2600 in a retracted state and the transferable positioning member 6000 attached to the deadbolt 2600 with its front adhesive 6014 exposed, and the user about to extend the deadbolt 2600 with transferable positioning member 6000.

Figure 30:
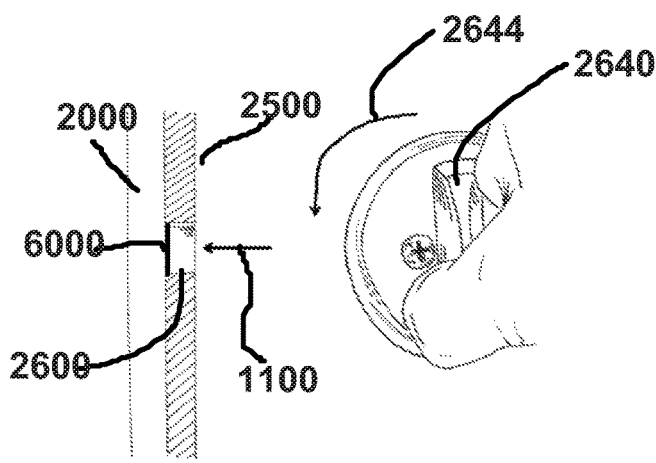
FIG. 30 is front perspective view of the door showing a user extending to its maximum limit the deadbolt with attached transferable positioning member.

FIG. 30 is front perspective view of the door 2500 showing a user extending to its maximum limit the deadbolt 2600 with attached transferable positioning member 6000.

Figure 31:
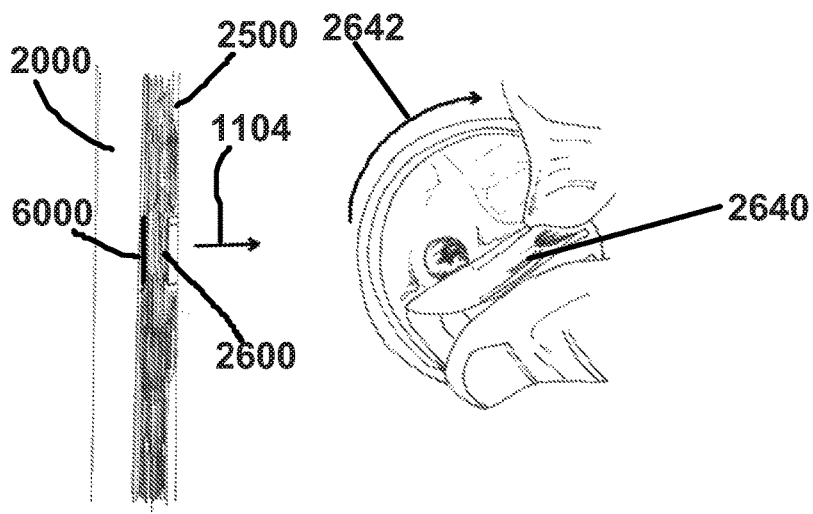
FIG. 31 is front perspective view of the door showing a user now retracting the deadbolt causing the transferable positioning member to stay attached to the door frame and become detached from the deadbolt.

FIG. 31 is front perspective view of the door 2500 showing a user now retracting the deadbolt 2600 causing the transferable positioning member 6000 to stay attached to the door frame 2000 and become detached from the deadbolt 2600.

Figure 32:
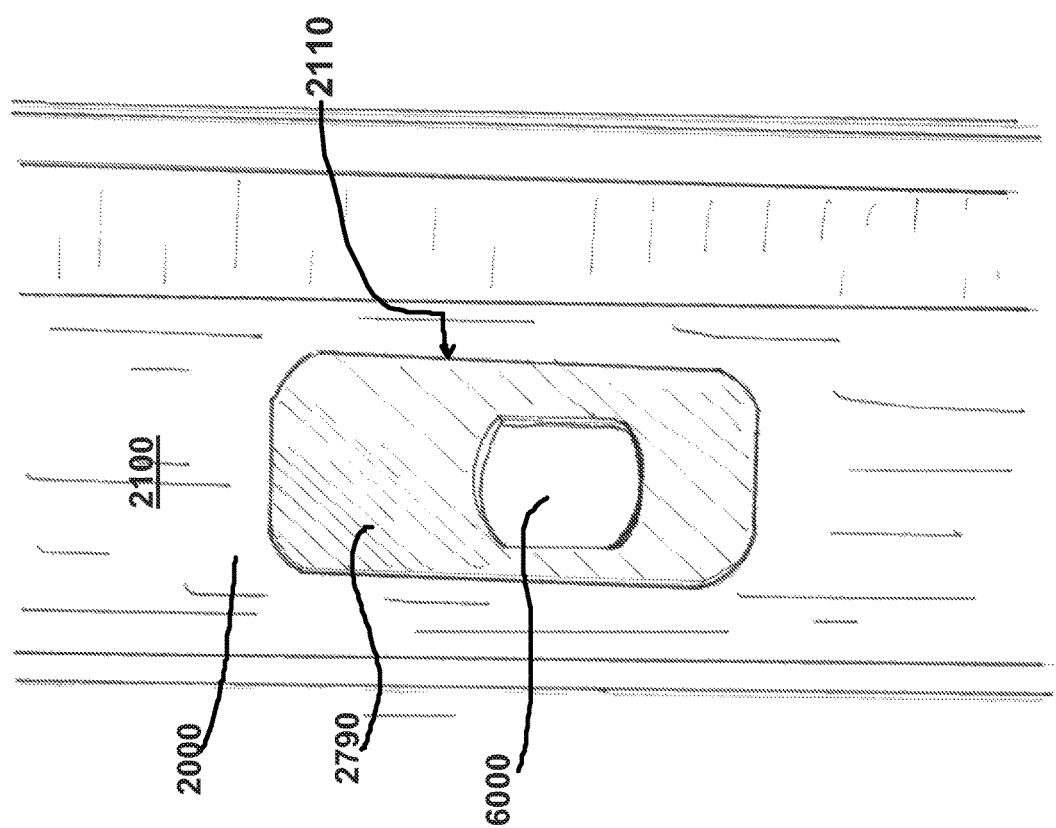
FIG. 32 is a perspective view of the door frame showing the transferred positioning member located on the gap reducer/filler.

FIG. 32 is a perspective view of the door frame 2000 showing the transferred positioning member 6000 located on the gap reducer/filler 2790.

Figure 33:
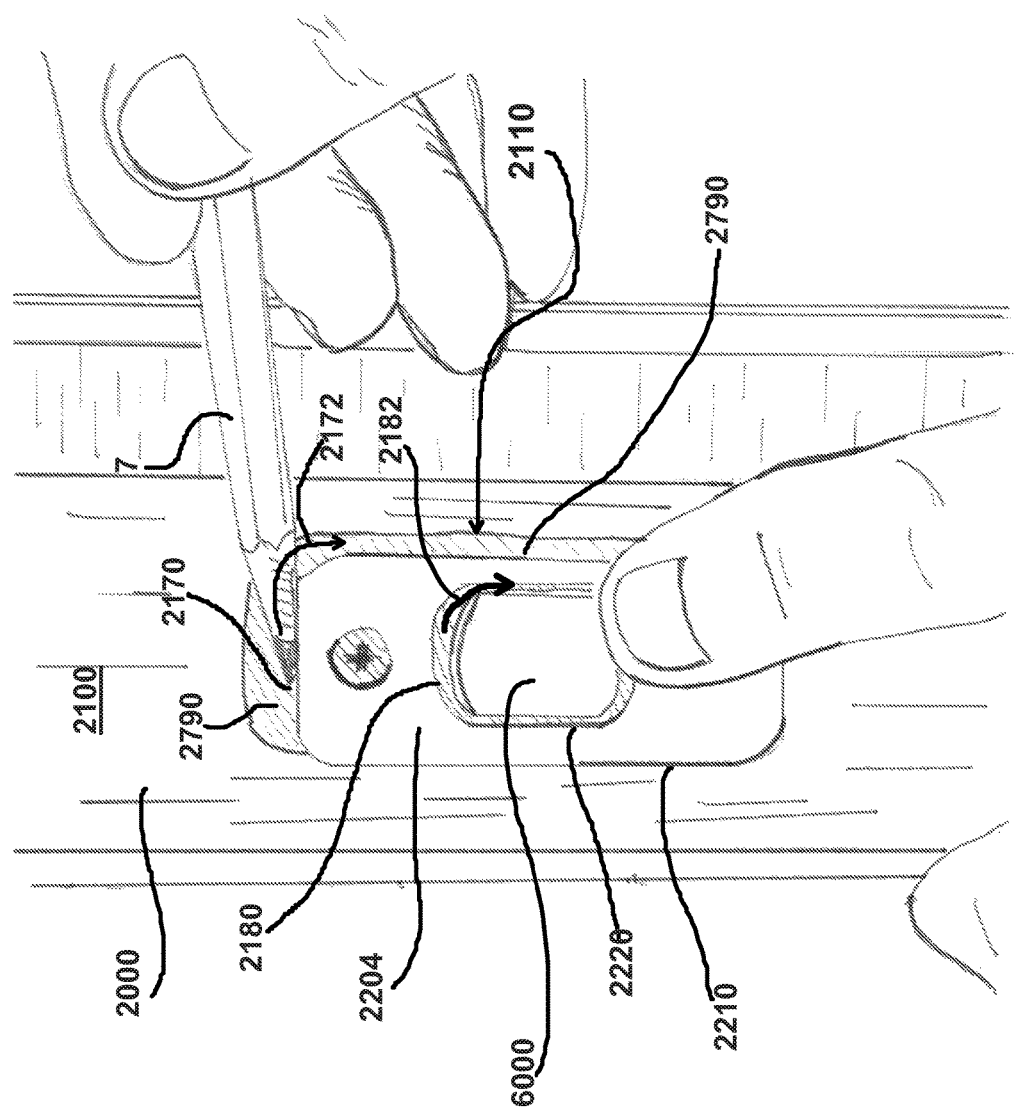
FIG. 33 is a perspective view of the door frame showing a deadbolt receiving plate placed around this transferred positioning member with the deadbolt plate being positioned and aligned based on the location of the positioning member, and schematically indicating that the installer is tracing both the exterior and interior perimeters of the now positioned and aligned deadbolt receiving plate.

FIG. 33 is a perspective view of the door frame 2000 showing a deadbolt receiving plate 2204 placed around this transferred positioning member 6000 with the deadbolt plate 2204 being positioned and aligned based on the location of the positioning member 6000, and schematically indicating that the installer is tracing both the exterior 2210 and interior 2220 perimeters of the now correctly positioned and aligned deadbolt receiving plate 2204.

Figure 34:
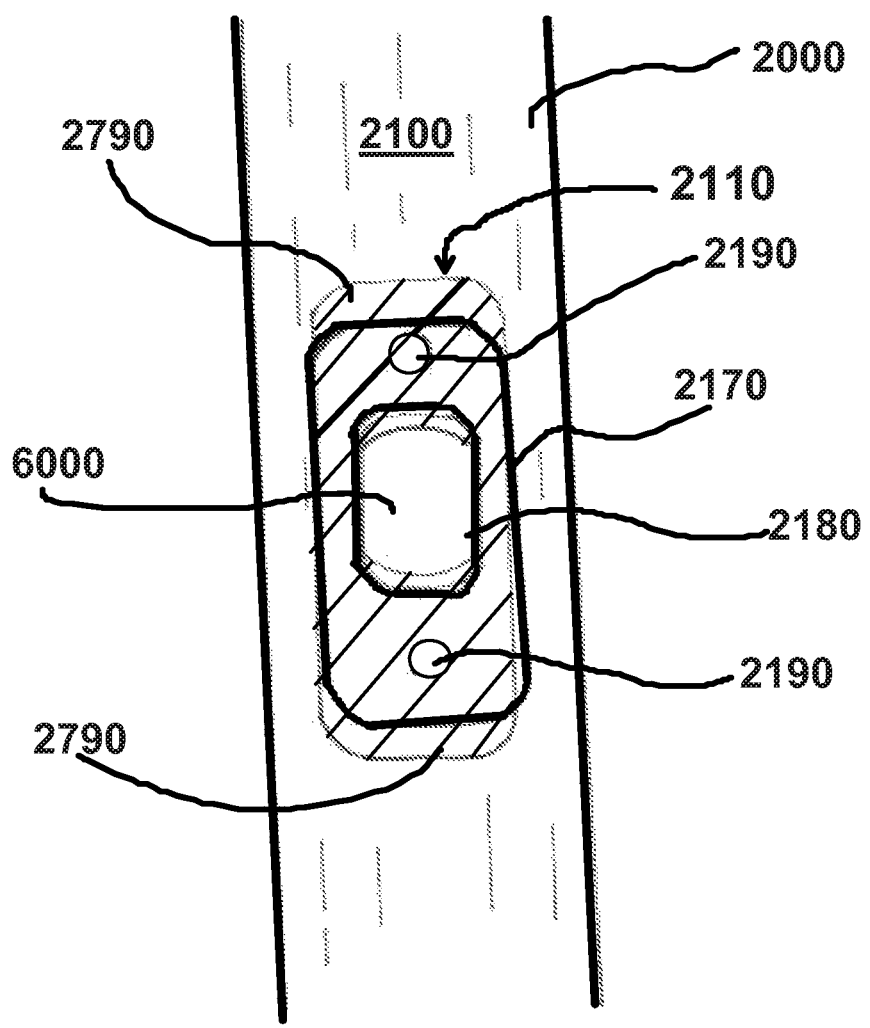
FIG. 34 shows the traced exterior perimeter and interior perimeter on the gap reducer being offset from the existing mortised area.

FIG. 34 shows the traced exterior perimeter 2210 and interior 2220 perimeter (respectively trace lines 2190 and 2780) on the gap reducer 2790 being offset from the existing mortised area 2110.

Figure 35:
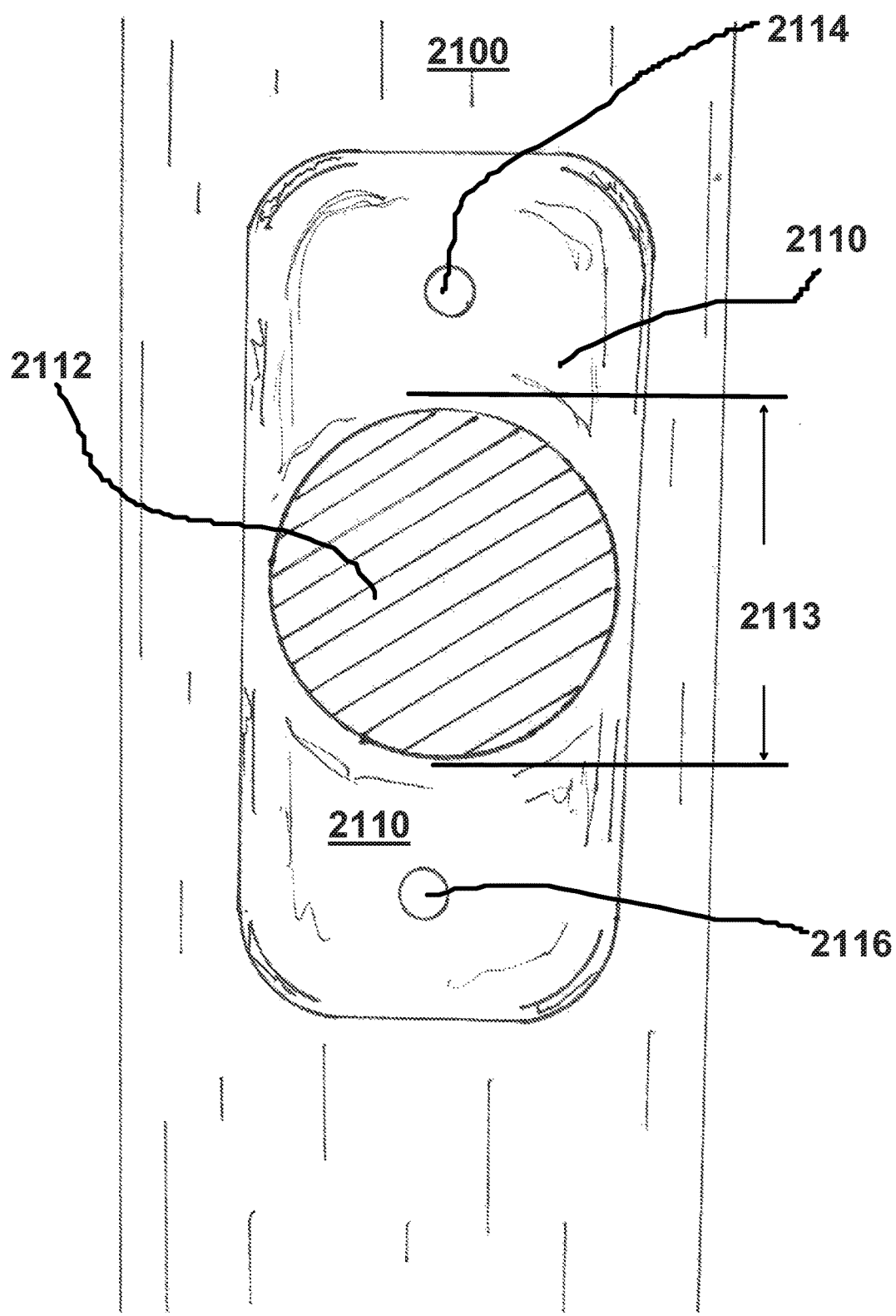
FIG. 35 is a perspective view of a door frame with an already installed deadbolt receiving plate and the deadbolt receiving plate having a large interior perimeter.

FIG. 35 is a perspective view of a door frame 2000 with an already installed mortised area 2110 for a deadbolt receiving plate 2204 and the deadbolt receiving plate 2204 having a large interior perimeter 2120 causing a large receiving bore 2112.

Figure 36:
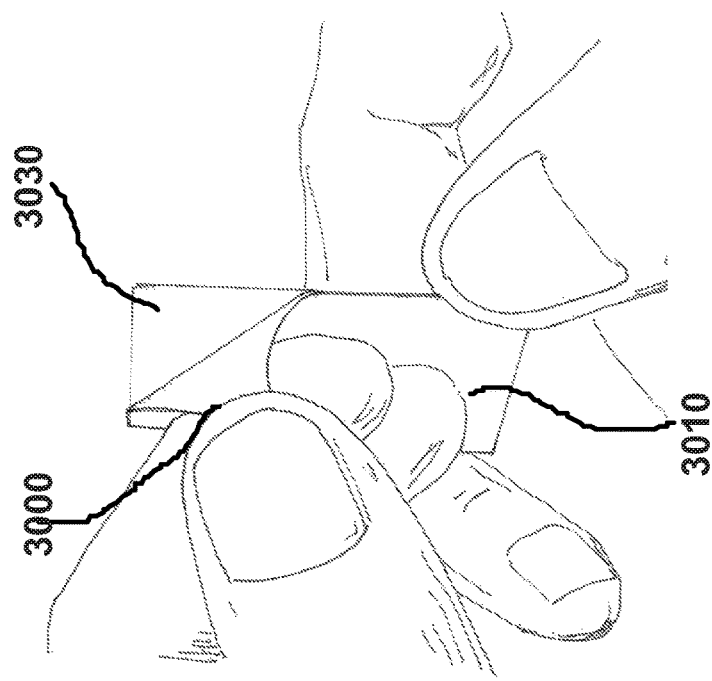
FIG. 36 is a perspective view showing a installing preparing a cover tape to be placed over at least a substantial portion of the deadbolt receiving plate to provide a receiving surface in case a substantial portion of the transferable positioning member lands interior to the interior portion of the interior perimeter of the deadbolt receiving plate.

FIG. 36 is a perspective view showing a installing preparing a cover or marking tape 3000 to be placed over at least a substantial portion of the existing mortised area 2110 for deadbolt receiving plate 2204 to provide a receiving surface in case a substantial portion of the transferable positioning member 6000 lands interiorly to the receiving bore 2112 of the interior perimeter of the deadbolt receiving plate. In various embodiments the cover or marking tape 3000 can have adhesive on both faces or sides—one side facilitating attachment to the door frame and the other side facilitating connection to the transferable positioning member of any of the embodiments disclosed herein. In various the adhesive can take the place of the adhesive on the transferable positioning member of any of the embodiments. In various embodiments the adhesive on the face of the cover or marking tape 3000 not attached to the door frame can also facilitate a temporary attachment of a strike plate 2200 or deadbolt receiving plate 2204 when positioning and aligning the strike plate 2200 or deadbolt receiving plate 2204 on the door frame 2000 to make positioning tracings of the exterior and/or interior openings of these plates (e.g., tracings 2170 and/or 2180). In various embodiments the cover or marking tape 3000 can be transparent and/or substantially translucent allowing a user to see behind the cover or marking tape 3000 when the cover or marking tape 3000 is placed on the door frame 2000. In various embodiments the transparency and/or translucency of the cover or marking tape 3000 can be used by an installer in properly positioning the item being installed on the door frame 2000 relative to existing mortised areas by allowing the user to see the portions of the existing mortised areas located behind the cover or marking tape 3000 (e.g., receiving bores 2112/2113 and/or screw holes 2114 and/or 2116). In various embodiments the cover or marking tape 3000 is strong enough to resist forces applied by the deadbolt during an extension of the deadbolt from the door when the positioning member is transferred from attachment to the deadbolt to attachment to the door frame.

Figure 37:
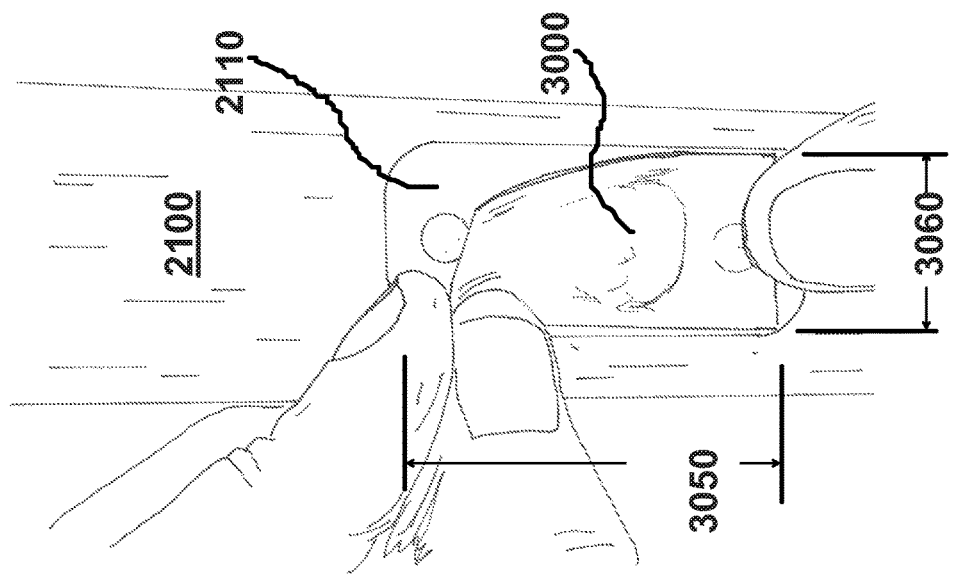
FIG. 37 is a perspective view showing an installer placing the cover tape over at least a substantial portion of the deadbolt receiving plate to provide a receiving surface in case a substantial portion of the transferable positioning member lands interior to the interior perimeter of the deadbolt receiving plate.

FIG. 37 is a perspective view showing an installer placing the cover tape 3000 over at least a substantial portion of the deadbolt receiving 2204 plate to provide a receiving surface in case a substantial portion of the transferable positioning member 6000 lands interior to the interior perimeter 2220 of the deadbolt receiving plate 2204.

Figure 38:
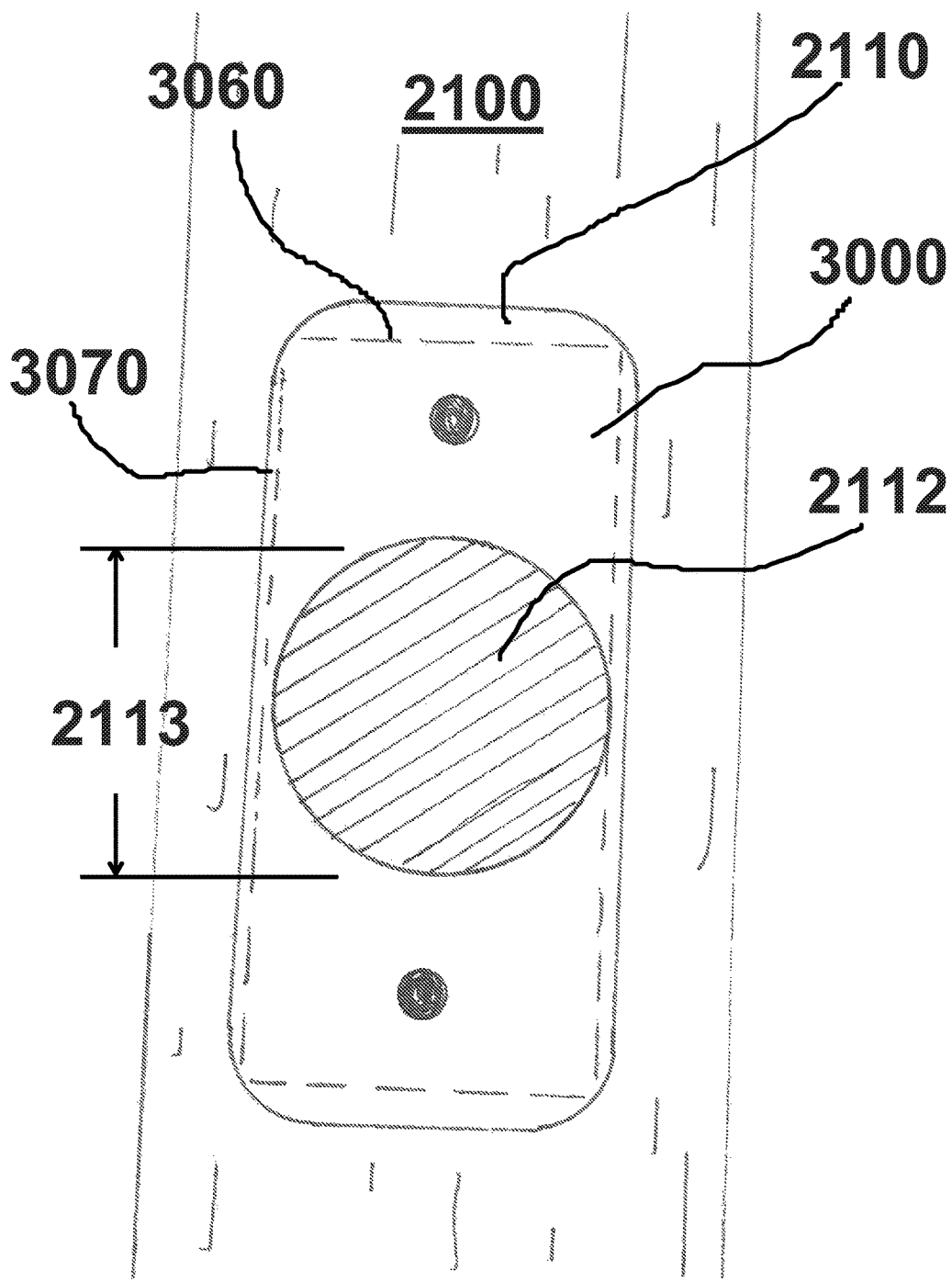
FIG. 38 is a perspective view the cover tape now placed over at least a substantial portion of the deadbolt receiving plate.

FIG. 38 is a perspective view the cover tape 3000 now placed over at least a substantial portion of the existing mortised area 2110 for the deadbolt receiving plate 2204.

Figure 39:
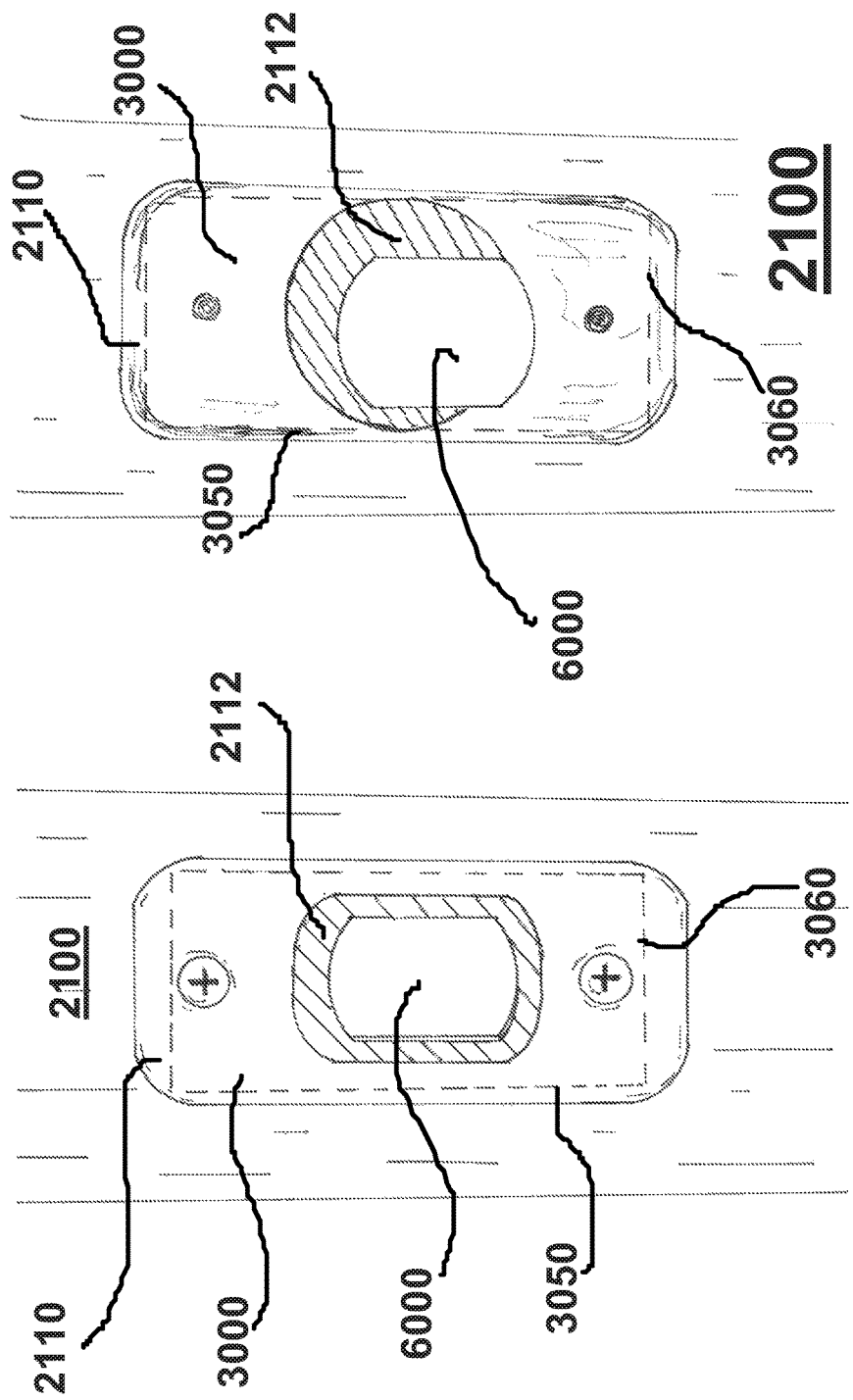
FIGS. 39A and 39B respectively show properly positioned and aligned and not properly positioned and aligned already installed deadbolt receiving plates on door frames after an "alignment testing" transferable positioning member placed on the deadbolt and being transferred using substantially the same steps as described above.

FIG. 39A shows properly positioned and aligned already installed deadbolt receiving plates 2204 on door frame 2000 after an "alignment testing" transferable positioning member 6000 placed on the deadbolt 2600 and being transferred using substantially the same steps as described above.

FIG. 39B shows a not properly positioned and aligned already installed existing mortised area 2110 for a deadbolt receiving plates 2204 on door frame 2000 after an "alignment testing" transferable positioning member 6000 placed on the deadbolt 2600 and being transferred using substantially the same steps as described above.

Figure 40:
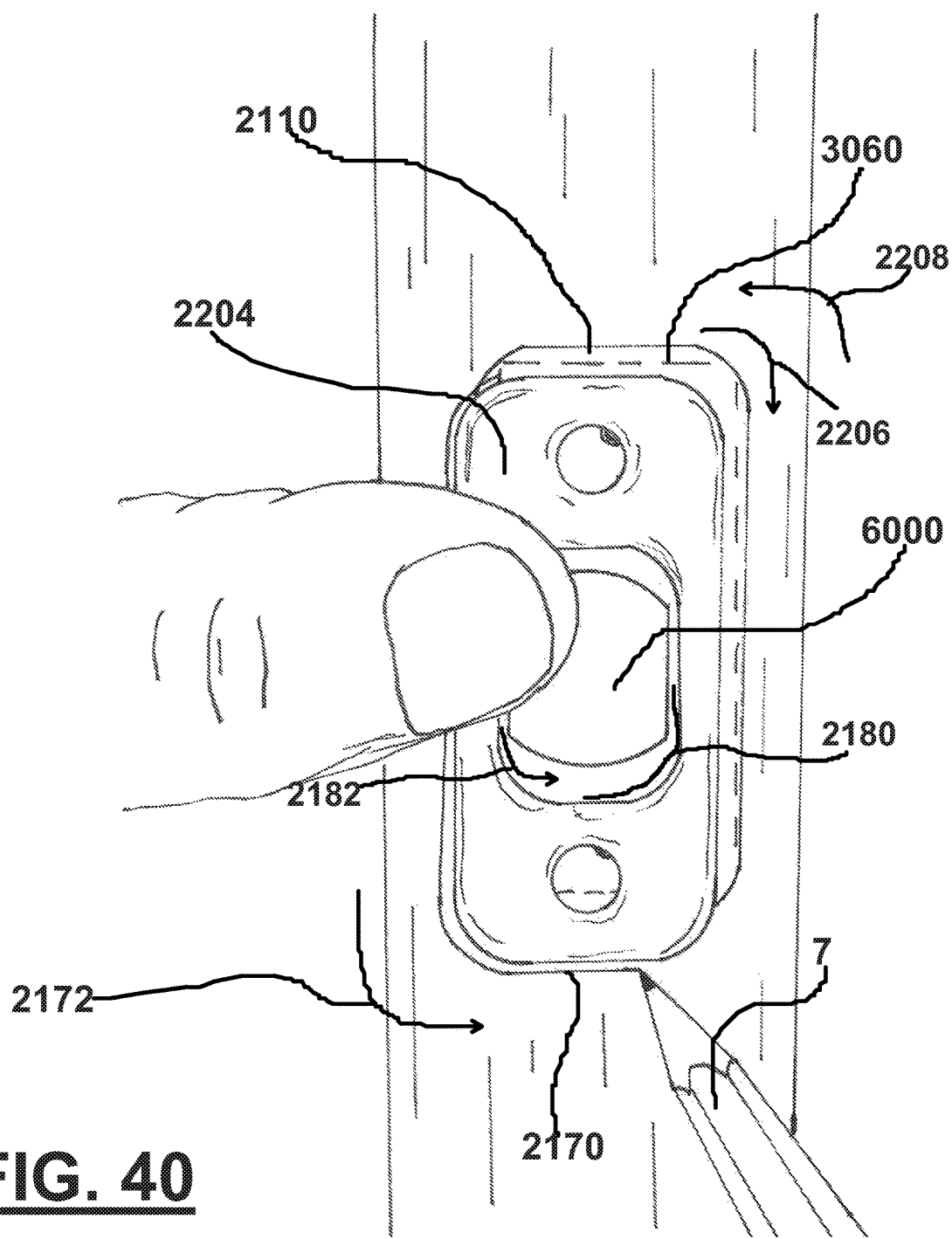
FIG. 40 is a perspective view of the door frame showing a deadbolt receiving plate placed around the transferred positioning member of FIG. 39B with the deadbolt plate being positioned and aligned based on the location of the positioning member, and schematically indicating that the installer is tracing both the exterior and interior perimeters of the now positioned and aligned deadbolt receiving plate.

FIG. 40 is a perspective view of the door frame 2000 showing a deadbolt receiving plate 2204 placed around the transferred positioning member 6000 with the deadbolt plate 2204 being positioned and aligned (schematically indicated by arrows 2206 and 2208) based on the location of the positioning member 6000, and schematically indicating that the installer is tracing (arrows 2172 and 2782) both the exterior (trace line 2170 for exterior perimeter 2210) and interior (trace line 2180 for interior perimeter 2220) perimeters of the now positioned and aligned deadbolt receiving plate 2204. Tracing of the interior perimeter 2220 (trace line 2180) is optional and an installer could choose to trace only the exterior perimeter 2210 (trace line 2170).

Figure 41:
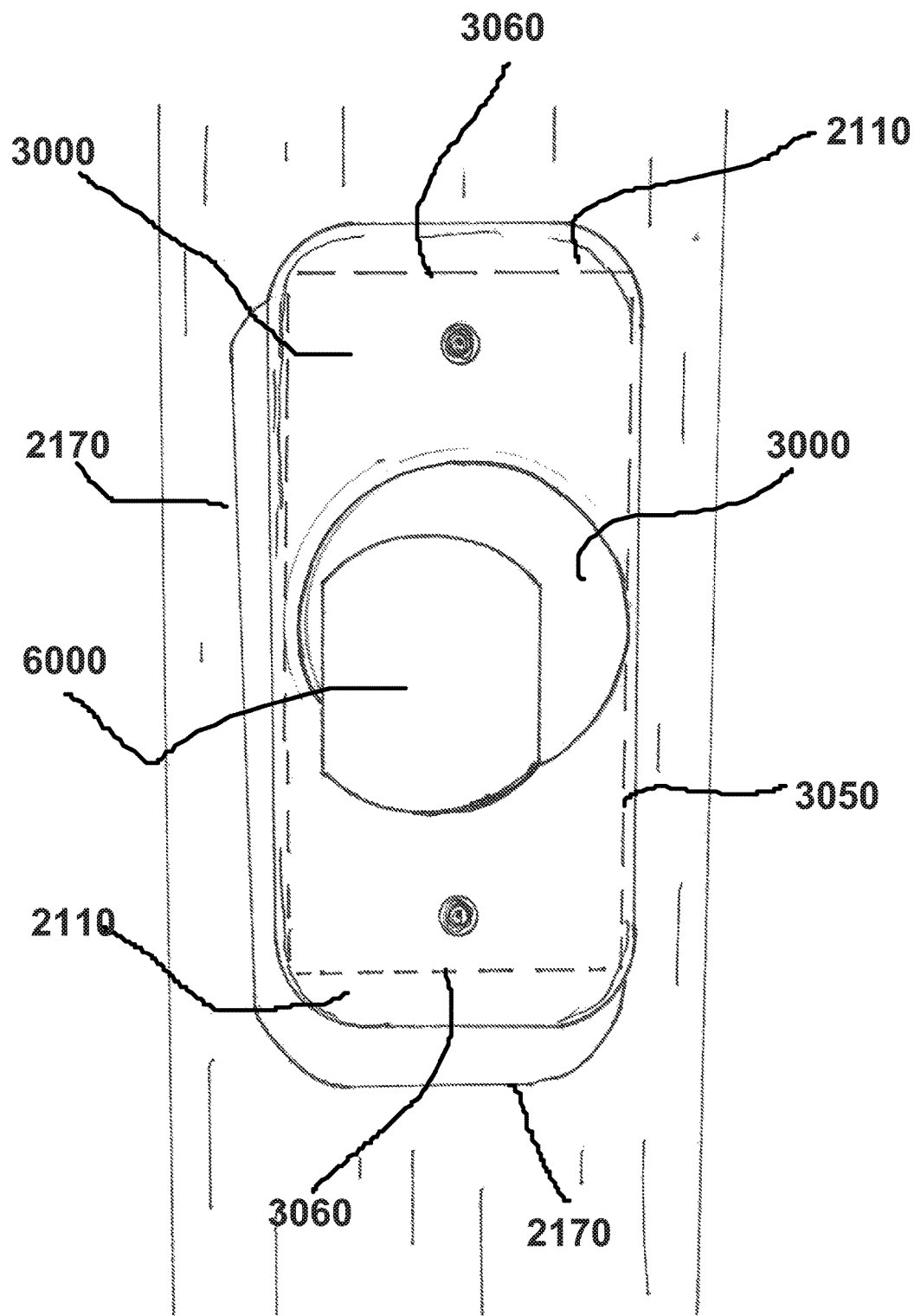
FIG. 41 shows the traced exterior perimeter on the frame being offset from the existing mortised area.

FIG. 41 shows the traced exterior perimeter on the frame 2000 being offset from the existing mortised area 2110. Traced exterior perimeter 2210 and interior 2220 perimeter (respectively trace lines 2190 and 2780) are shown on tape 300 being offset from the existing mortised area 2110. Transferred positioning member 600 is shown as a reference. Existing mortised area 2110 will have to be remortised to install correctly positioned and aligned deadbolt receiving plate 2204 providing remortised area 2110.

Figure 42:
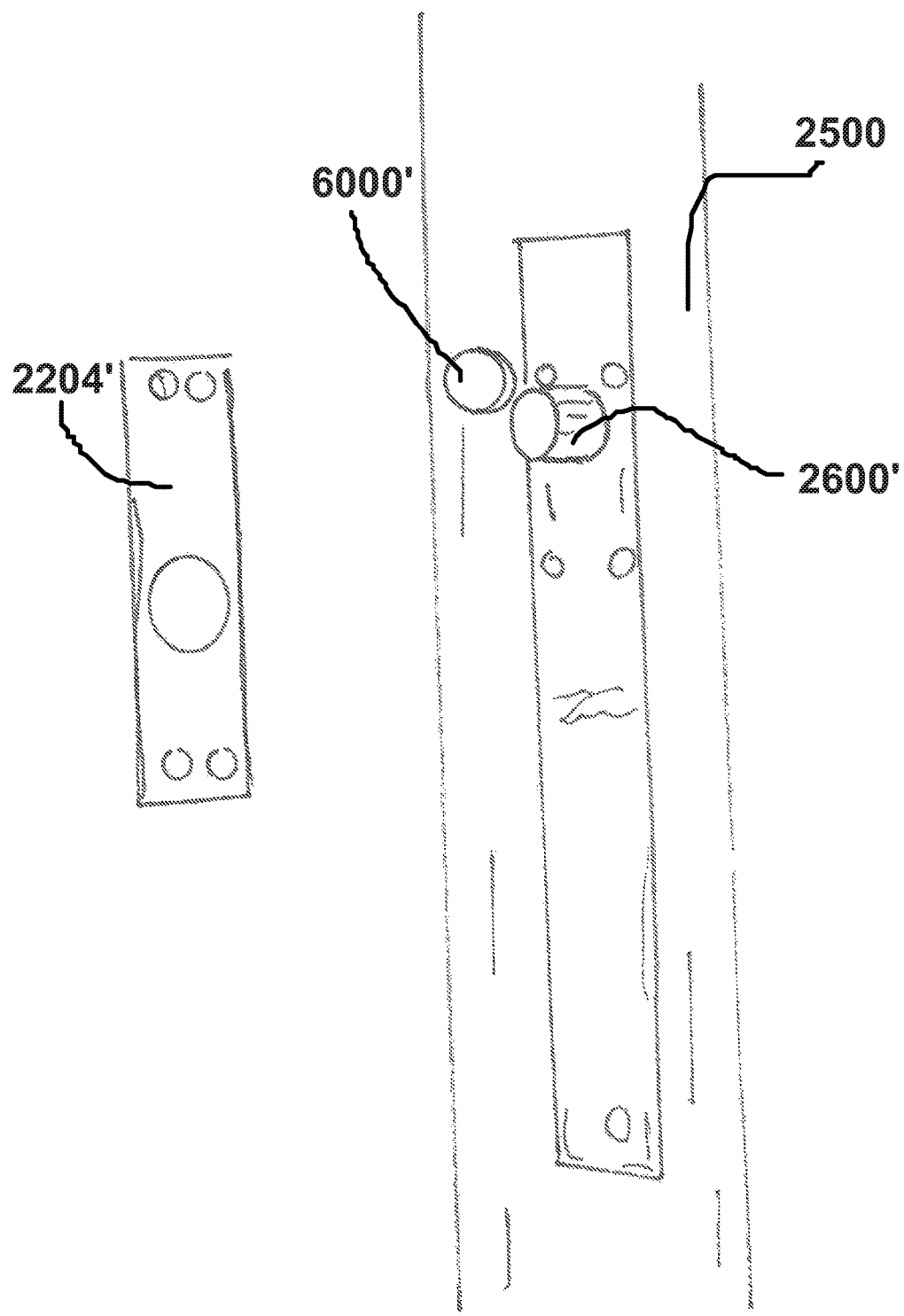
FIG. 42 is a perspective view of a drop bolt on a door frame and a drop bolt receiving plate on a door.

FIG. 42 is a perspective view of a drop bolt 2600' on a door frame 2000 and a drop bolt receiving plate 2204' on a door 2500. In this figure the transferable positioning member 6000' is shown round to substantially match the round shape of the drop bolt 2600'.

Figure 43:
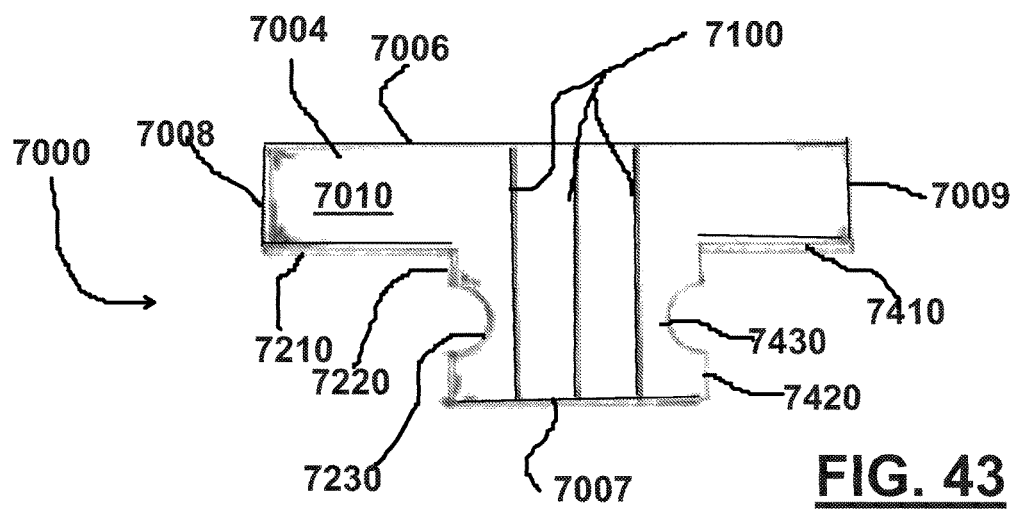
FIGS. 43 through 45 show front, rear, and side views of one embodiment of a latch bolt locator card which can be used for positioning and aligning a strike plate on a door frame.
Figure 44:
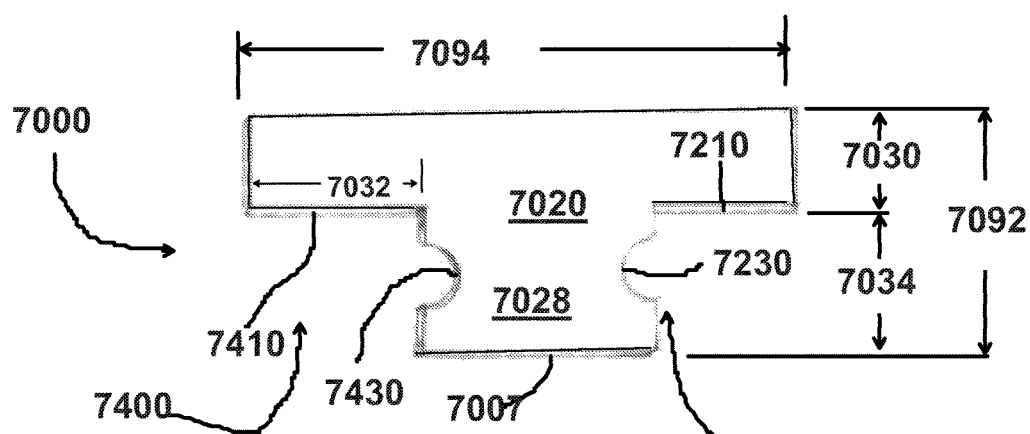
Figure 45:
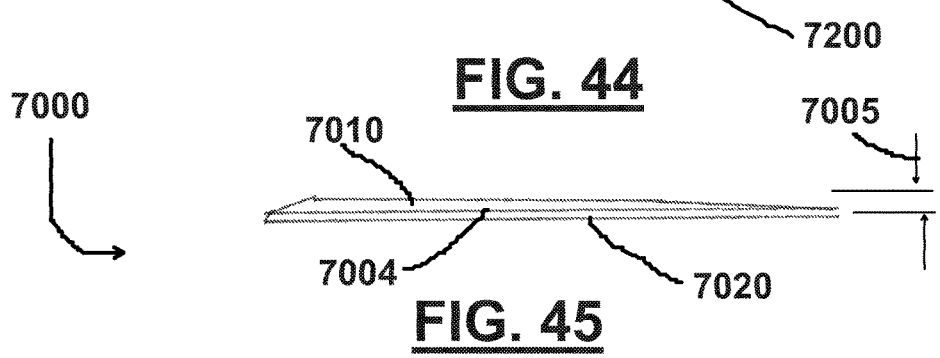

FIGS. 43 through 45 show front, rear, and side views of one embodiment of a latch bolt locator card 7000 which can be used for positioning and aligning a strike plate 2200 on a door frame 2000.

Figure 46:
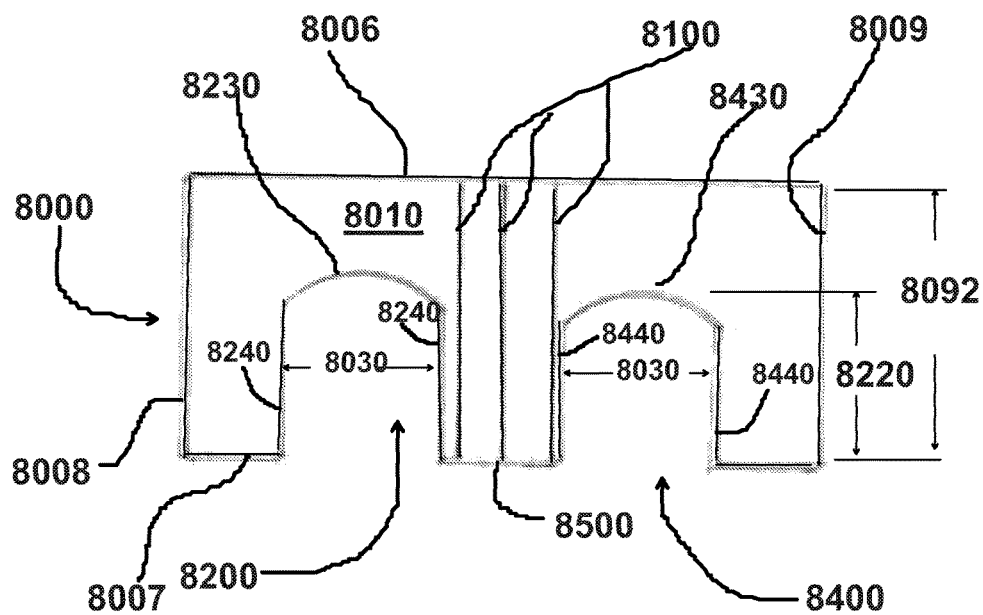
FIGS. 46 and 47 show front and rear views of one embodiment of a deadbolt locator card which can be used for positioning and aligning a deadbolt receiving plate on a door frame.
Figure 47:
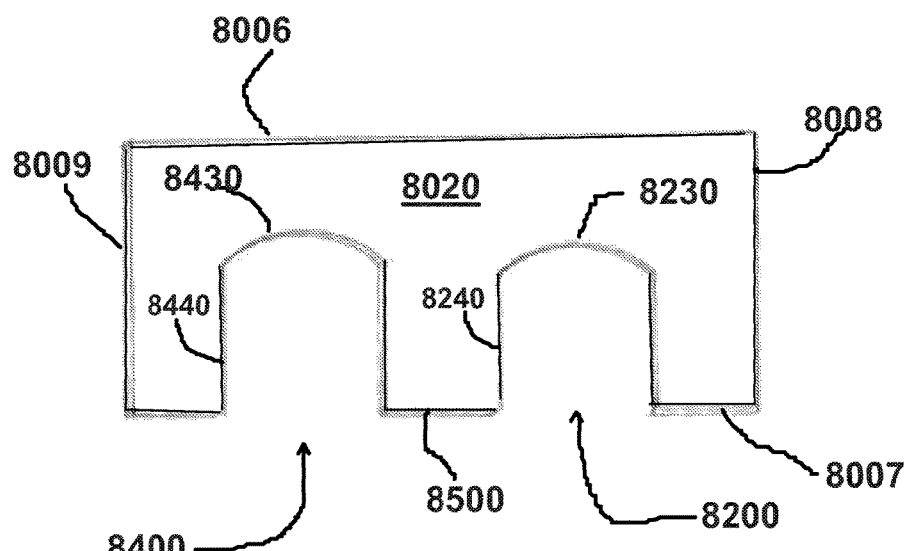

FIGS. 46 and 47 show front and rear views of one embodiment of a deadbolt locator card 8000 which can be used for positioning and aligning a deadbolt receiving plate 2204 on a door frame 2000.

Figure 48:
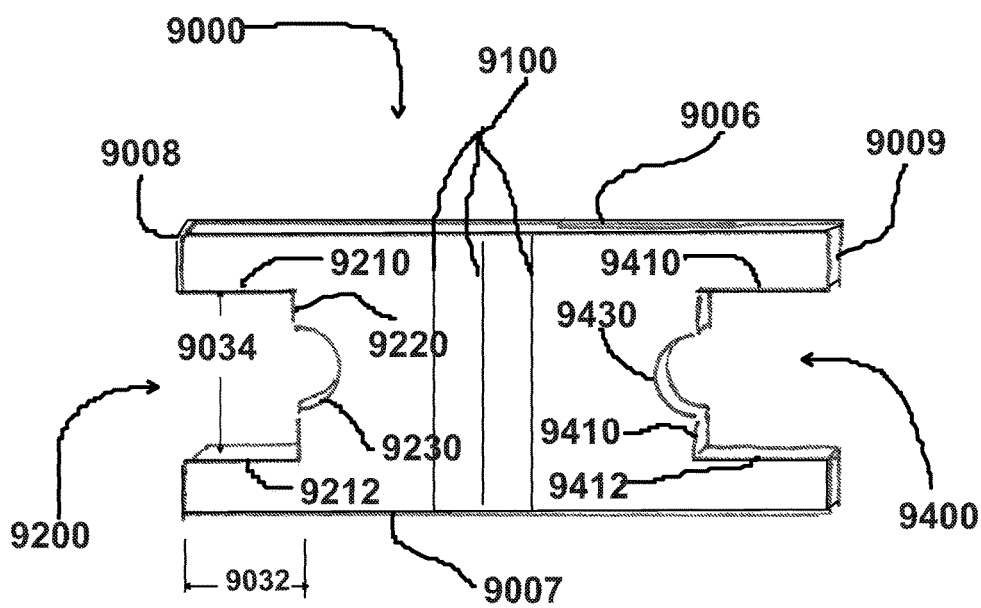
FIG. 48 is a rear view of another embodiment of a latch bolt locator card which can be used for positioning and aligning a strike plate on a door frame.

FIG. 48 is a rear view of another embodiment of a latch bolt locator card 9000 which can be used for positioning and aligning a strike plate 2200 on a door frame 2000.

Figure 49:
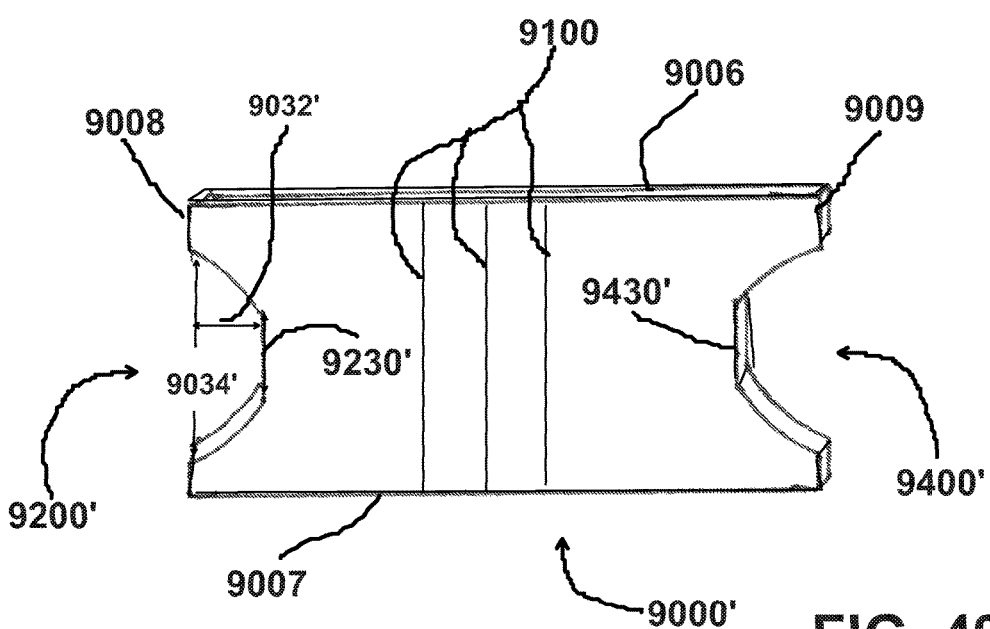
FIG. 49 is a rear view of another embodiment of a deadbolt locator card which can be used for positioning and aligning a deadbolt receiving plate on a door frame.

FIG. 49 is a rear view of another embodiment of a deadbolt locator card 9000' which can be used for positioning and aligning a deadbolt receiving plate 2204 on a door frame 2000.

Figure 50:
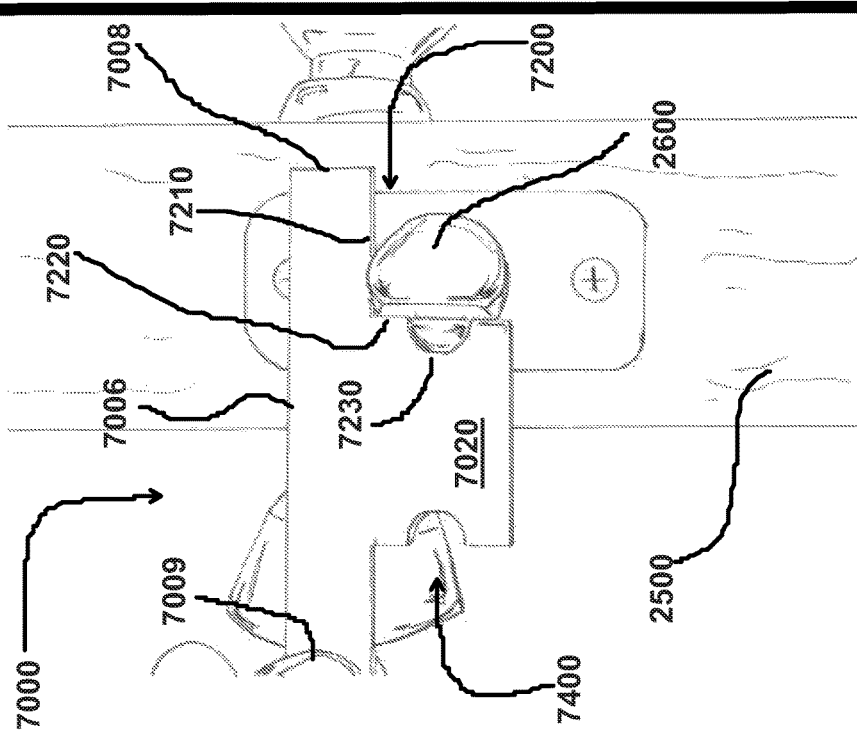
FIG. 50 is a perspective view showing the latch bolt locator card of FIGS. 43 through 45 (before the adhesive liner is removed from the card) positioned around the latch bolt of the door and illustrating how the card is dimensioned to fit snugly around the latch bolt.

FIG. 50 is a perspective view showing the deadbolt locator card 7000 (before the adhesive liner 7050 is removed from the card 7000) positioned around the latch bolt 2600 of the door 2500 and illustrating how the card 7000 is dimensioned to fit snugly around the latch bolt 2600.

In various embodiments the methods further comprise wherein in step "a" a plurality of positioning members or marking apparatuses 6000,6000',6000",6000''', etc. are provided each have generally the same perimeter shape and size of a latch bolt 2600.

In various embodiments the methods can include the step of providing a plurality of positioning members or marking apparatuses 6000,6000',6000",6000''', etc. each having generally the same perimeter shapes and sizes of a plurality of varying types of latch bolts 2600, 2600', 2600", 2600''', etc., the plurality of latch bolts 2600, 2600', 2600", 2600''', etc., having different shapes and/or sizes including rectangular, square, and/or round shapes, and/or these shapes themselves having rounded edges.

In various embodiments plurality of positioning members 6000,6000',6000",6000''', etc. match a plurality of latch bolts 2600, 2600', 2600", 2600''', etc. of varying sizes and/or shapes. In various embodiments the shapes and/or sizes of the plurality of latch bolts 2600, 2600', 2600", 2600', etc. can vary for different manufacturers or different model numbers.

In various embodiments positioning members 6000, 6000',6000",6000''', etc. can have perimeter shapes which match a set of latch bolts 2600, 2600', 2600", 2600''', etc. having varying roundnesses between the members of the set.

Figure 51:
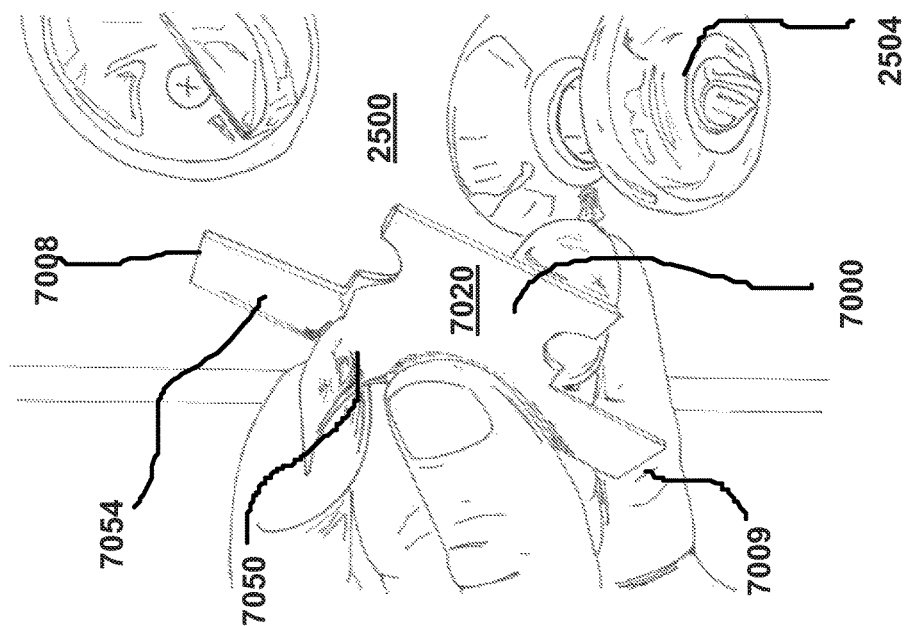
FIG. 51 is a perspective view showing the liner being removed from the latch bolt locator card of FIGS. 43 through 45 exposing adhesive on the locating card.

FIG. 51 is a perspective view showing the liner 7050 being removed from the latch bolt locator card 7000 exposing adhesive 7054 on the locating card 7000.

Figure 52:
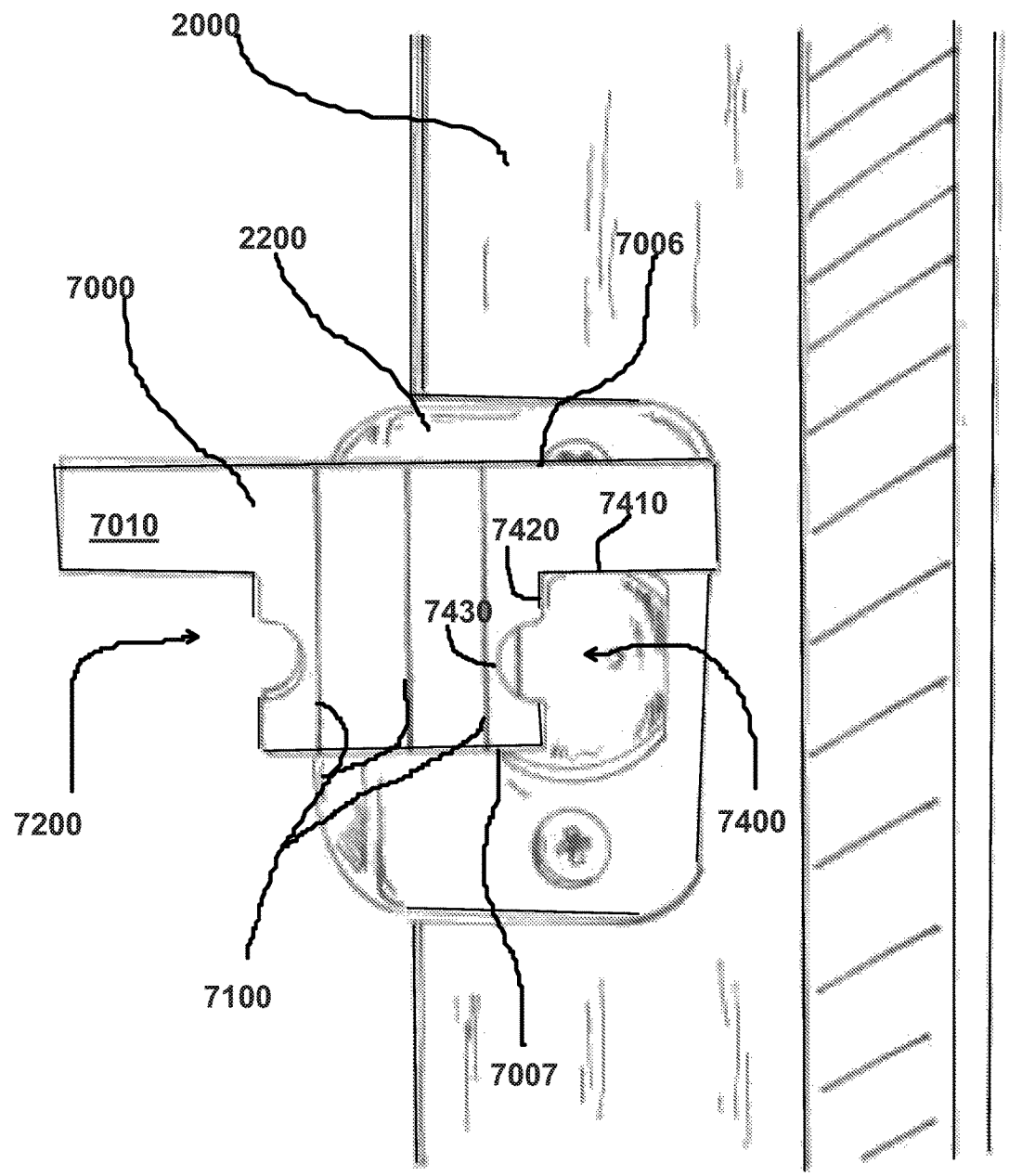
FIG. 52 is a perspective view of the latch bolt locator card of FIGS. 43 through 45 now attached to the door frame over a strike plate previously installed in the door frame in a previously mortised area, with this view showing the front of the locator card which has one or more vertical lines which assist an installer in leveling and/or aligning the locator card relative to vertical orientations of the door frame.

FIG. 52 is a perspective view of the latch bolt locator card 7000 now attached to the door frame 2000 over a strike plate 2200 previously installed in the door frame 2000 in a previously mortised area 2210, with this view showing the front 7010 of the locator card 7000 which has one or more vertical lines 7100 which assist an installer in leveling and/or aligning the locator card 7000 relative to vertical orientation of the door frame 2000.

Figure 53:
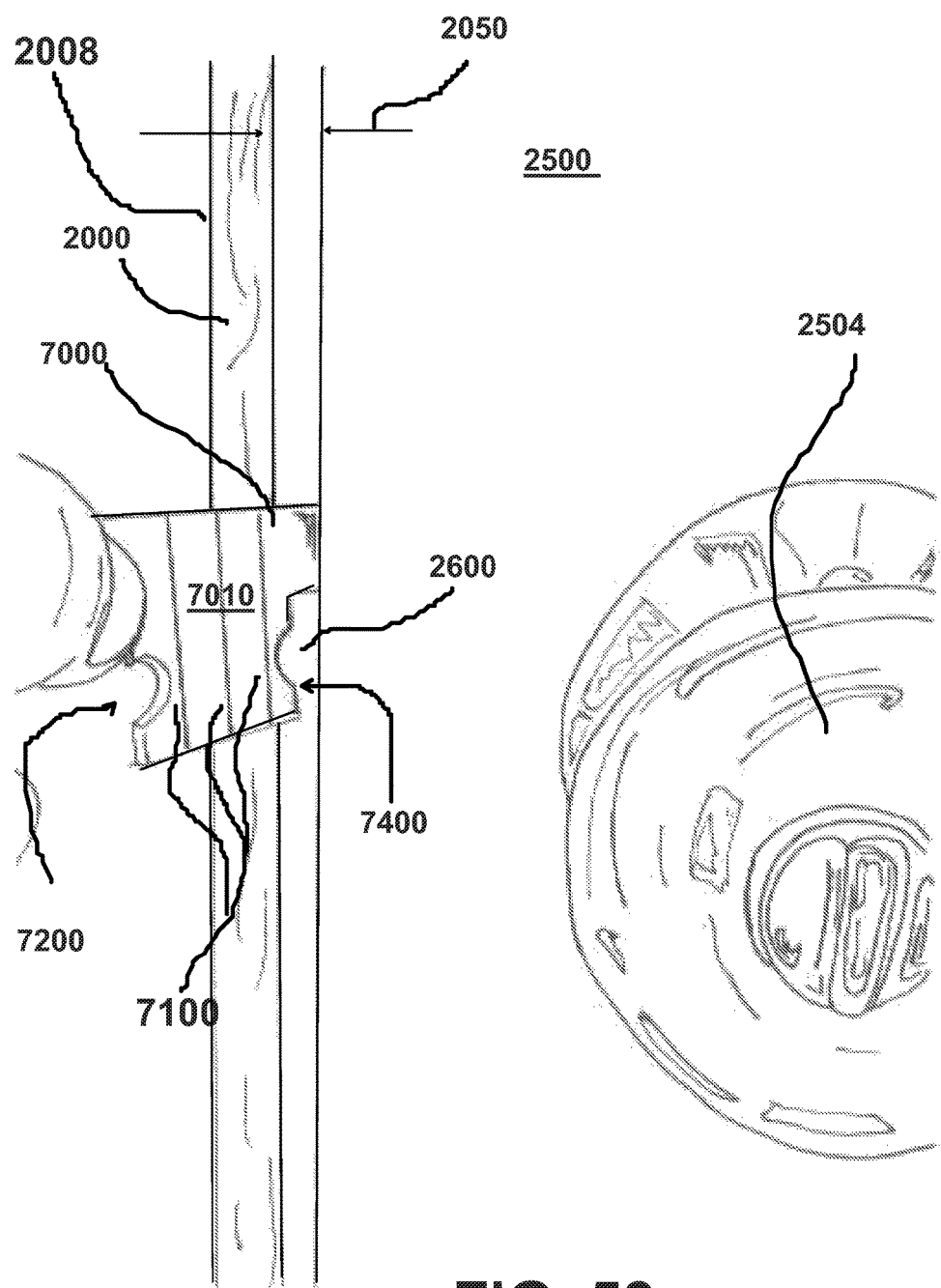
FIG. 53 is a perspective view of the latch bolt locator card of FIGS. 43 through 45 and schematically illustrating the step of the locator card being inserted into the gap between a closed door and its door fame while above the latch bolt extending out of the door, and showing the steps of the locator card being lowered in the gap until the card contacts the top of the latch bolt, and being horizontally pushed into the gap until the card contacts the side of the latch bolt, and with the installer using the one or more vertical lines on the front of the card to vertically align the card relative to the door frame.

FIG. 53 is a perspective view of the latch bolt locator card 7000 and schematically illustrating the step of the locator card 7000 being inserted into the gap 2050 between a closed door 2500 and its door fame 2000 while above the latch bolt 2600 extending out of the door 2500, and showing the steps of the locator card 7000 being lowered in the gap 2050 until the card 7000 contacts the top of the latch bolt 2600, and being horizontally pushed into the gap 2050 until the card 7000 contacts the side of the latch bolt 2600, and with the installer using the one or more vertical lines 7100 on the front 7010 of the card 7000 to vertically align the card 7000 relative to the door frame 2000. Preferably card 7000 both contacts and hugs the latch bolt 2600 so that the latch bolt 2600 tends to align both the vertical and horizontal orientation of the locator card 7000. In various embodiments both sides 7410 and 7420 of the area 7400 to fit the latch bolt 2600 are in contact with the latch bolt 2600 to assist in aligning the card 7000 while the door 2500 is closed in the door frame 2000.

Body 7004 can have a thickness 7091. Thickness 7091 can be about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.5, 2.6, 2.7, 2.8, 2.9, 3, and 4 millimeters. In various embodiments thickness can fall within a range of any two of the above referenced possible thickness dimensions.

Figure 54:
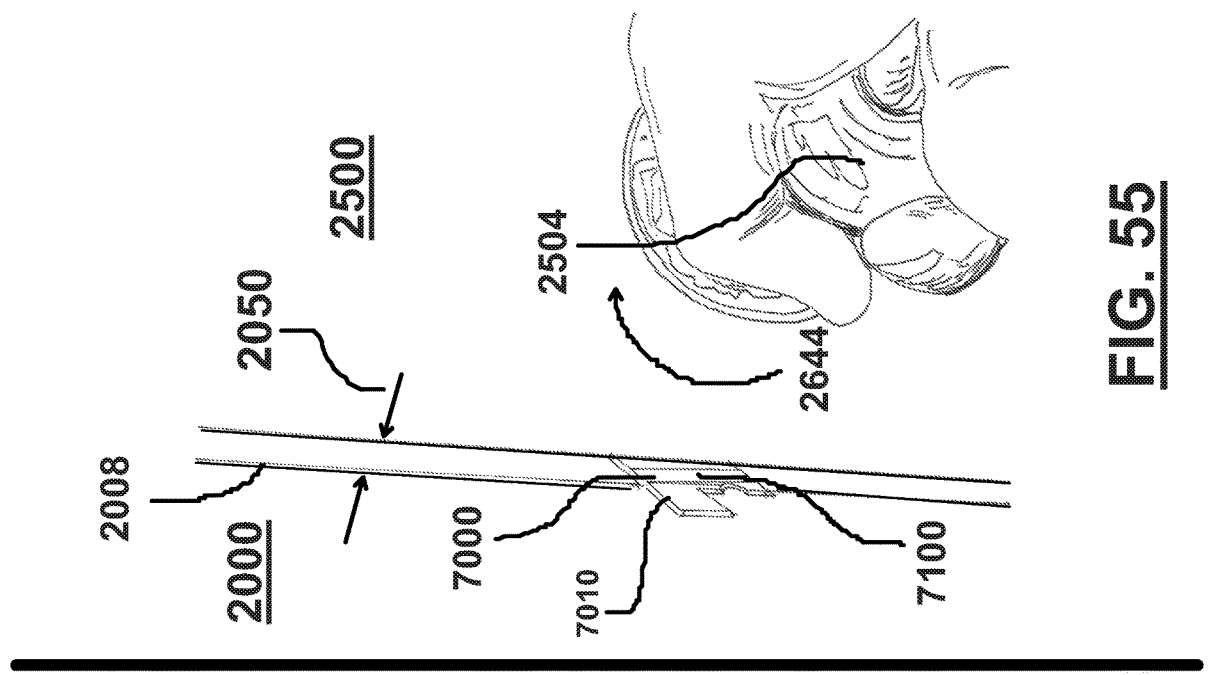
FIG. 54 is a perspective view of the latch bolt locator card of FIGS. 43 through 45 schematically illustrating the step of an installer using a tool to bias the locator card against the door frame so that the card will attach to the door frame with the adhesive on the card (such as by using a putty knife or other tool).

FIG. 54 is a perspective view of the latch bolt locator card 7000 schematically illustrating the step of an installer using a tool 100 to bias the locator card 7000 against the door frame 2000 so that the card 7000 will attach to the door frame 2000 with the adhesive 7054 on the card 7000 (such as by using a putty knife or other tool).

Figure 55:
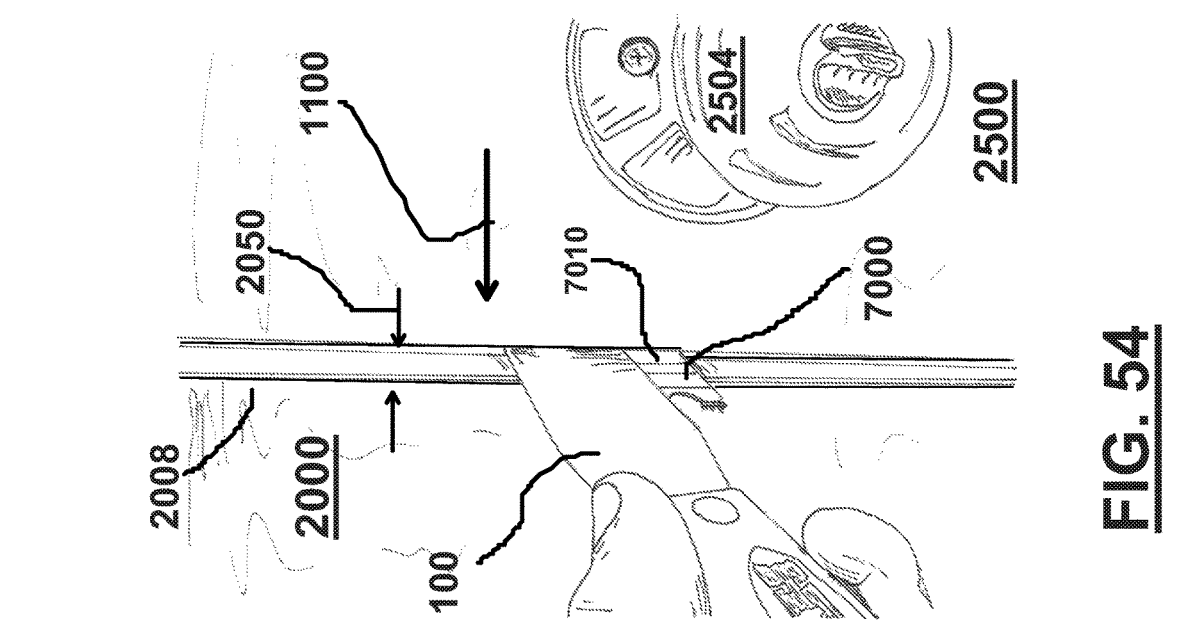
FIG. 55 is a perspective view of the latch bolt locator card of FIGS. 43 through 45 schematically illustrating the step of, after the locator card has been attached to the door frame, the installer can retract the latch bolt and open the door.

FIG. 55 is a perspective view of the latch bolt locator card 7000 schematically illustrating the step of, after the locator card 7000 has been attached to the door frame 2000, the installer can retract the latch bolt 2600 and open the door 2500.

Figure 56:
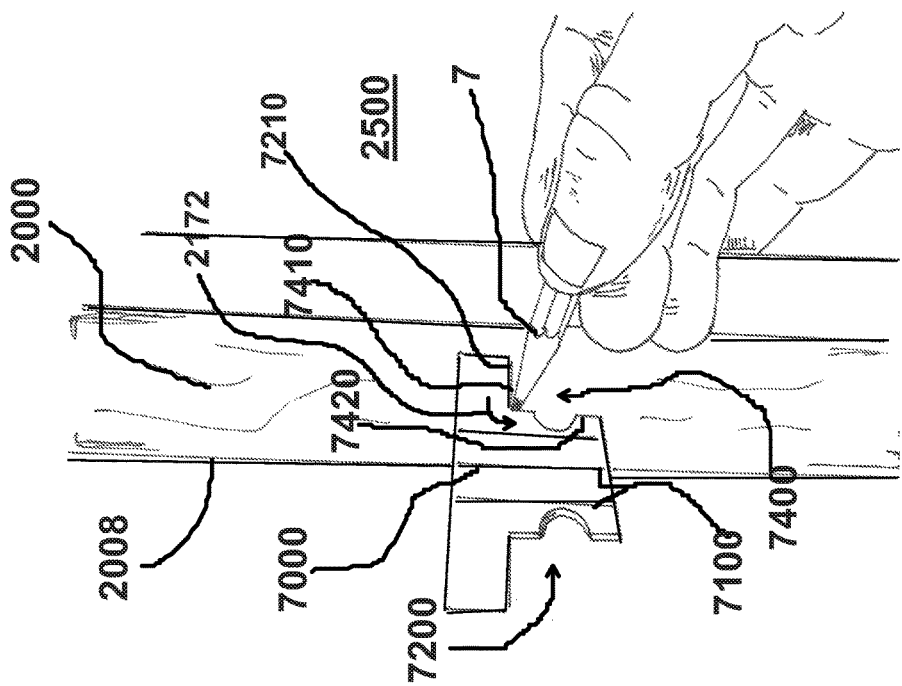
FIG. 56 is a perspective view of the latch bolt locator card of FIGS. 43 through 45 schematically illustrating the step of, after the locator card has been attached to the door frame and the door opened, the installer use the locator card now attached to the door frame to make positioning marks or indicia for installing a strike plate, such as by tracing a part of the shape of the locator card onto the door frame.

FIG. 56 is a perspective view of the latch bolt locator 7000 schematically illustrating the step of, after the locator card 7000 has been attached to the door frame 2000 and the door 2500 opened, the installer use the locator card 7000 now attached to the door frame 2000 to make positioning marks or indicia (e.g., positioning marks 7600) for installing a strike plate 2200, such as by tracing a part of the shape (e.g., from second area of 7400) of the locator card 7000 onto the door frame 2000.

Figure 57:
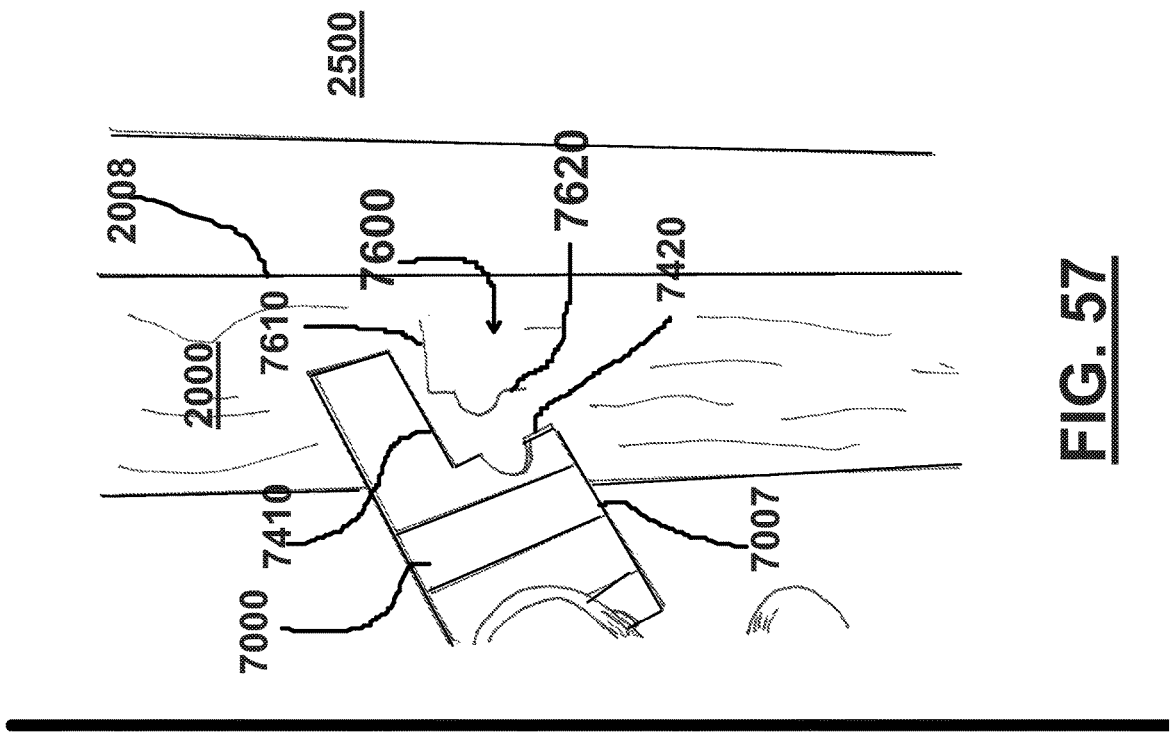
FIG. 57 is a perspective view of the latch bolt locator card of FIGS. 43 through 45 schematically illustrating the step of removing the locator card from the door frame to reveal the positioning marks or indicia made in the earlier step.

FIG. 57 is a perspective view of the latch bolt locator card 7000 schematically illustrating the step of removing the locator card 7000 from the door frame 2000 to reveal the positioning marks or indicia 7600 made in the earlier step, including first 7610 and second 7620 positioning marks.

Figure 58:
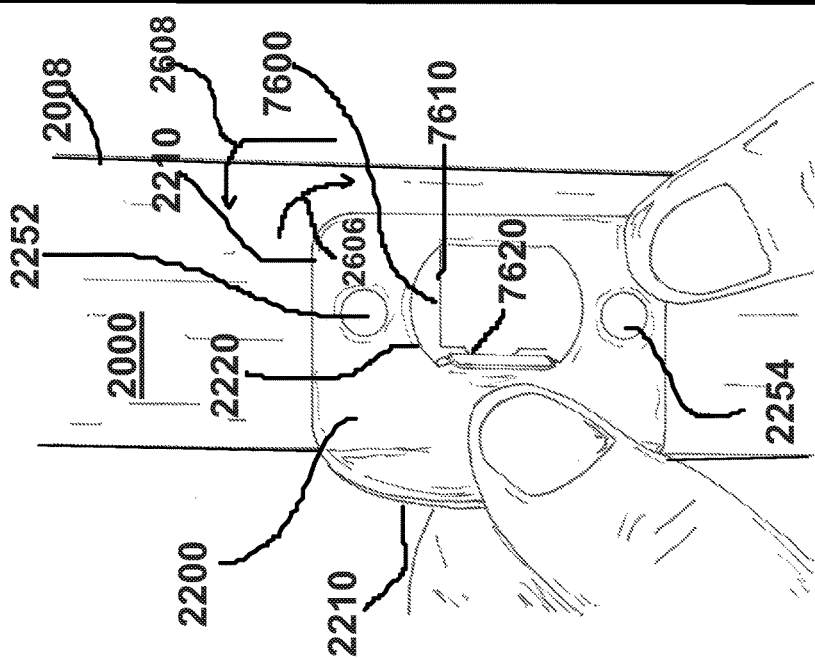
FIG. 58 is a perspective view of the door frame with the positioning marks or indicia made in the earlier step and showing an installer positioning a strike plate around the positioning marks or indicia with the positioning marks or indicia being used to both position and align the strike plate on the door frame.

FIG. 58 is a perspective view of the door frame 2000 with the positioning marks or indicia 7600 made in the earlier step and showing an installer positioning a strike plate 2200 around the positioning marks or indicia 7600 with the positioning marks or indicia being used to both position and align the strike plate on the door frame (an installer using positioning marks or indicia to correctly position and align strike plate 2200 on door frame 2000 for receiving latch bolt 2600 is schematically indicated by arrow 2206 and 2208).

Figure 59:
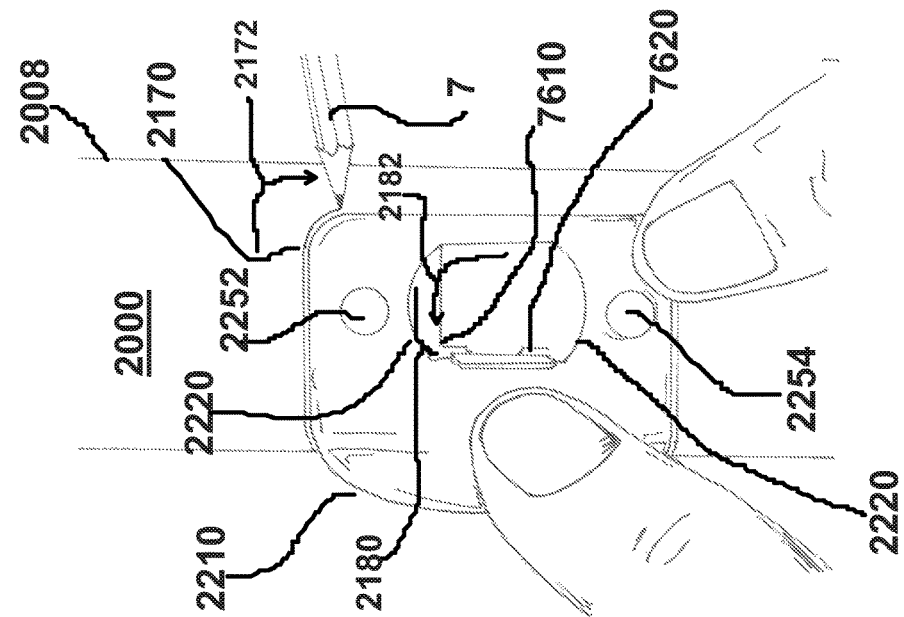
FIG. 59 is a perspective view of the door frame showing an installer tracing around the outside perimeter of the now positioned and aligned strike plate, and schematically indicating that the installer will also trace around the inside perimeter of the strike plate.

FIG. 59 is a perspective view of the door frame 2000 showing an installer tracing around the outside perimeter 2210 of the now positioned and aligned strike plate 2200 (tracing schematically indicated by arrow 2172) to create a trace line 2170, and also schematically indicating that the installer will also trace around the inside perimeter 2220 of the strike plate 2200 to create a trace line 2180 (tracing schematically indicated by arrow 2182).

Figure 60:
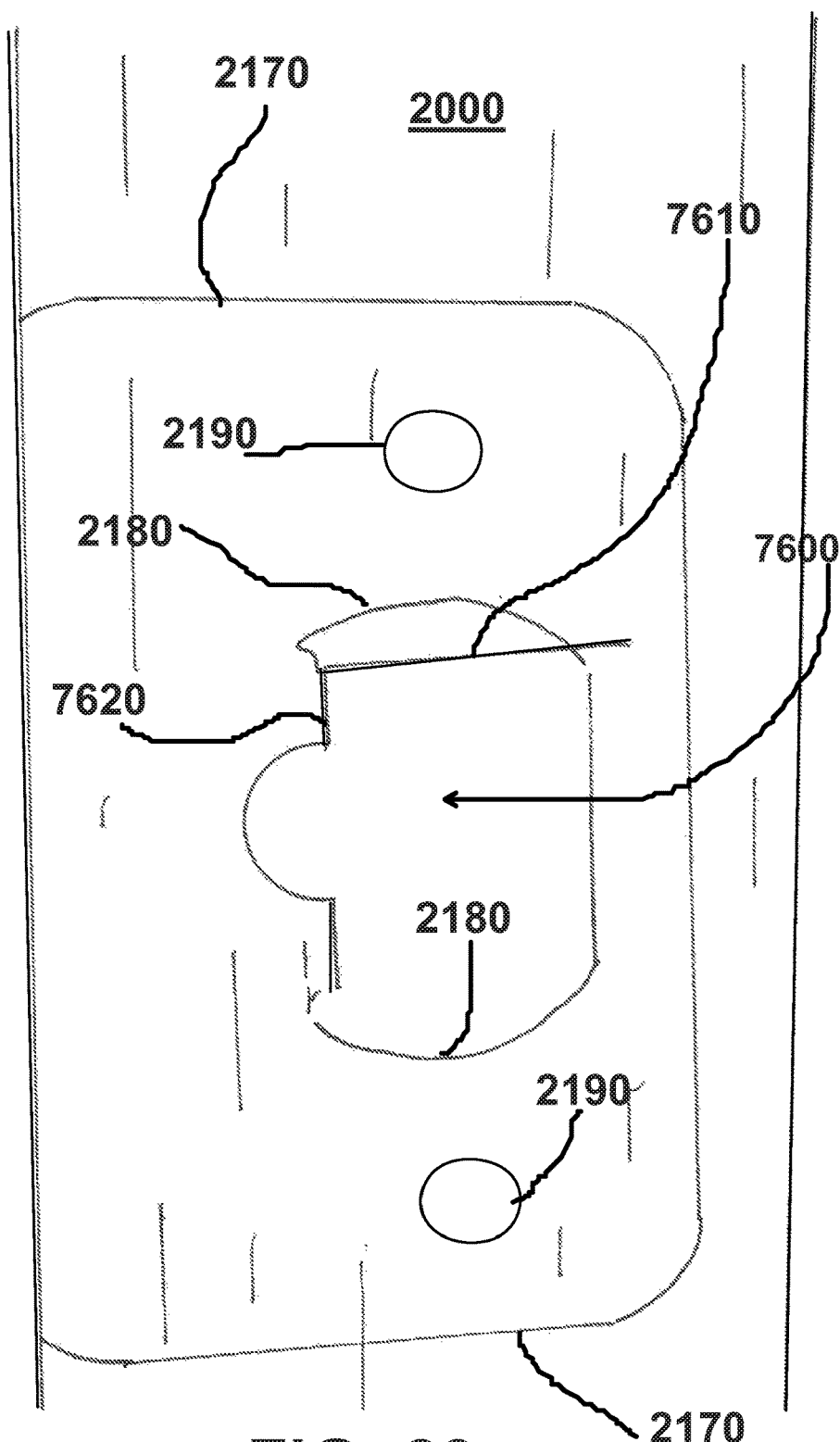
FIG. 60 is a perspective view showing the traced outside and inside perimeters of the strike plate to be mortised, along with showing the positioning marks or indicia.

FIG. 60 is a perspective view showing the traced outside 2170 and inside 2180 perimeters (2210 and 2220) of the strike plate 2200 area to be mortised, along with showing the positioning marks or indicia 7600.

Figure 61:
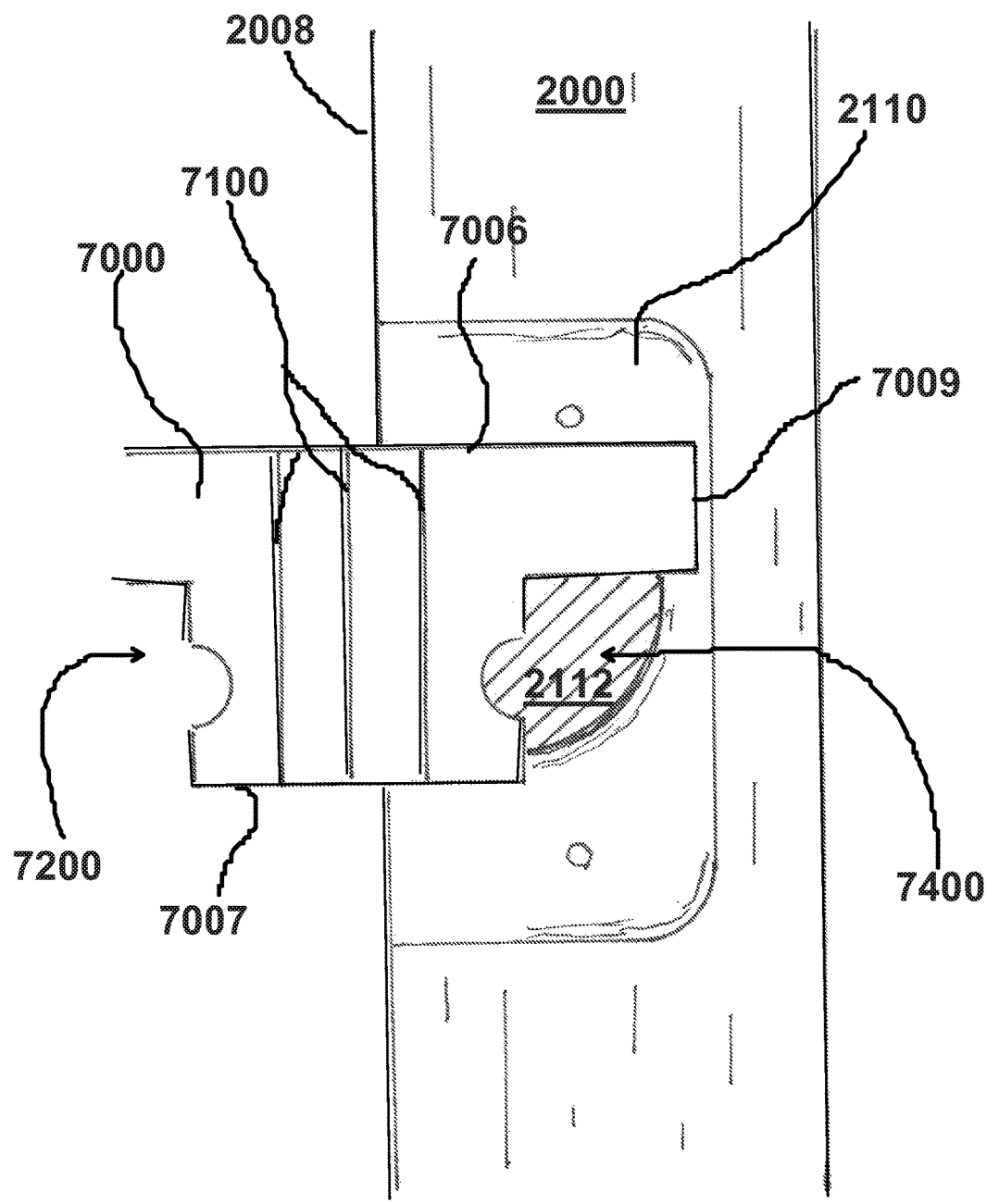
FIG. 61 is a perspective view of the latchbolt locator card of FIGS. 43 through 45 schematically illustrating the step of checking the position and alignment of an already mortised area in the door frame for a strike plate (which may have been previously installed in the door frame), where the already mortised area is either not correctly positioned and/or aligned for the strike plate to receive the latch bolt from the door when the door is closed in the door frame. The steps described in explaining FIGS. 53 through 55 can be used to arrive at the positioned and aligned locator card shown in FIG. 61.

FIG. 61 is a perspective view of the latch bolt locator card 7000 schematically illustrating the step of checking the position and alignment of an already mortised area 2110 in the door frame 2000 for a strike plate 2200 (which may have been previously installed in the door frame 2000), where the already mortised area 2210 is either not correctly positioned and/or aligned for the strike plate 2200 to receive the latch bolt 2600 from the door 2500 when the door 2500 is closed in the door frame 2000. The steps described in explaining FIGS. 53 through 55 can be used to arrive at the positioned and aligned locator card 7000 shown in this FIG. 61.

Figures 62, 63:
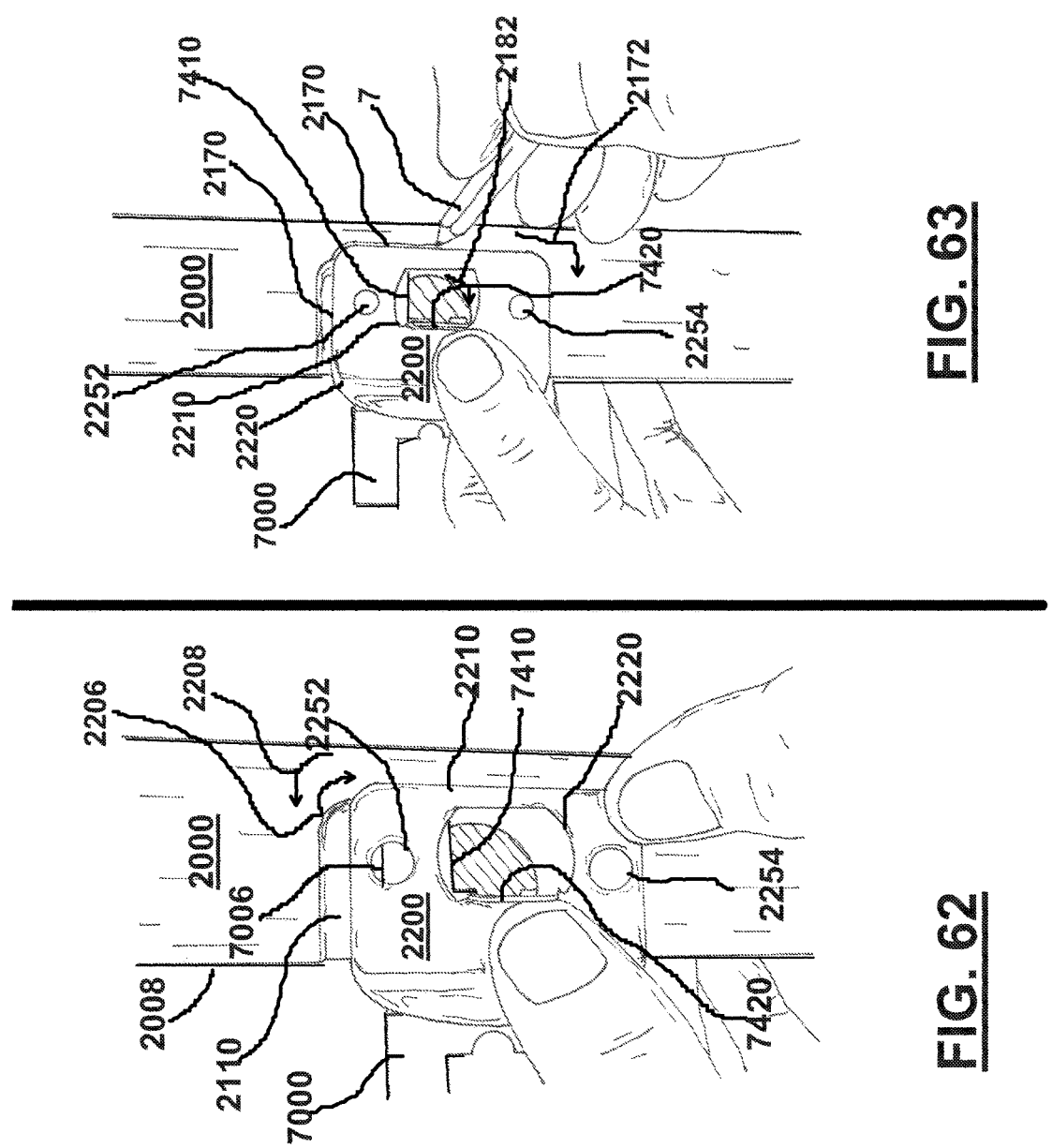
FIG. 62 is a perspective view of the door frame with the locator card attached to the door frame in FIG. 61 and showing an installer positioning and aligning relative to the door frame a strike plate based on the position and orientation of the locator card on the door frame.
FIG. 63 is a perspective view of the door frame showing an installer tracing around the outside perimeter of the now positioned and aligned strike plate, and schematically indicating that the installer will also trace around at least a portion of the inside perimeter of the strike plate.

FIG. 62 is a perspective view of the door frame 2000 with the locator card 7000 attached to the door frame 2000 showing an installer positioning and aligning relative to the door frame 2000 a strike plate 2200 based on the position and orientation of the locator card 7000 on the door frame 2000.

FIG. 63 is a perspective view of the door frame 2000 showing an installer tracing around at least part of the outside perimeter 2210 of the now positioned and aligned strike plate 2200 (tracing schematically indicated by arrow 2172) to create a trace line 2170, and also schematically indicating that the installer will also trace around at least part of the inside perimeter 2220 of the strike plate 2200 to create a trace line 2180 (tracing schematically indicated by arrow 2182).

Figure 64:
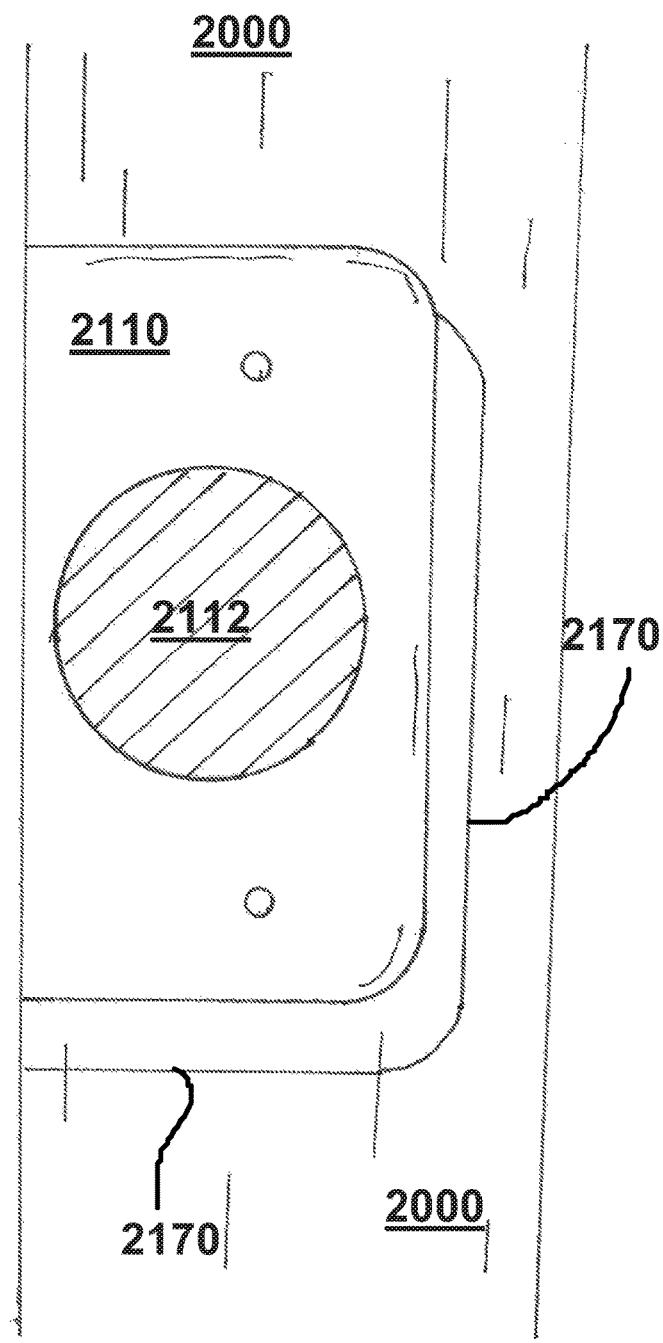
FIG. 64 is a perspective view showing the positioning indicia based on the tracing of the outside and inside perimeter of the strike plate to be mortised, and showing the installer the changes to the existing mortised area that will need to be made to correctly position and align the strike plate on the door frame.

FIG. 64 is a perspective view showing the trace lines 2170 and 2180 created by tracing of the outside 2210 and inside 2220 perimeters of the strike plate 2200 to be mortised, and showing the installer the changes to the existing mortised area 2110 that will need to be made to correctly position and align the strike plate 2200 on the door frame 2000 to receiving a latch bolt 2600 from the closed door 2500.

Figure 65:
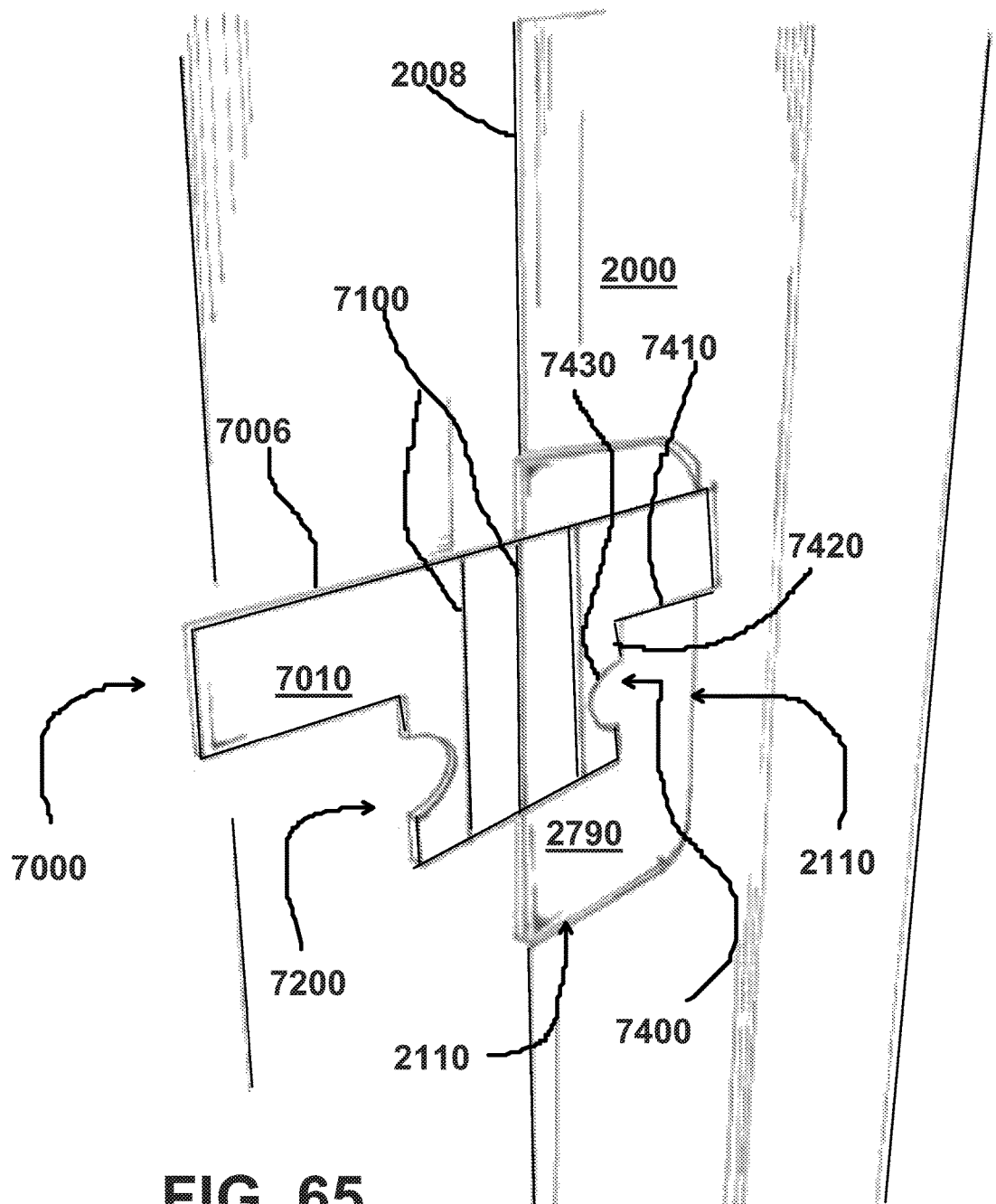
FIG. 65 is a perspective view of the latchbolt locator card of FIGS. 43 through 45 schematically illustrating the step of checking the position and alignment of an already mortised area in the door frame for a strike plate (which may have been previously installed in the door frame), where the already mortised area is either not correctly positioned and/or aligned for the strike plate to receive the latch bolt from the door when the door is closed in the door frame. The steps described in explaining FIGS. 53 through 55 can be used to arrive at the positioned and aligned locator card shown in FIG. 61. In this embodiment the already mortised area has been filled in with a gap reducer to facilitate marking of the positioning indicia on the gap reducer and/or door frame.

FIG. 65 is a perspective view of the latch bolt locator card 7000 schematically illustrating the step of checking the position and alignment of an already mortised area 2110 in the door frame 2000 for a strike plate 2200 (which may have been previously installed in the door frame 2000), where the already mortised area 2210 is either not correctly positioned and/or aligned for the strike plate 2200 to receive the latch bolt 2600 from the door 2500 when the door 2500 is closed in the door frame 2000. The steps described in explaining FIGS. 53 through 55 can be used to arrive at the positioned and aligned locator card 7000 shown in FIG. 61. In this embodiment the already mortised area 2110 has been filled in with a gap reducer 2790 to facilitate marking of the positioning indicia 7400 on the gap reducer 2790 and/or door frame 2000.

Figure 66:
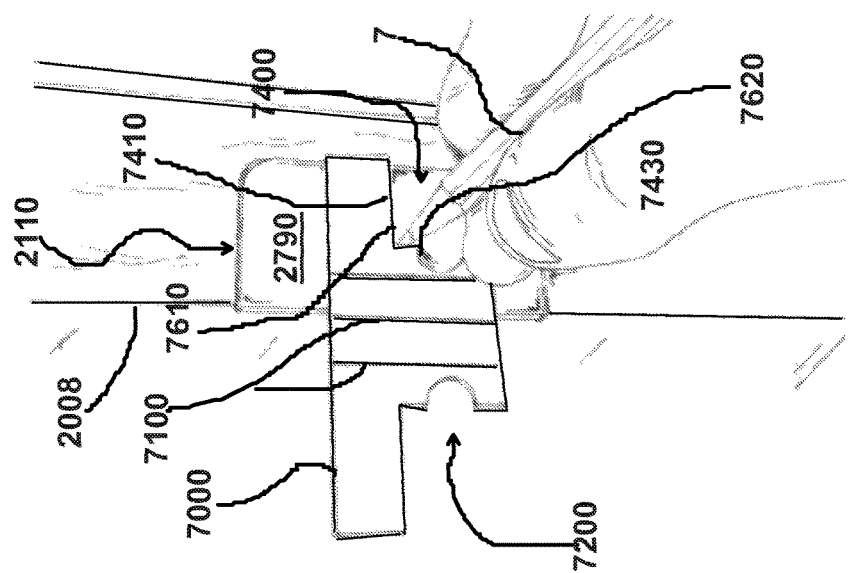
FIG. 66 is a perspective view of the latchbolt locator card of FIGS. 43 through 45 schematically illustrating the step of, after the locator card has been attached to the door frame and the door opened, the installer uses the locator card now attached to the door frame/gap reducer to make positioning marks or indicia for installing a strike plate, such as by tracing a part of the shape of the locator card onto the door frame.

FIG. 66 is a perspective view of the latch bolt locator 7000 schematically illustrating the step of, after the locator card 7000 has been attached to the door frame 2000 and the door 2500 opened, the installer uses the locator card 7000 now attached to the door frame 2000/gap reducer 2790 to make positioning marks or indicia 7400 for installing a strike plate 2200, such as by tracing a part of the shape of the locator card 7000 onto the door frame 2000 (e.g., trace lines 7410 and/or 7420).

Figure 67:
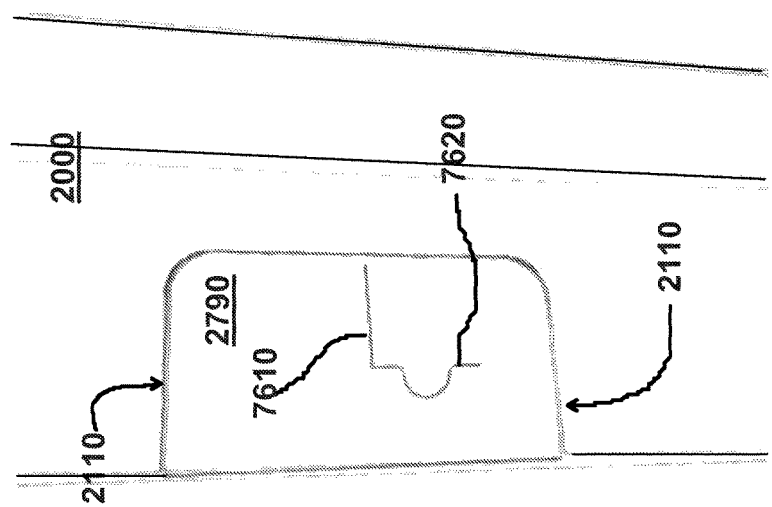
FIG. 67 is a perspective view of the door frame with gap reducer, and showing that after removing the locator card following the steps described in FIG. 66, the positioning marks or indicia made are revealed.

FIG. 67 is a perspective view of the door frame 2000 with gap reducer 2790, and showing that after removing the locator card 7000 following the steps described in FIG. 66, the positioning marks or indicia 7400 made are revealed.

Figure 68:
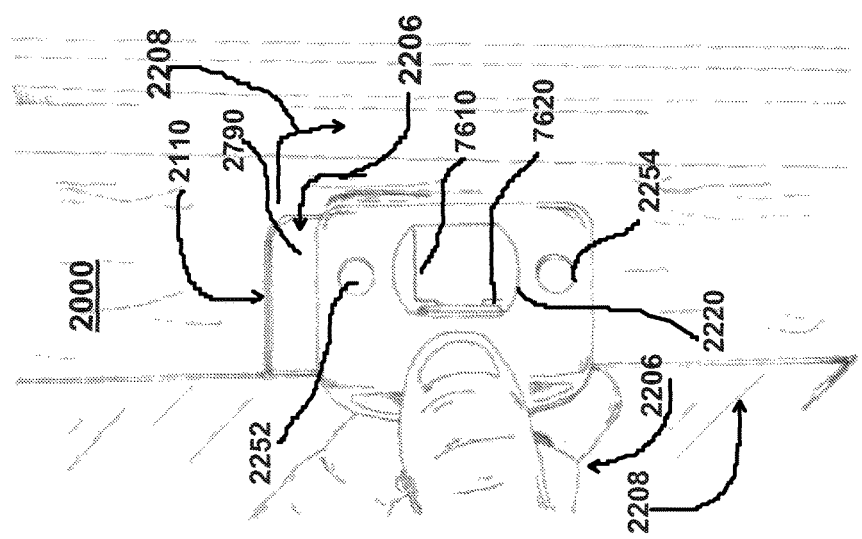
FIG. 68 is a perspective view of the door frame with the positioning marks or indicia made in the earlier step on the door frame/gap reducer, and showing an installer positioning a strike plate around the positioning marks or indicia with the positioning marks or indicia being used to both position and align the strike plate on the door frame.

FIG. 68 is a perspective view of the door frame 2000 with the positioning marks or indicia made 7400 in the earlier step on the door frame 2000/gap reducer 2790, and showing an installer positioning a strike plate 2200 around the positioning marks or indicia 7400 (schematically indicated by arrows 2206 and 2208) with the positioning marks or indicia 7400 being used to both position and align the strike plate 2200 on the door frame 2000.

Figure 69:
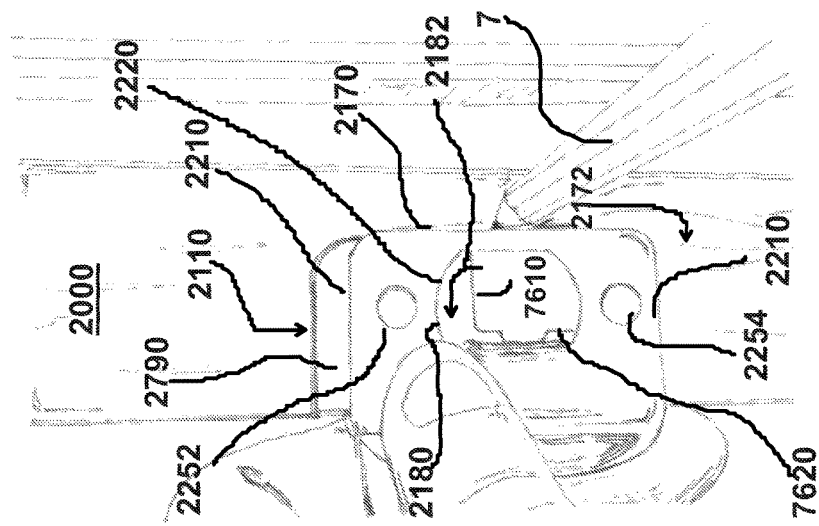
FIG. 69 is a perspective view of the door frame showing an installer tracing around the outside perimeter of the now positioned and aligned strike plate, and schematically indicating that the installer will also trace around the inside perimeter of the strike plate.

FIG. 69 is a perspective view of the door frame 2000 showing an installer tracing around the outside perimeter 2210 of the now positioned and aligned strike plate 2200 (arrow 2172 schematically indicating the creation of trace line 2170), and schematically indicating that the installer will also trace around the inside perimeter 2220 of the strike plate 2200 (arrow 2182 schematically indicating the creation of trace line 2180).

Figure 70:
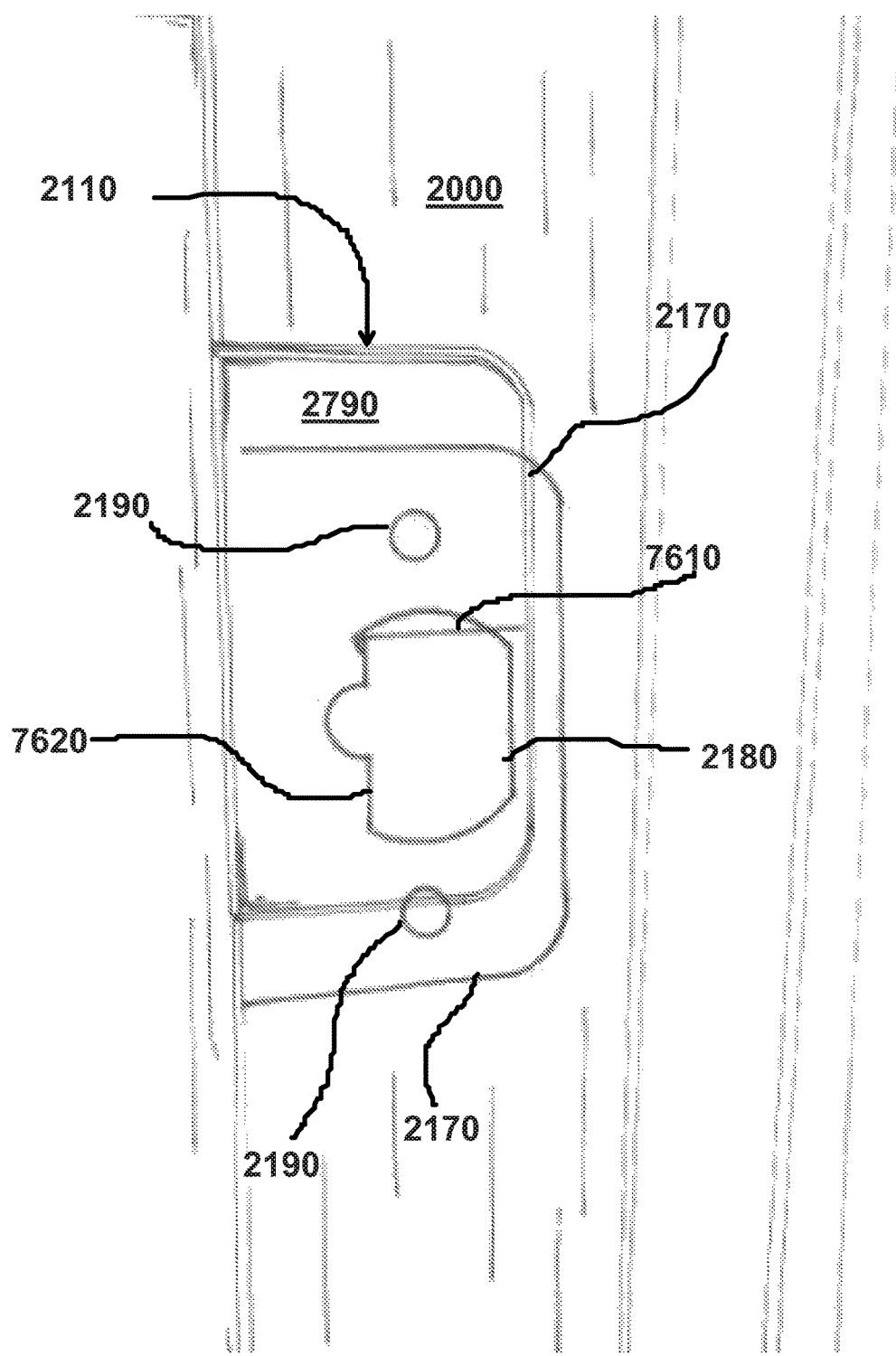
FIG. 70 is a perspective view showing on the gap reducer/door frame the traced outside and inside perimeters of the area on the door frame to be mortised for installing the strike plate along with showing the positioning marks or indicia, and also indicating to the installer the changes to the existing mortised area that will need to be made to correctly position and align the strike plate on the door frame.

FIG. 70 is a perspective view showing on the gap reducer 2790/door frame 2000 the traced outside 2210 and inside 2220 perimeters of the area on the door frame to be mortised 2110' for installing the strike plate 2200 along with showing the positioning marks or indicia 7610,7620 (and collectively referred to as positioning marks or indicia 7600), and also indicating to the installer the changes to the existing mortised area 2210 that will need to be made to correctly position and align the strike plate 2200 on the door frame 2000 for receiving the latch bolt 2600 when the door 2500 is closed in the door frame 2000. The misalignment is schematically indicated by trace line 2170 being transposed from the outer perimeter of existing mortised area 2110. Trace line 7610 can be used by the installer for positioning the transposed receiving bore 2112' in door frame 2000 (relative to original receiving bore 2112).

FIG. 71 is a perspective view showing the deadbolt locator card 8000 (before the adhesive liner 8050 is removed from the card 8000) positioned around the dead bolt 2600 of the door 2500 and illustrating how the card 8000 is dimensioned to fit snugly around the dead bolt 2600 (e.g., receiving area 8200 has a small amount of gap from the exterior perimeter of deadbolt 2600 with respect to side walls 8440 and curved section 8230).

Body 8004 can have a thickness 8091. Thickness 8091 can be about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.5, 2.6, 2.7, 2.8, 2.9, 3, and 4 millimeters. In various embodiments thickness can fall within a range of any two of the above referenced possible thickness dimensions.

FIG. 72 is a perspective view showing the liner 8050 being removed from the deadbolt locator card 8000 exposing adhesive 8054 on the locating card 8000.

Figure 73:
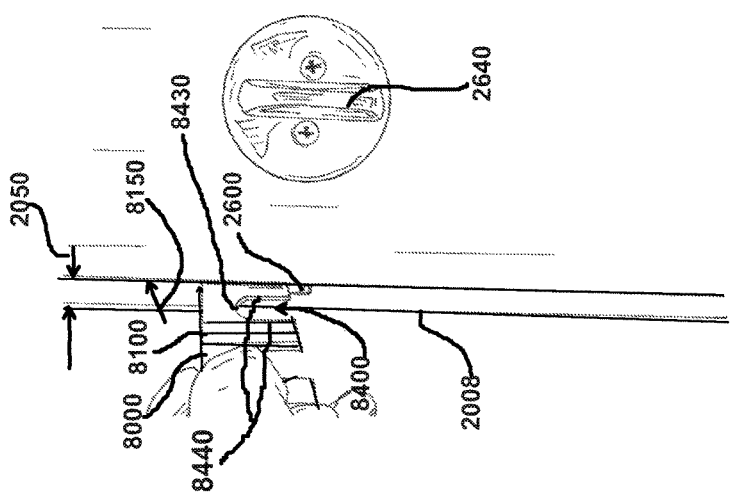
FIG. 73 is a perspective view of the deadbolt locator card of FIGS. 46 and 47 and schematically illustrating the step of the locator card being inserted into the gap between a closed door and its door fame while above the dead bolt extending out of the door, and showing the steps of the locator card being lowered in the gap until the card contacts the top of the dead bolt, and with the installer using the one or more vertical lines on the front of the card to vertically align the card relative to the door frame.

FIG. 73 is a perspective view of the deadbolt locator card 8000 and schematically illustrating the step of the locator card 8000 being inserted (schematically indicated by arrow 8150) into the gap 2050 between a closed door 2500 and its door fame 2000 while above the dead bolt 2600 extending out of the door 2500, and showing the steps of the locator card 8000 being lowered in the gap 2050 until the card 8000 contacts the top of the dead bolt 2600, and with the installer using the one or more vertical lines 8100 on the front 8010 of the card 8000 to vertically align the card 8000 relative to the door frame 2000.

Figure 74:
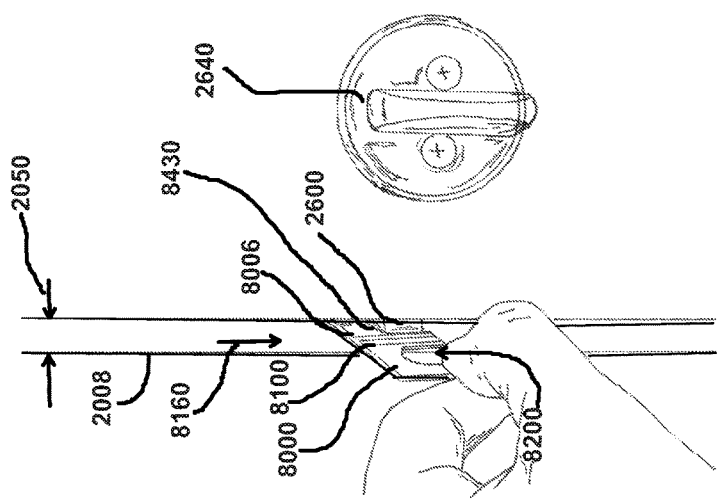
FIG. 74 is a perspective view of the deadbolt locator card of FIGS. 46 and 47 and schematically illustrating the step of the locator card after being inserted into the gap between a closed door and its door fame, the card being lowered in the gap until the card contacts the top of the dead bolt, and with the installer using the one or more vertical lines on the front of the card to vertically align the card relative to the door frame.

FIG. 74 is a perspective view of the deadbolt locator 8000 schematically illustrating the step of the locator card 8000, after being inserted into the gap 2050 between a closed door 2500 and its door fame 2000, the card 8000 being lowered (schematically indicated by arrow 8160) in the gap 2050 until the card 8000 contacts the top of the dead bolt 2600, and with the installer using the one or more vertical lines 8100 on the front 8010 of the card 8000 to vertically align the card 8000 relative to the door frame 2000. In this figure curved section 8230 of card 8000 will contact the top of the deadbolt and side walls 8440 will snugly fit about the sidewalls of deadbolt 2600, with the contact and snugly fitting assisting in properly vertically aligning card 8000 relative to door frame 2000.

Figure 76:
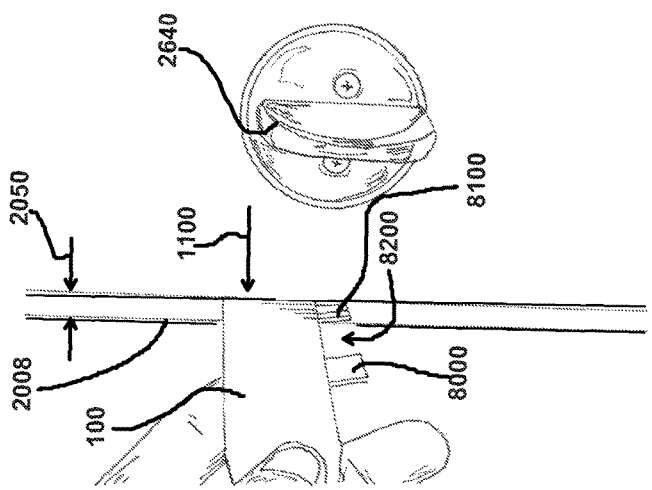
FIG. 76 is a perspective view of the deadbolt locator card of FIGS. 46 and 47 schematically illustrating the step of an installer continuing to use the tool to bias the locator card against the door frame so that the card will obtain a strong attachment to the door frame with the adhesive on the card.
Figure 75:
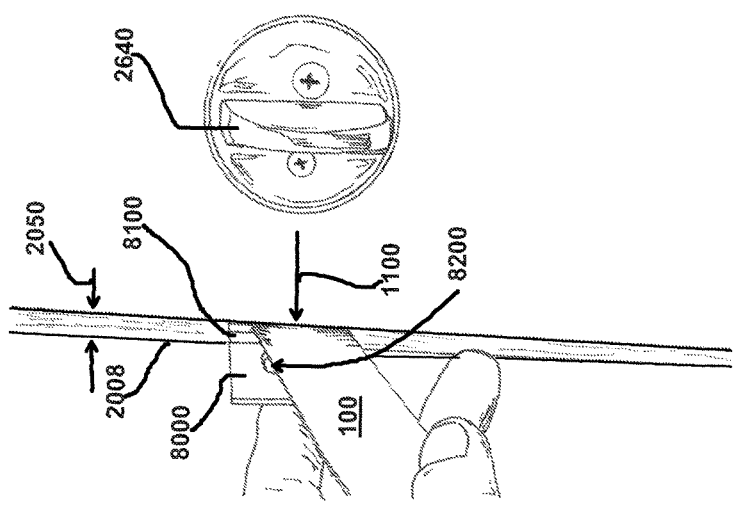
FIG. 75 is a perspective view of the deadbolt locator card of FIGS. 46 and 47 schematically illustrating the step of an installer using a tool to bias the locator card against the door frame so that the card will attach to the door frame with the adhesive on the card (such as by using a putty knife or other tool).

FIG. 75 is a perspective view of the deadbolt locator 8000 schematically illustrating the step of an installer using a tool 100 to bias the locator card 8000 against the door frame 2000 (schematically indicated by arrow 1100) so that adhesive 8054 on the second side 8020 of the card 8000 will cause to card 8000 to attach to the door frame 2000. Tool 100 can be various tools to impart a force onto card 8000 such as a putty knife or other tool. FIG. 76 is a perspective view of the deadbolt locator card 8000 schematically illustrating the step of an installer continuing to use the tool 100 to bias the locator card 8000 against the door frame 2000 so that the card 8000 will obtain a strong attachment to the door frame 2000 with the adhesive 8054.

Figure 77:
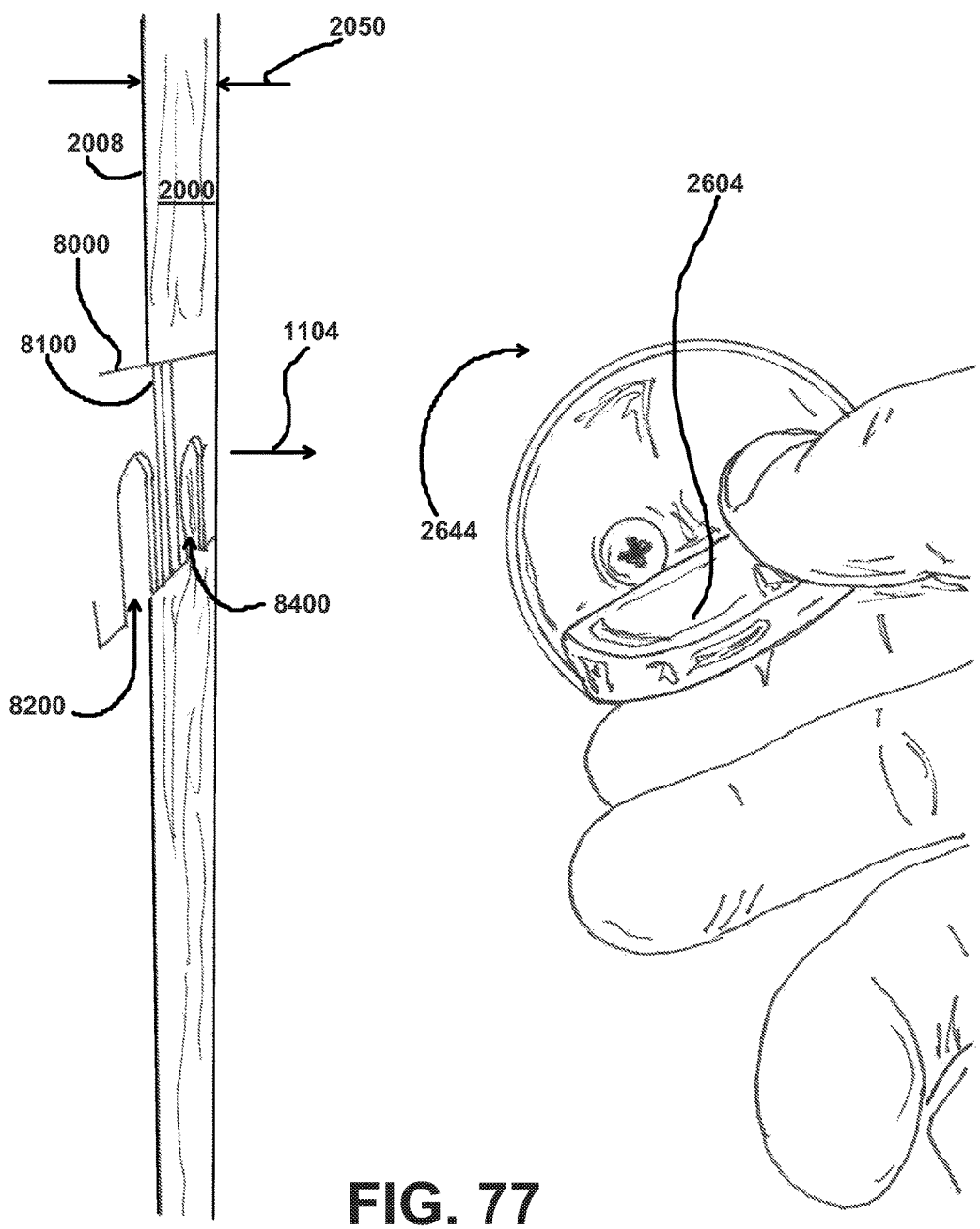
FIG. 77 is a perspective view of the deadbolt locator card of FIGS. 46 and 47 schematically illustrating the step of, after the locator card has been attached to the door frame, the installer can retract the dead bolt and open the door.

FIG. 77 is a perspective view of the deadbolt locator card 8000 schematically illustrating the step of, after the locator card 8000 has been attached to the door frame 2000, the installer can retract the dead bolt 2600 into the door 2500 (schematically indicated by the installer turning knob 2604 in the direction of arrow 2644 causing deadbolt 2600 to retract in the direction of arrow 1104), and open the door 2500.

Figure 78:
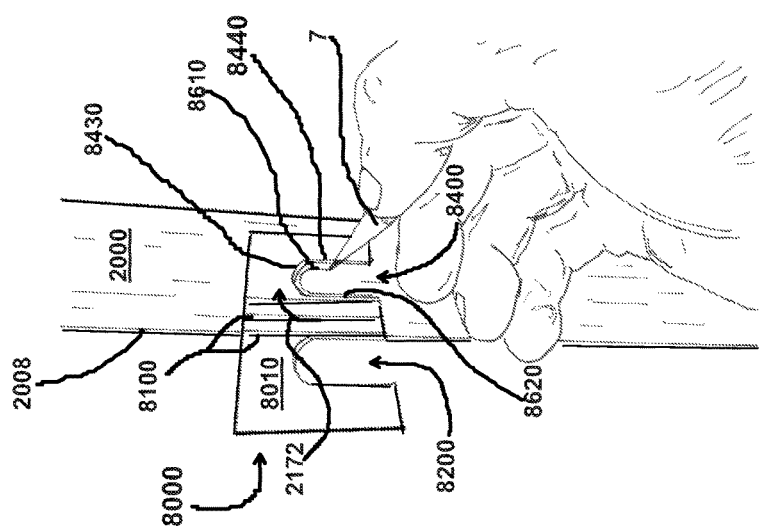
FIG. 78 is a perspective view of the deadbolt locator card of FIGS. 46 and 47 schematically illustrating the step of, after the locator card has been attached to the door frame and the door opened, the installer use the locator card now attached to the door frame to make positioning marks or indicia for installing a deadbolt receiving plate, such as by tracing a part of the shape of the locator card onto the door frame.

FIG. 78 is a perspective view of the deadbolt locator card 8000 schematically illustrating the step of, after the locator card has been attached to the door frame 2000 and the door 2500 opened, the installer uses the now positioned and aligned locator card 8000 to make positioning marks or indicia 8610 for installing a deadbolt receiving plate, such as by tracing a part of the shape of the locator card onto the door frame.

Figure 79:
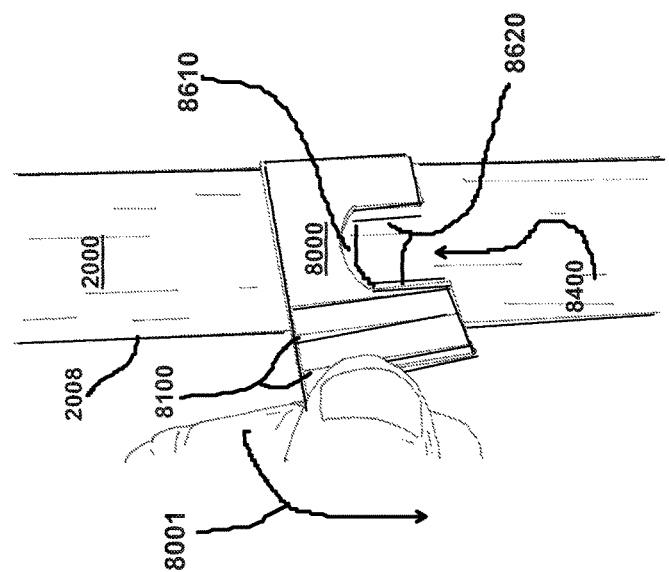
FIG. 79 is a perspective view of the deadbolt locator card of FIGS. 46 and 47 schematically illustrating the step of removing the locator card from the door frame to reveal the positioning marks or indicia made in the earlier step.

FIG. 79 is a perspective view of the deadbolt locator card 8000 schematically illustrating the step of removing the locator card 8000 from the door frame 2000 to reveal the positioning marks or indicia 8610,8620 made in the earlier step.

Figure 80:
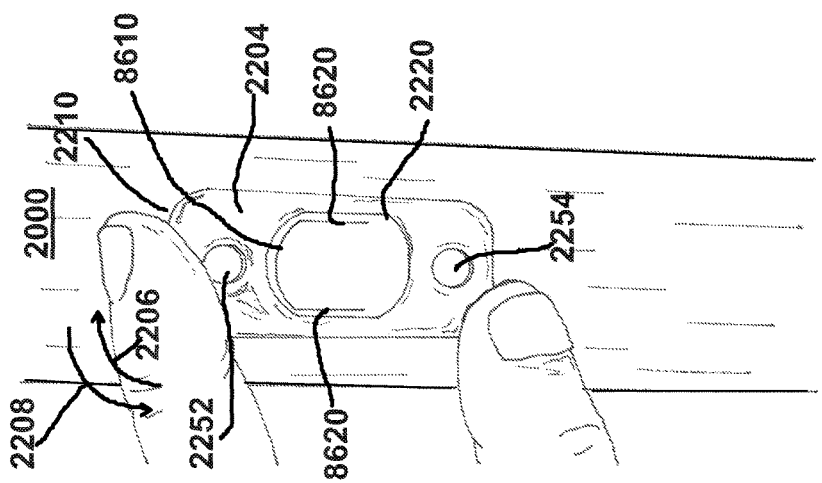
FIG. 80 is a perspective view of the door frame with the positioning marks or indicia made in the earlier step and showing an installer positioning a deadbolt receiving plate around the positioning marks or indicia with the positioning marks or indicia being used to both position and align the deadbolt receiving plate on the door frame.

FIG. 80 is a perspective view of the door frame 2000 with the positioning marks or indicia 861,8620 made in the earlier step and showing an installer positioning a deadbolt receiving plate 2204 around the positioning marks or indicia 8610,8620 with the positioning marks or indicia 8610,8620 being used to both position and align the deadbolt receiving plate 2204 on the door frame 2000 (the step of positioning and aligning deadbolt receiving plate 2204 relative to positioning marks 8610,8620 being schematically indicated by arrows 2206 and 2208).

Figure 81:
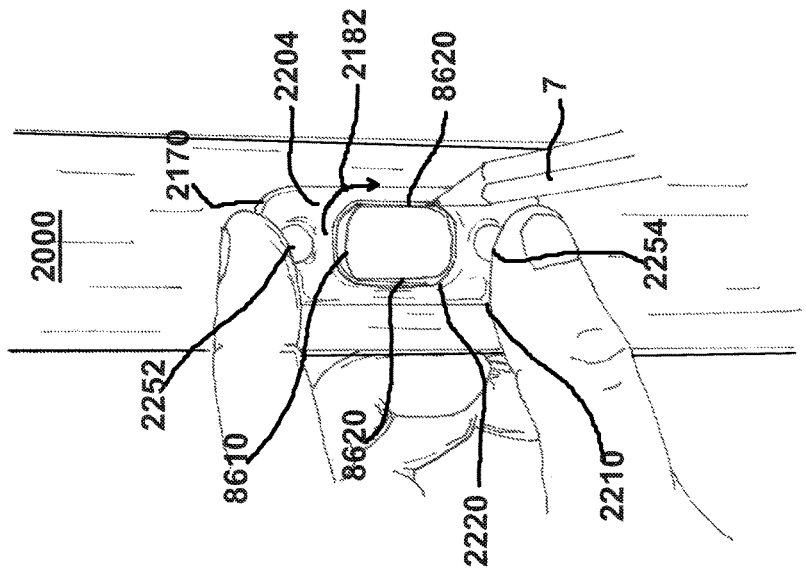
FIG. 81 is a perspective view of the door frame showing an installer tracing around the insider perimeter of the now positioned and aligned deadbolt receiving plate, and schematically indicating that the installer will also trace around the outside perimeter of the deadbolt receiving plate.

FIG. 81 is a perspective view of the door frame 2000 showing an installer tracing around the insider perimeter 2220 of the now positioned and aligned deadbolt receiving plate 2204, and schematically indicating that the installer will also trace around the outside perimeter 2210 of the deadbolt receiving plate 2204.

Figure 82:
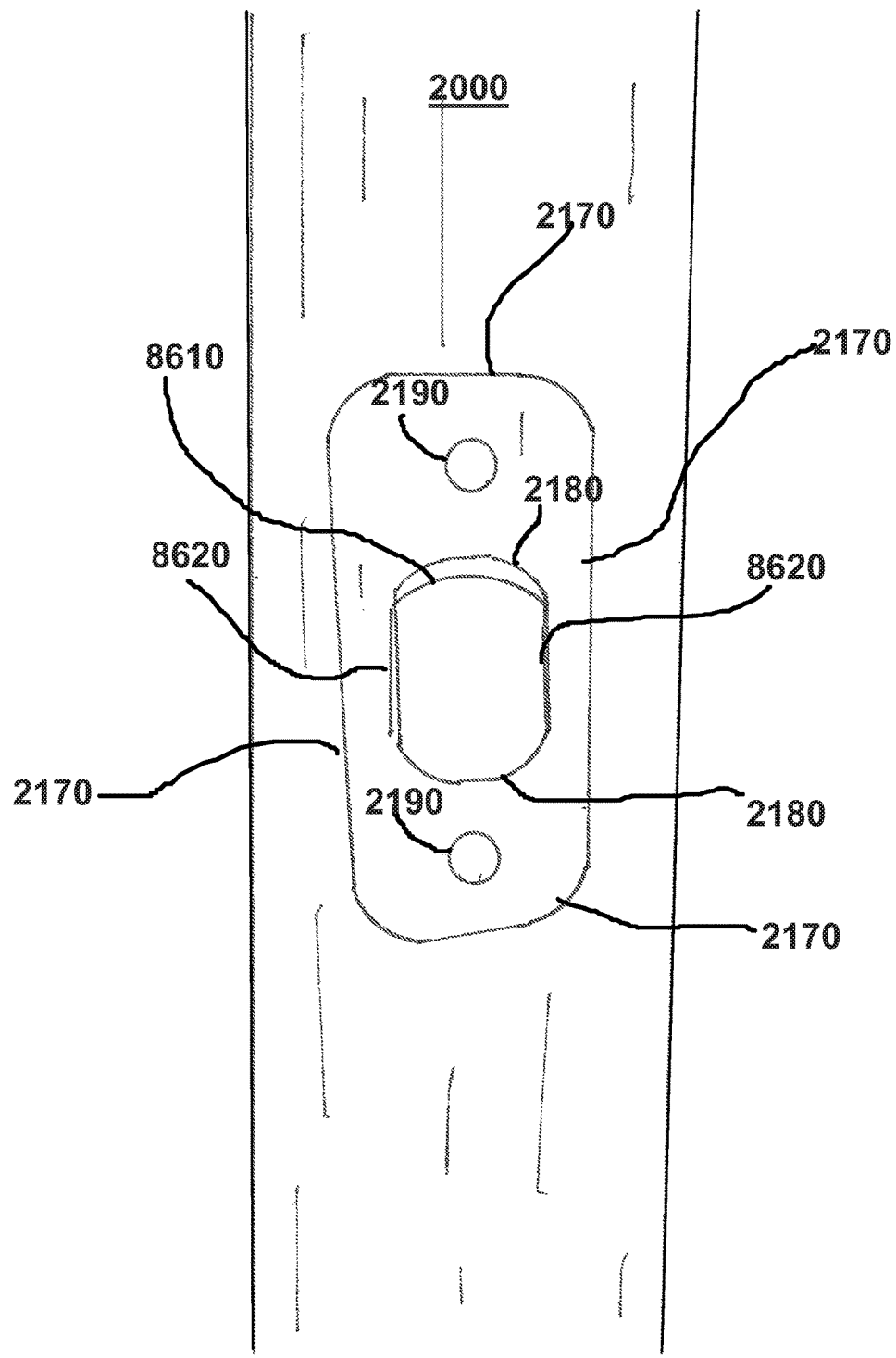
FIG. 82 is a perspective view showing the traced outside and inside perimeters of the deadbolt receiving plate area to be mortised, along with showing the positioning marks or indicia.

FIG. 82 is a perspective view showing the traced outside 2170 and inside 2180 perimeters of the deadbolt receiving plate 2204 area to be mortised, along with showing the positioning marks or indicia 8610,8620 made in earlier steps. This Figure also shows indicia markings 2190 for creating screw holes if desired for openings 2252 and 2254 of deadbolt receiving plate 2204.

Figure 83:
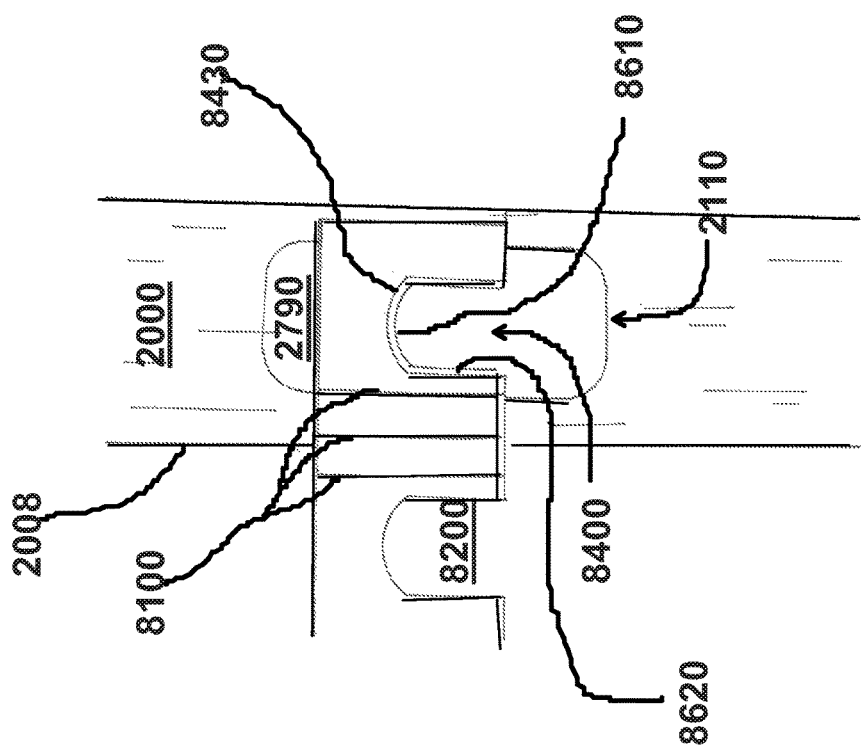
FIG. 83 is a perspective view of the deadbolt locator card of FIGS. 46 and 47 attached to a door frame/gap reducer, and schematically illustrating the step of, after the locator card has been attached to the door frame/gap reducer and following the opening of the door, the installer uses the now positioned locator card on the door frame/gap reducer to make positioning marks or indicia for installing a deadbolt receiving plate, such as by tracing a part of the shape of the locator card onto the door frame.

FIG. 83 is a perspective view of the deadbolt locator card 8000 attached to a door frame 2000/gap reducer 2790, and schematically illustrating the step of, after the locator card 8000 has been attached to the door frame 2000/gap reducer 2790 and following the opening of the door 2500, the installer uses the now positioned locator card 8000 on the door frame 2000/gap reducer 2790 to make positioning marks or indicia 8610,8620 for installing a deadbolt receiving plate 2204, such as by tracing a part of the shape of the locator card 8000 onto the door frame 2000/gap reducer 2790.

Figure 84:
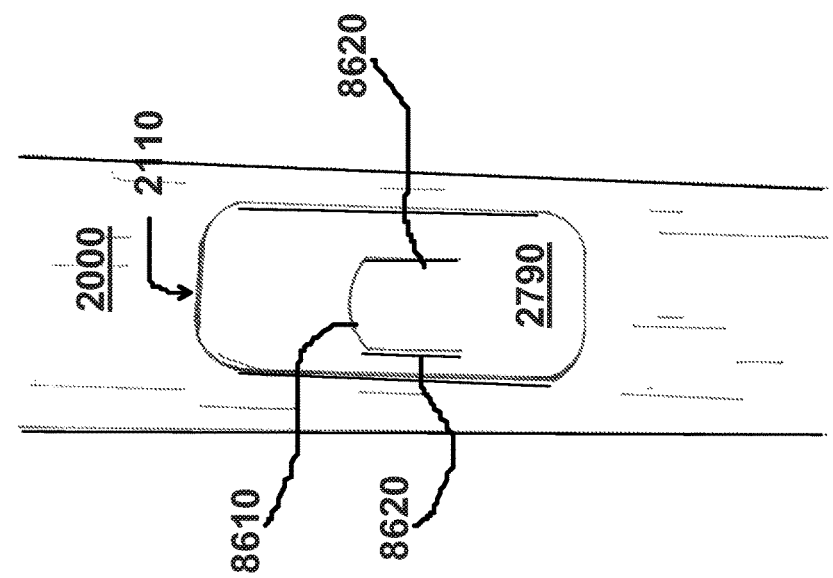
FIG. 84 is a perspective view of the door frame with gap reducer, and showing that after removing the locator card following the steps described in FIG. 83, the positioning marks or indicia made are revealed.

FIG. 84 is a perspective view of the door frame 2000 with gap reducer 2790, and showing that after removing the locator card 8000 following the steps described in FIG. 83, the positioning marks or indicia 8610,8620 made are revealed.

Figure 88:
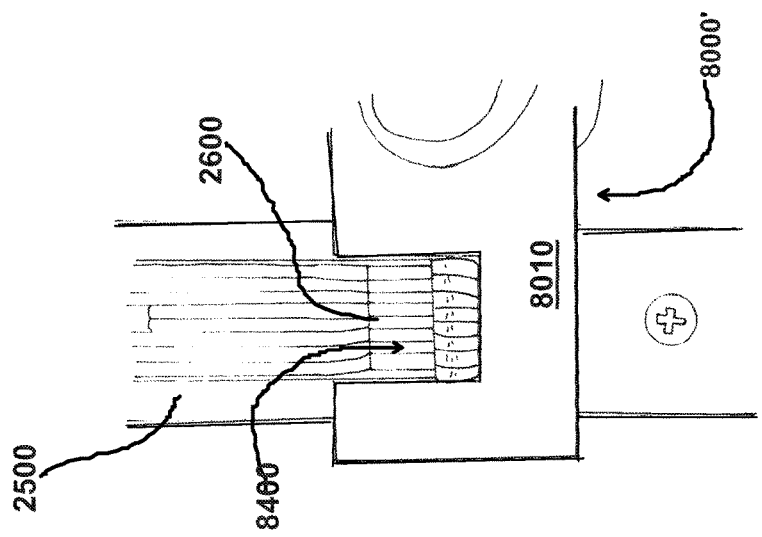
FIGS. 87 and 88 are enlarged side views of the door of FIG. 85.
Figure 87:
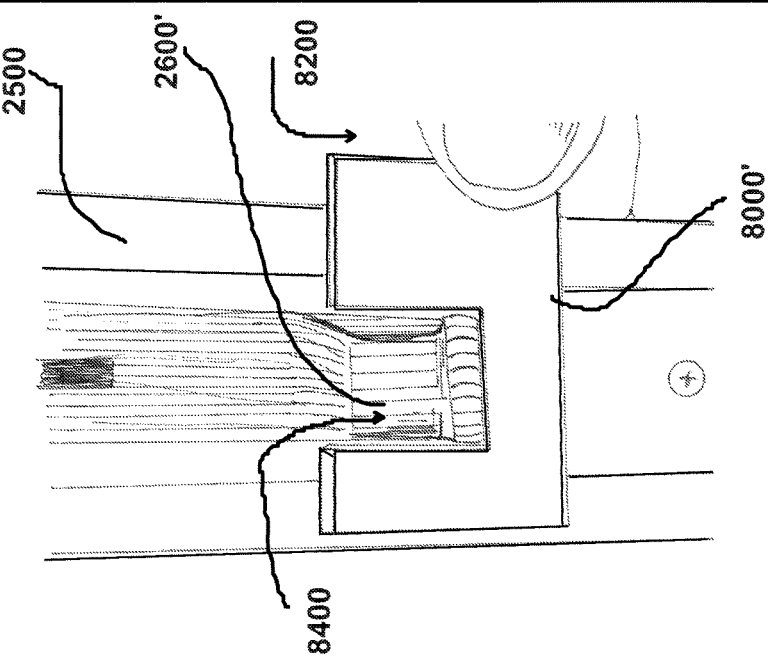

FIG. 85 is a perspective view showing an alternative embodiments of a deadbolt locator card 8000 which can be used for mortising areas for installing hook or dead bolt 2600' receiving plates 2204', with the locator card 8000 being placed on a door 2500 having a hook or deadbolt 2600' and schematically indicating that the hook or dead bolt 2600' is retracting and extending (arrow 2605), and illustrating how the card 8000 is dimensioned to fit snugly around the hook or deadbolt 2600'. FIG. 86 is a side view of the door 2500 in FIG. 85. FIGS. 87 and 88 are enlarged side views of the door 2500 of FIG. 85 having a hook or deadbolt 2600'.

Figure 89:
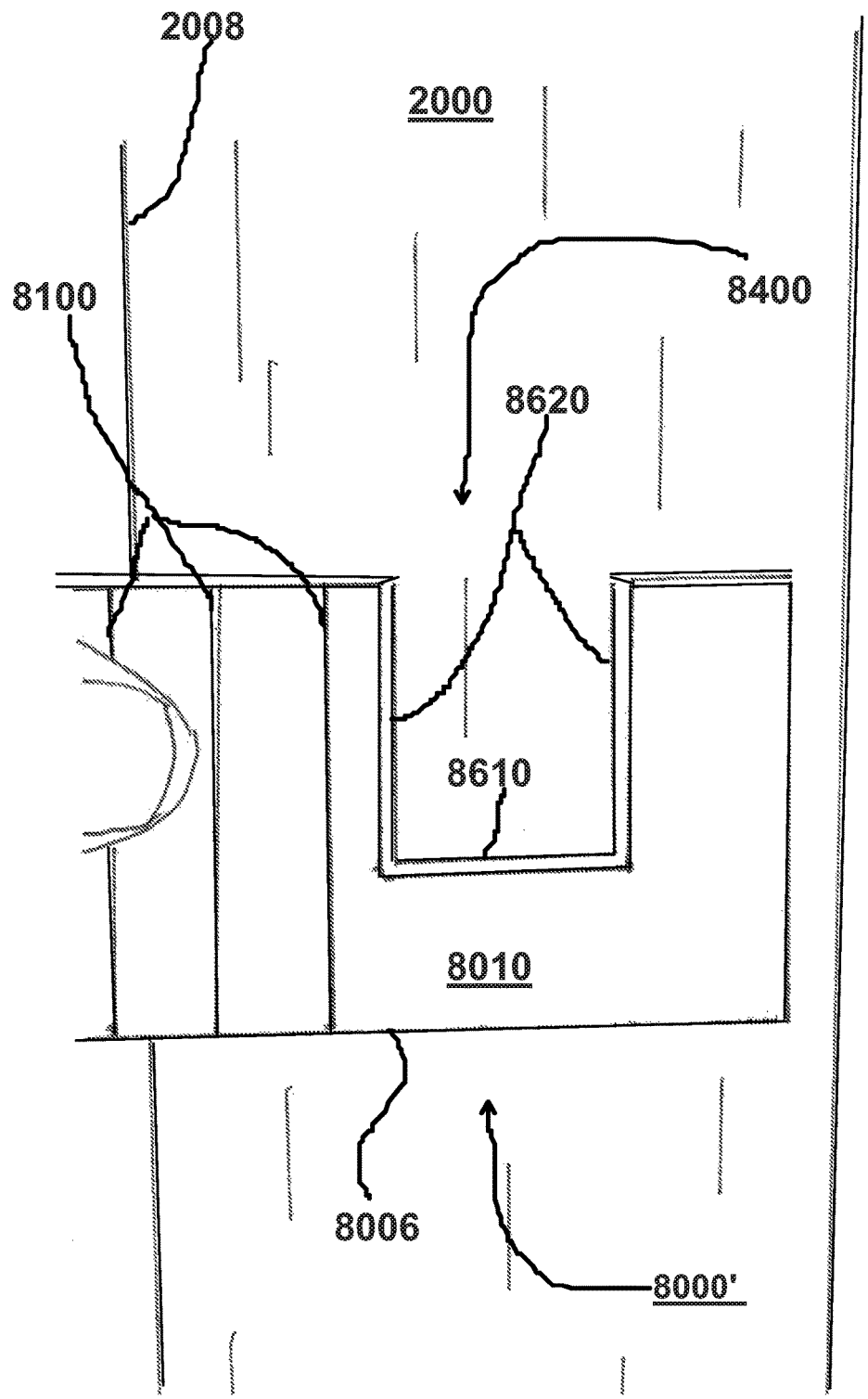
FIG. 89 is a perspective view of the deadbolt locator card of FIG. 85 schematically illustrating the step of, after the locator card has been attached to the door frame and the door opened, the installer uses the locator card now attached to the door frame to make positioning marks or indicia for installing a hook or deadbolt receiving plate, such as by tracing a part of the shape of the locator card onto the door frame.

FIG. 89 is a perspective view of the hook bolt or deadbolt locator card 8000' schematically illustrating the step of, after the locator card 8000' has been attached to the door frame 2000 and the door 2500 opened, the installer uses the locator card 8000' now attached to the door frame 2000 to make positioning marks or indicia 8610,8620 for installing a hook bolt receiving plate 2204', such as by tracing a part of the shape of the locator card 8000' onto the door frame 2000 (e.g., from receiving area 8400 of locator card 8000').

FIG. 90 is a perspective view of the hook bolt or deadbolt locator card 8000' attached to a door frame 2000, and schematically illustrating the step of, after the locator card 8000' has been attached to the door frame 2000 and following the opening of the door 2500, the installer uses the now positioned locator card 8000' on the door frame 2000 to make positioning marks or indicia 8610,8620 for repositioning and/or installing a hook or deadbolt receiving plate 2204' and/or modified receiving bore 2130', such as by tracing a part of the shape of the locator card 8000' onto the door frame 2000 to reposition and/or enlarge the receiving bore 2130.

FIG. 91 is a perspective view of the hook bolt or deadbolt locator card 8000' attached to a door frame 2000, and schematically illustrating the step of, after the locator card 8000' has been attached to the door frame 2000 and following the opening of the door 2500, the installer uses the now positioned locator card 8000' on the door frame 2000 to make positioning marks or indicia 8610,8620 for repositioning and/or installing a hook or deadbolt receiving plate 2204' and/or modified receiving bore 2130', such as by tracing a part of the shape of the locator card 8000' onto the door frame 2000, where the correctly positioned and aligned hook bolt receiving plate 2204' and/or modified receiving bore 2130' in this figure is closer to the existing bore 2130 compared to the correctly positioned and aligned hook bolt receiving 2204' plate and/or modified receiving bore 2130' in FIG. 90.

Figure 92:
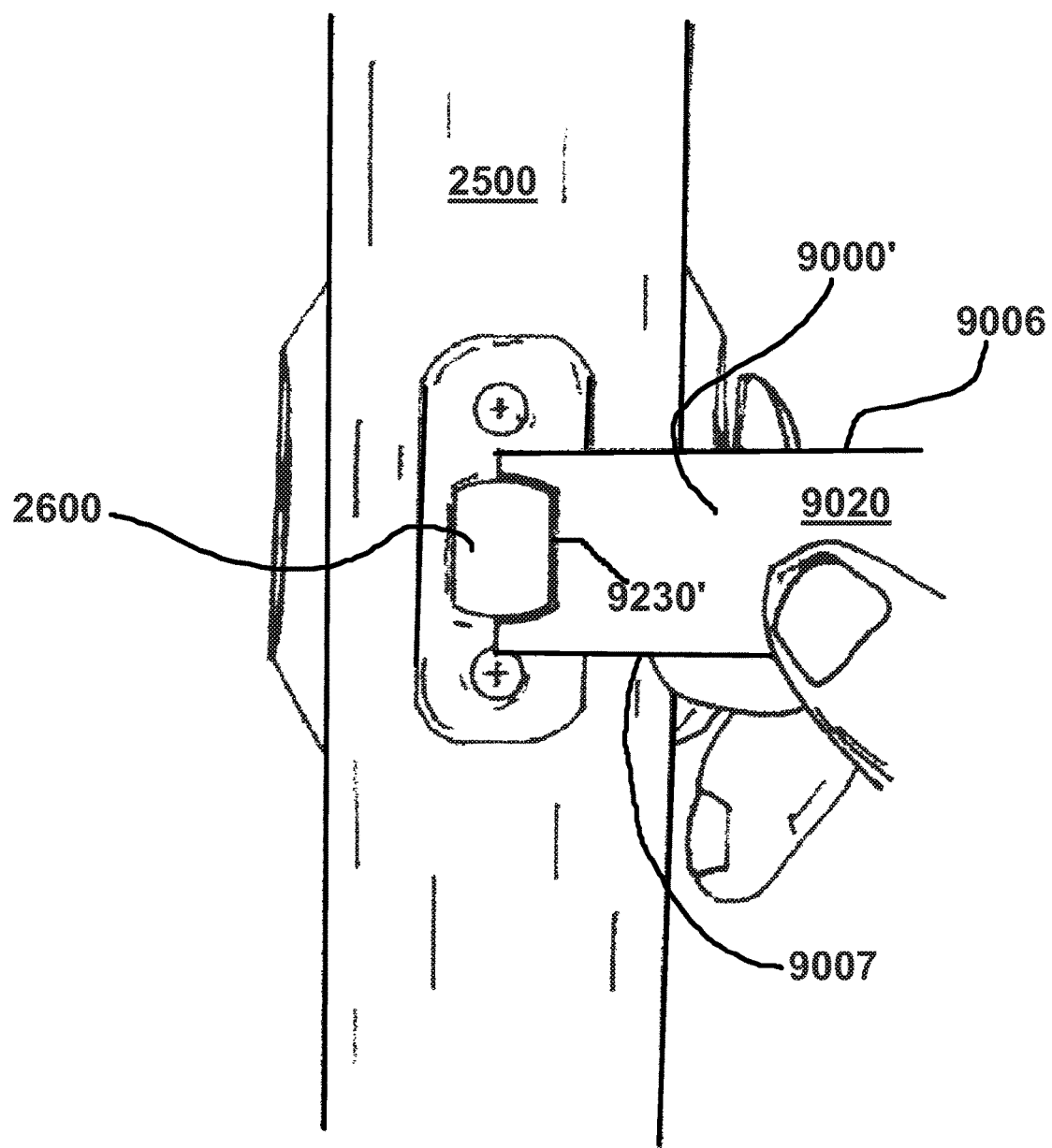
FIG. 92 is a perspective view showing the deadbolt locator card of FIG. 49 (before the adhesive liner is removed from the card) positioned next to the deadbolt of the door and illustrating how the card is dimensioned to fit snugly against and partially around the deadbolt.

FIG. 92 is a perspective view showing the deadbolt locator card 9000' (before the adhesive liner 9050 is removed from the card 9000') positioned next to the deadbolt 2600 of the door 2500 and illustrating how the card 9000' is dimensioned to fit snugly against and partially around the deadbolt 2600.

Body 9004 can have a thickness 9091. Thickness 9091 can be about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.2, 2.4, 2.5, 2.6, 2.7, 2.8, 2.9, 3, and 4 millimeters. In various embodiments thickness can fall within a range of any two of the above referenced possible thickness dimensions.

Figure 94:
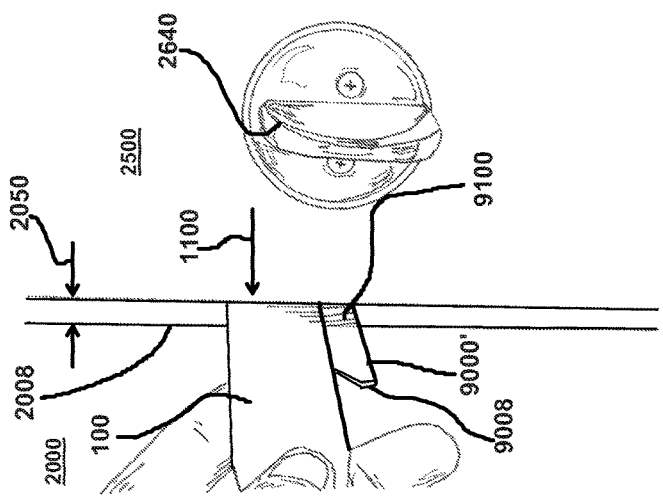
FIG. 94 is a perspective view of the deadbolt locator card of FIG. 49 schematically illustrating the step of an installer continuing to use the tool to bias the locator card against the door frame so that the card will obtain a strong attachment to the door frame with the adhesive.
Figure 93:
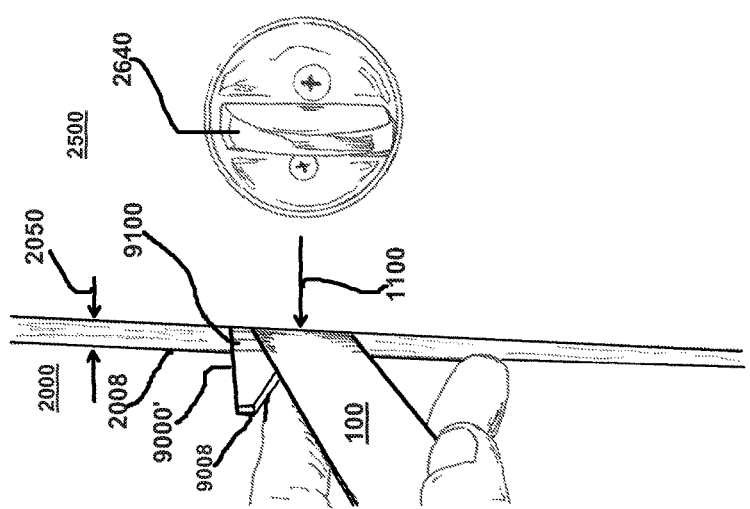
FIG. 93 is a perspective view of the deadbolt locator card of FIG. 49 schematically illustrating the step of an installer using a tool to bias the locator card against the door frame so that adhesive on the second side of the card will cause to card to attach to the door frame.

FIG. 93 is a perspective view of the deadbolt locator 9000' schematically illustrating the step of an installer using a tool 100 to bias the locator card 9000' against the door frame 2000 (schematically indicated by arrow 1100) so that adhesive 9054 on the second side 9020 of the card 9000' will cause to card 9000' to attach to the door frame 9000'. Tool 100 can be various tools to impart a force onto card 9000' such as a putty knife or other tool. FIG. 94 is a perspective view of the deadbolt locator card 9000' schematically illustrating the step of an installer continuing to use the tool 100 to bias the locator card 9000' against the door frame 2000 so that the card 9000' will obtain a strong attachment to the door frame 2000 with the adhesive 9054.

Figure 95:
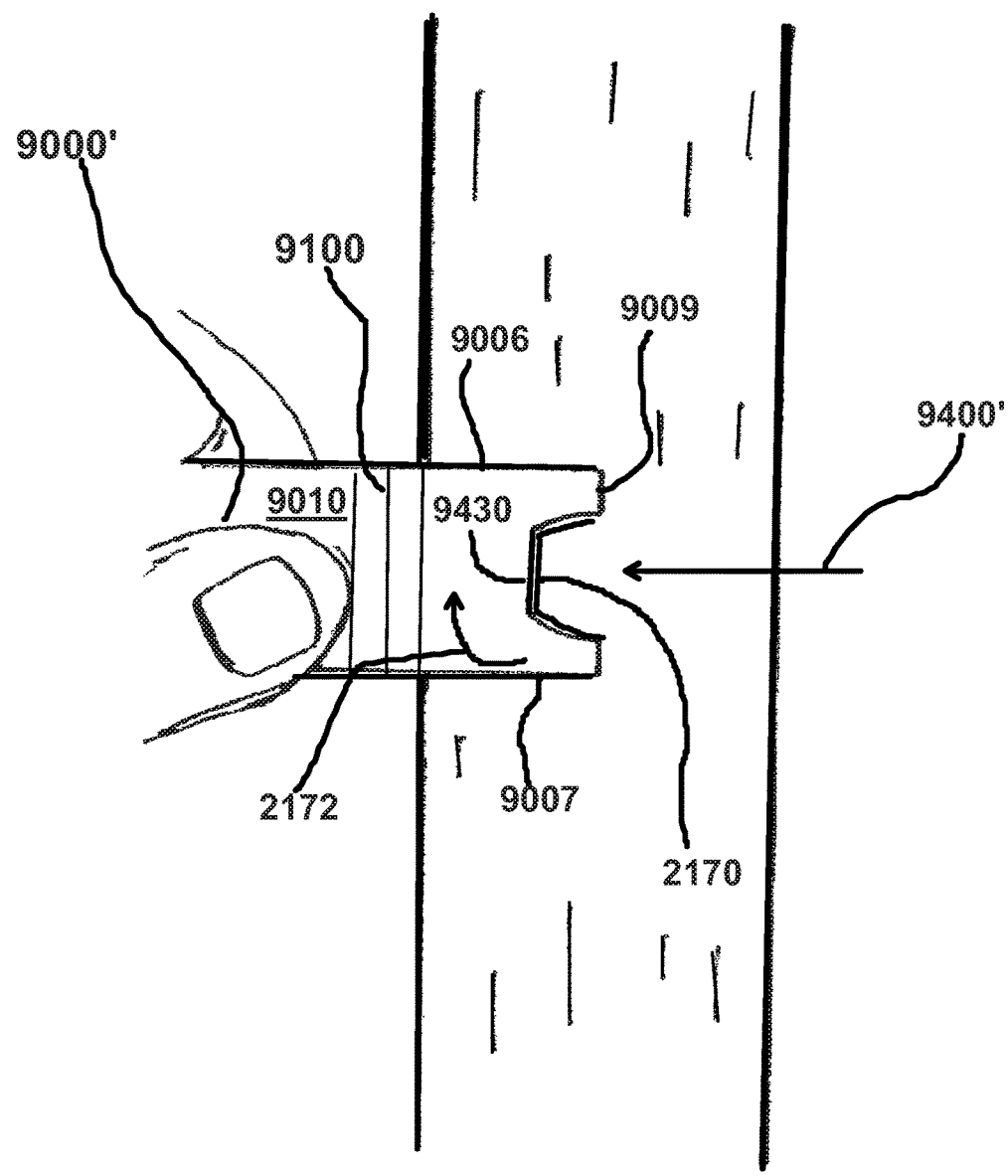
FIG. 95 is a perspective view of the deadbolt locator card of FIG. 49 schematically illustrating the step of, after the locator card has been attached to the door frame and the door opened, the installer uses the now positioned and aligned locator card to make positioning marks or indicia for installing a deadbolt receiving plate, such as by tracing a part of the shape of the locator card onto the door frame.

FIG. 95 is a perspective view of the deadbolt locator card 9000' schematically illustrating the step of, after the locator card has been attached to the door frame 2000 and the door 2500 opened, the installer uses the now positioned and aligned locator card 9000' to make positioning marks or indicia 9610 for installing a deadbolt receiving plate, such as by tracing a part of the shape of the locator card 9000' onto the door frame 2000.

Figure 96:
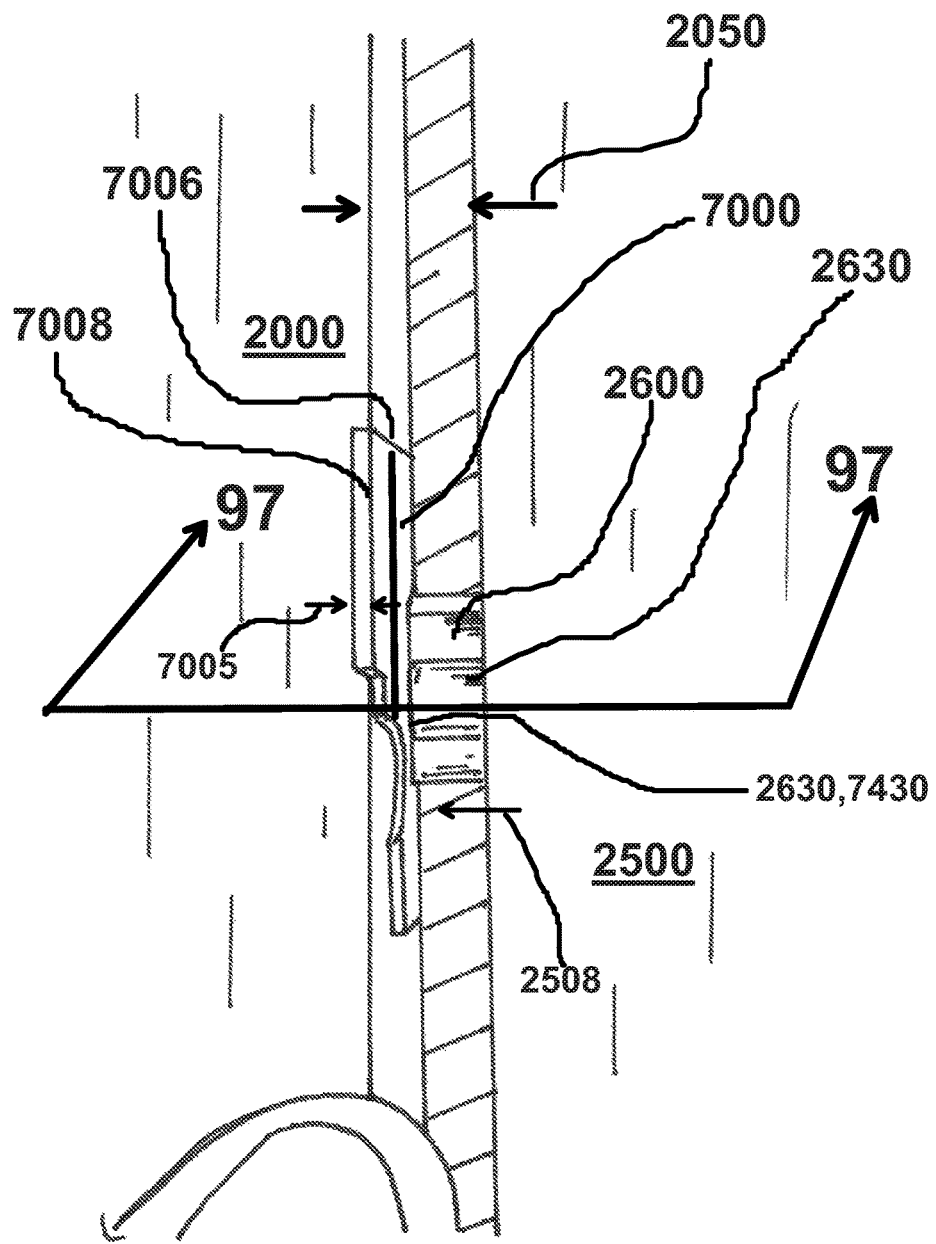
FIG. 96 shows door in a "locked condition" relative to door frame by locating card of FIG. 43 being temporarily attached to door frame.
Figure 97:
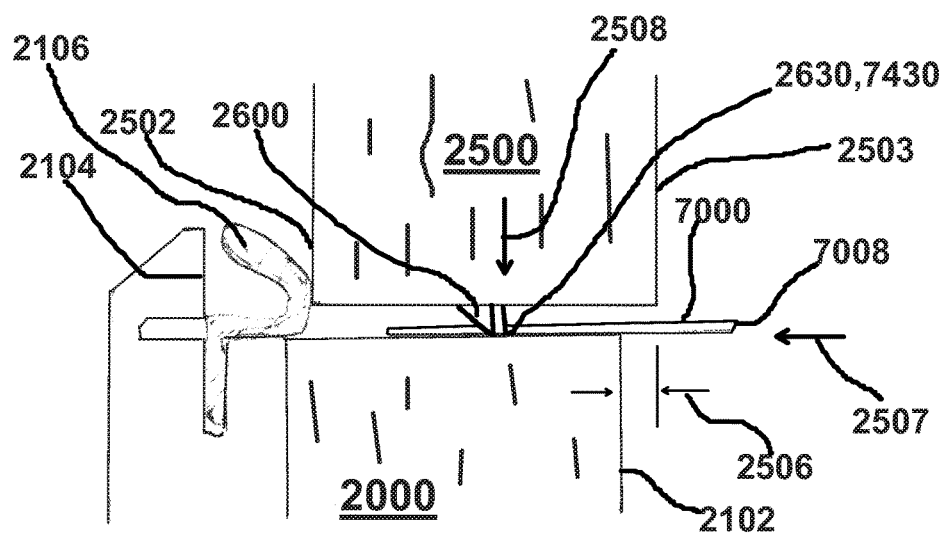
FIG. 97 is a sectional view of FIG. 96 taken through the lines 97-97 showing a gap between the front face of door relative to the front face of door frame.
Figure 98:
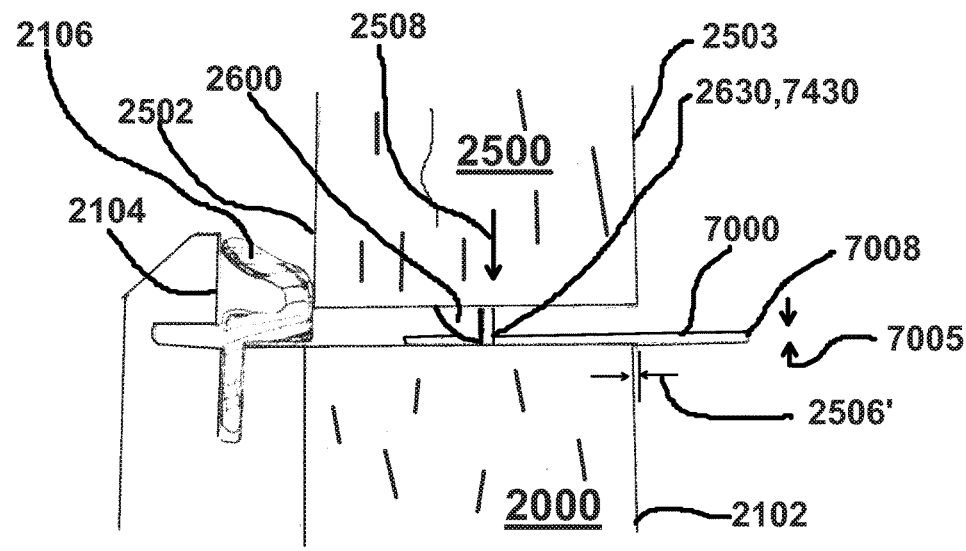
FIG. 98 is a sectional view of FIG. 96 taken through the lines 97-97 showing a gap between the front face of door relative to the front face of door frame, wherein the gap in this figure is reduced compared to the gap shown in FIG. 97.

FIGS. 96 through 98 schematically illustrate one embodiment of a method where an installer uses transposed position of positioning card 7000 to check and/or adjust the closed/locked position of the front face 2503 of door 2500 relative to the front face 2102 of door frame 2000 and/or the rear face 2502 of door 2500 relative to face 2104 of door frame 2000. FIG. 96 shows door 2500 in a "locked condition" relative to door frame 2000 by positioning member/locating card 7000 being temporarily attached to door frame 2000. FIG. 97 is a sectional view of FIG. 96 taken through the lines 97-97 showing a gap between the front face 2503 of door 2500 relative to the front face 2102 of door frame. FIG. 98 is a sectional view of FIG. 96 taken through the lines 97-97 showing a gap between the front face 2503 of door 2500 relative to the front face 2102 of door frame, wherein the gap in this figure is reduced compared to the gap shown in FIG. 97. In these embodiments transferable positioning member/locating card 7000 can be temporarily attached to door frame 2000 at a first aligned and positioned condition using the steps described relative to FIGS. 50 through 56. However, the installer can optionally use one or more of the following additional steps to adjust the closed/locked condition/position of door 2500 relative to door frame 2000 before installing strike plate 2200 (and/or before mortising door frame 2000). FIG. 96 shows latch bolt 2600 extended towards locator card 7000 in the direction of arrow 2508, which extension will naturally occur by the internal biasing of latch bolt 2600. When extending in the direction of arrow 2508 latch bolt 2600 will contact transferably positioning member/locator card 7000 in second area 7400 (e.g., side 7420 and/or notch 7430 via the thickness 7005 of positioning member/locating card 7000) tending to hold door 2500 in a locked condition relative to door frame 2000. This locked condition by temporarily attached positioning member/locating card 7000 can approximate the actual locked condition of the door 2500 when strike plate 2200 is installed on door frame 2000 using the steps described in this disclosure for positioning and aligning strike plate 2200 on door frame 2000 (e.g., FIGS. 56 through 60). Where the installer sees an unwanted gap 2506 regarding the front face 2503 of the door 2500 relative to the front face 2102 of the door frame 2000, the installer can detach the positioning member/locator card 7000 from its first aligned and positioned condition on door frame 2000, repeat the steps described relative to FIGS. 50 through 56 to place positioning member/locating card 7000 at a second aligned and positioned condition on door frame 2000 to reduce (to installer's satisfaction) gap 2506 of door 2500's front face 2503 relative to front face 2102 of door frame 2000 in the second "locked condition" of door 2500 relative to door frame 2000 via transferable positioning member/locating card 7000 being in the second aligned and positioned condition. Alternatively, installer can relocate locator card 7000 to the second aligned and positioned condition to adjust the gap between rear face 2502 of door 2500 relative to face 2104 of door frame 2000 to adjust the squeezing of weatherstripping 2106. The above process can be repeated multiple times by an installer to have third, fourth, etc. positioned and aligned conditions for positioning member/locating card 7000 on door frame 2000, during each time the "locked" state of the door 2500 relative to positioning member/locator card 7000 can be used by an installer to determine the position that the door 2500 will be in relative to the door frame when the strike plate 2204 is actually installed on the door frame 2000 (but without having to first mortise the door frame and thereby avoiding incorrect mortising and/or boring into door frame 2000). Although not shown a similar "repositioning" and/or "adjustment" of the locked condition of door 2500 relative to door frame 2000 can be made by an installer adjusting the "locked condition" of the door 2500 with respect to the transferable positioning members/locating cards of any of the other embodiments (e.g., those shown in FIGS. 46 through 49) when attached to door frame 2000.

Figure 100:
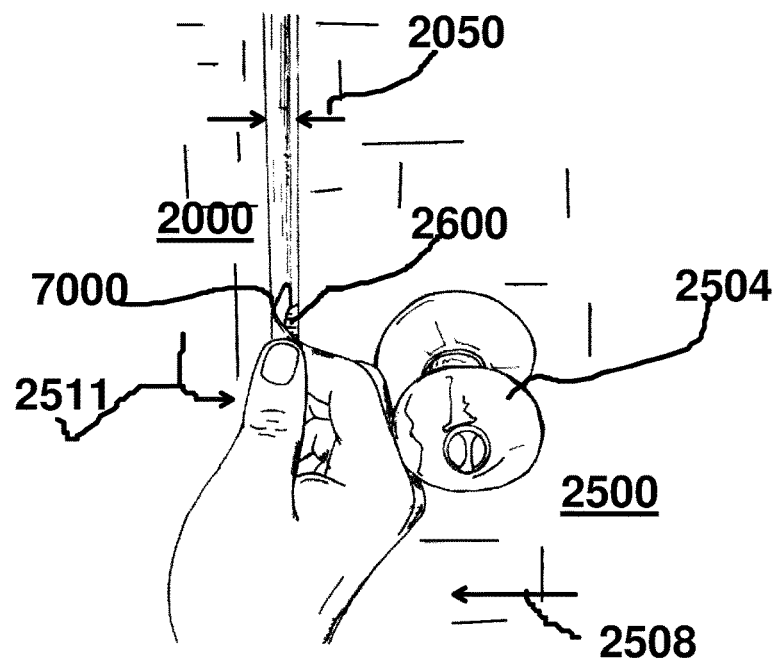
FIGS. 99 and 100 are perspective views of the latch bolt locator card of FIGS. 43 through 45 and schematically illustrating the step of the locator card being inserted into the gap between a closed door and its door fame while above the latch bolt (and extending out of the door), and showing the steps of the locator card being slid, while in contact with the latch bolt, towards the door frame, and with the installer using the one or more vertical lines on the front of the card to vertically align the card relative to the door frame.
Figure 99:
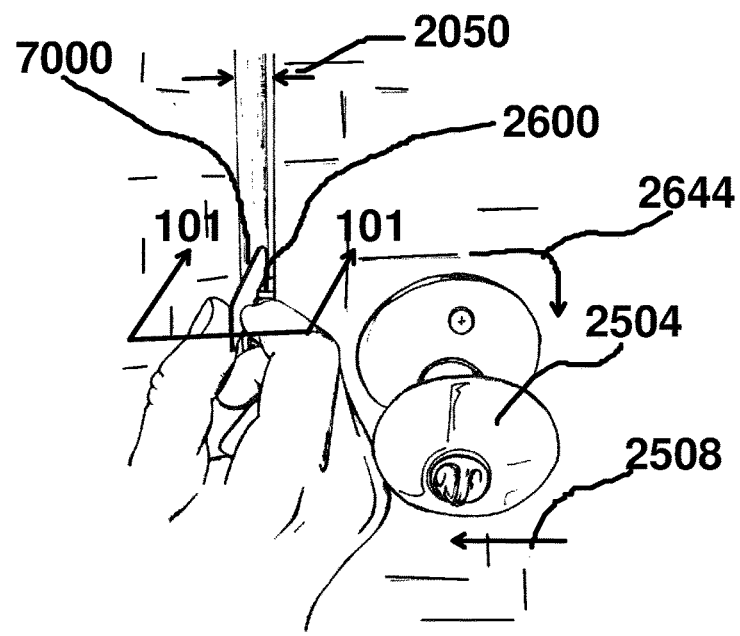

FIGS. 99 and 100 are perspective views of the latch bolt locator card 7000 (of FIGS. 43 through 45) and schematically illustrating the step of the locator card 7000 being inserted into the gap 2050 between a closed door 2500 and its door fame 2000 while above the latch bolt 2600 (and extending out of the door 2500), and showing the steps of the locator card 7000 being slid by the installer, while in contact with the latch bolt 2600, towards the door frame 2000 (schematically indicated by arrows 2508), and during this process of attaching the locator card 7000 to the door frame 2000, with the installer using the one or more vertical lines 7100 on the front 2010 of the card 7000 to vertically align the card 7000 relative to the door frame 2000. Arrow 2511 schematically shows the user partially bending locator card 7000 to help in partially adhering card 7000 to frame 2000, where the bending of locator card 7000 combined with its stiffness will at least partially push card 7000 in contact with door frame 2000 against this door frame 2000.

FIGS. 101 through 106 are sectional and sequential views taken through lines 101-101 of FIG. 99 of the door 2500, door frame, and locator card 75 schematically illustrating the steps of an installer using the latch bolt 2600 to bias the locator card 7000 against the door frame 2000 so that the card 7000 will attach to the door frame 2000 with the adhesive 7054 on the card 7000. During this sequential process, after initially positioning locator card 7000 on door frame 2000, card 7000 can be firmly attached to door frame 2000 by having latch bolt 2600 push card 7000 against door frame 2000 at multiple different pushing locations. At each of the multiple different pushing locations, latch bolt 2600 can be at least partially retracted into door 2500 (e.g., by turning handle 2504 in the direction of arrow 2644), and then extended from door 2500 towards card 7000 (schematically indicated by arrow 2508) by turning (or allowing to turn) handle 2504 in the direction of arrow 2645. In this manner latch bolt 2600 can be used to adhere (by pushing) locator card 7000 to door frame 2000.

Figure 102:
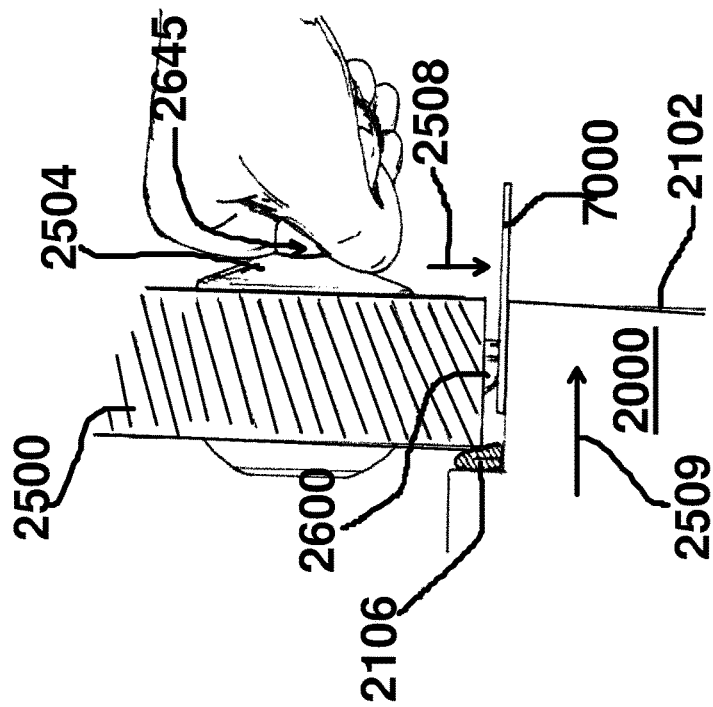
FIGS. 101 through 106 are sectional and sequential views taken through lines 101—101 of FIG. 99 of the door, door frame, and locator card 75 schematically illustrating the steps of an installer using the latch bolt to bias the locator card against the door frame so that the card will attach to the door frame with the adhesive on the card.
Figure 101:
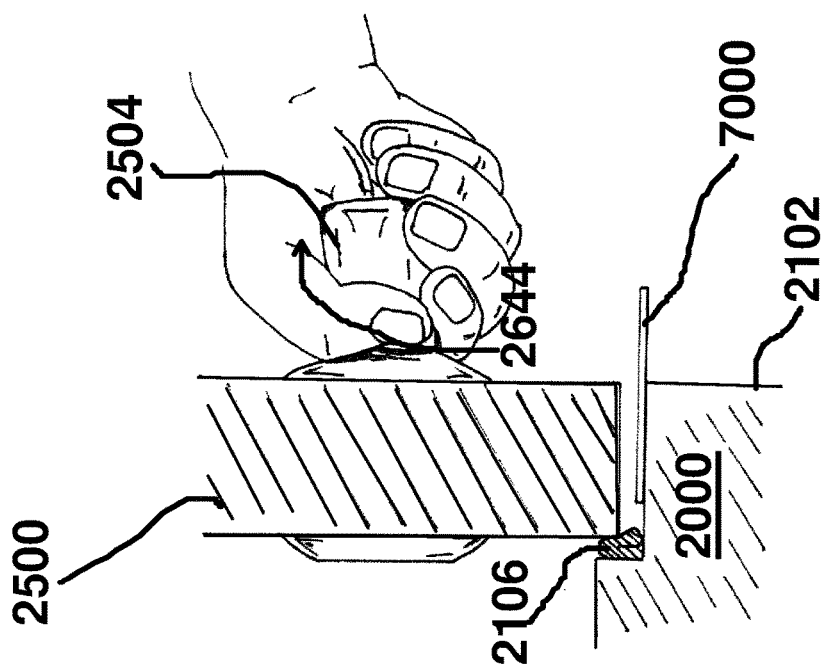

FIGS. 101 and 102, while door 2500 is at a first angular position relative to door frame 2000, schematically illustrate the steps of retracting (turning door handle 2504 in the direction of arrow 2644) and then extending in the direction of arrow 2508 (turning/allowing to turn door handle 2504 in the direction of arrow 2645) latch bolt 2600 to push (and adhesively attach) locator card 7000 onto door frame 2000. Several door handles 2504 are spring biased to turn in the direction of arrow 2645 so that the installer is he so chooses can take advantage of such spring biasing to extend latch bolt 2600 from door 2500. In various embodiments the user can retract and extend latch bolt 2600 multiple times at the first angular position. After this step the installer moves door 2500 to the second angular position relative to door frame 2000 (schematically indicated by arrow 2509 to partially open door 2500), but during this step the installer at least partially retracting latch bolt 2600 so that it no longer is in contact with locator card 7000 to prevent latch bolt 2600 from moving locator card 7000 while door 2500 is being moved.

Figure 104:
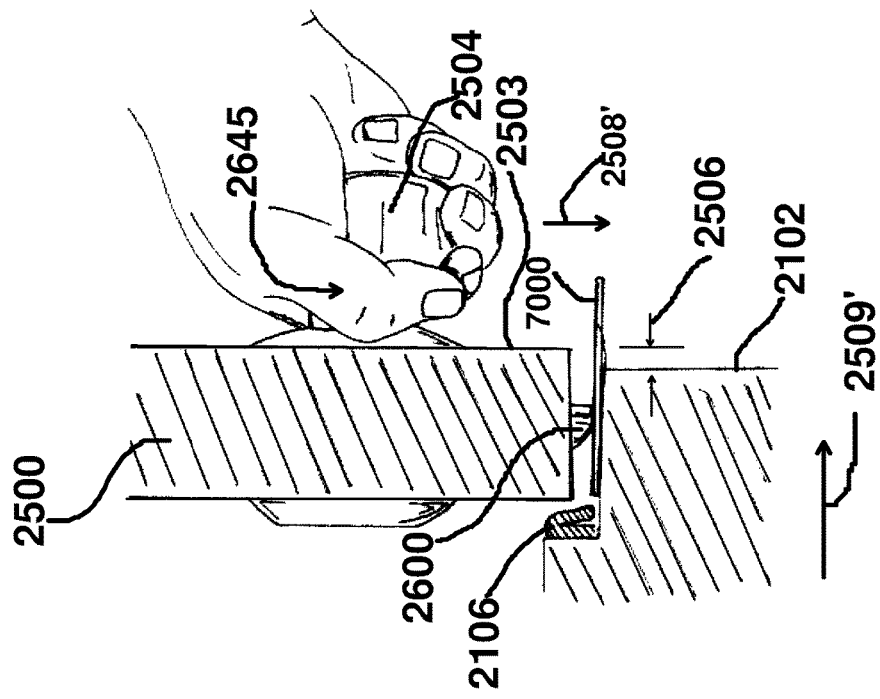
Figure 103:
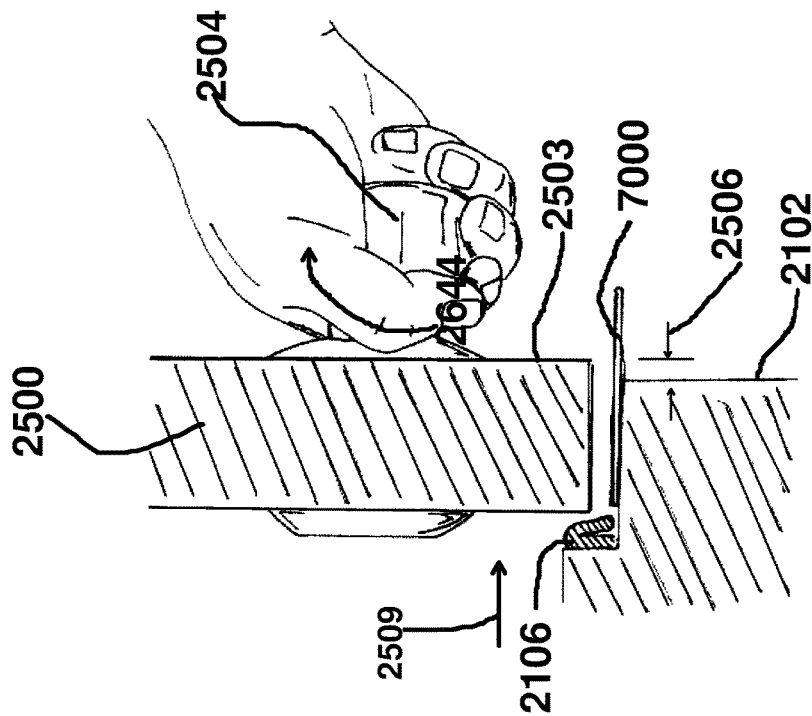

FIGS. 103 and 104 schematically, while door 2500 is at a second angular position relative to door frame 2000 (which second angular position is different from the first angular position shown in FIGS. 101 and 102), show the steps of retracting (turning door handle 2504 in the direction of arrow 2644) and then extending in the direction of arrow 2508 (turning/allowing to turn door handle 2504 in the direction of arrow 2645) latch bolt 2600 to push (and adhesively attach) locator card 7000 onto door frame 2000. Dimension 2506 shows the amount of relative movement of latch bolt 2600 between its position shown in FIGS. 101/102 compared to its position shown in FIGS. 103/104. After this step the installer moves door 2500 to the third angular position relative to door frame 2000 (schematically indicated by arrow 2509' as continuing to partially open door 2500), but during this step the installer again at least partially retracting latch bolt 2600 so that it no longer is in contact with locator card 7000 to prevent latch bolt 2600 from moving locator card 7000 while door 2500 is being moved.

Figure 106:
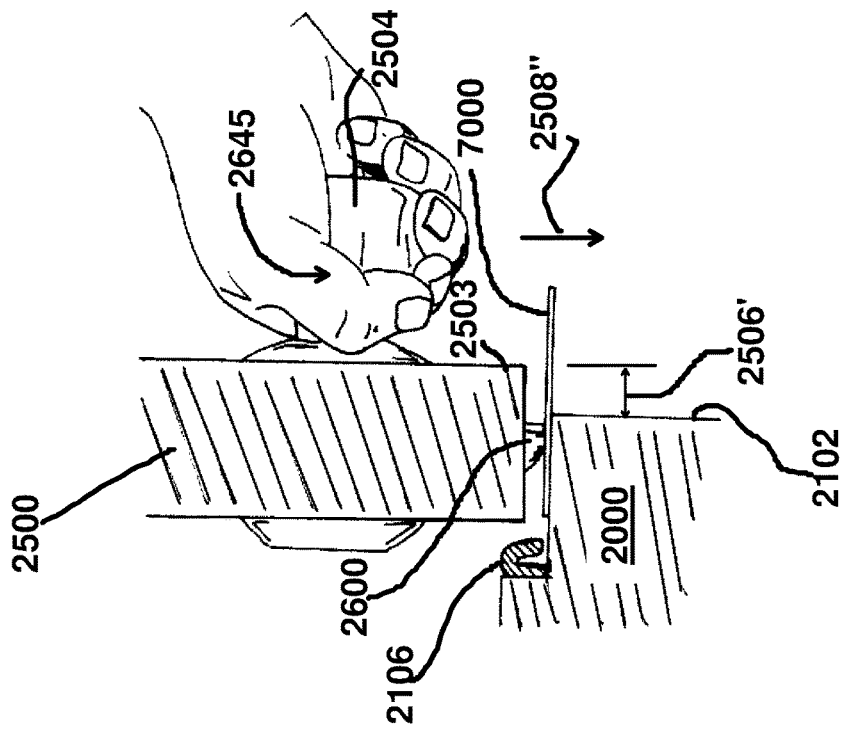
Figure 105:
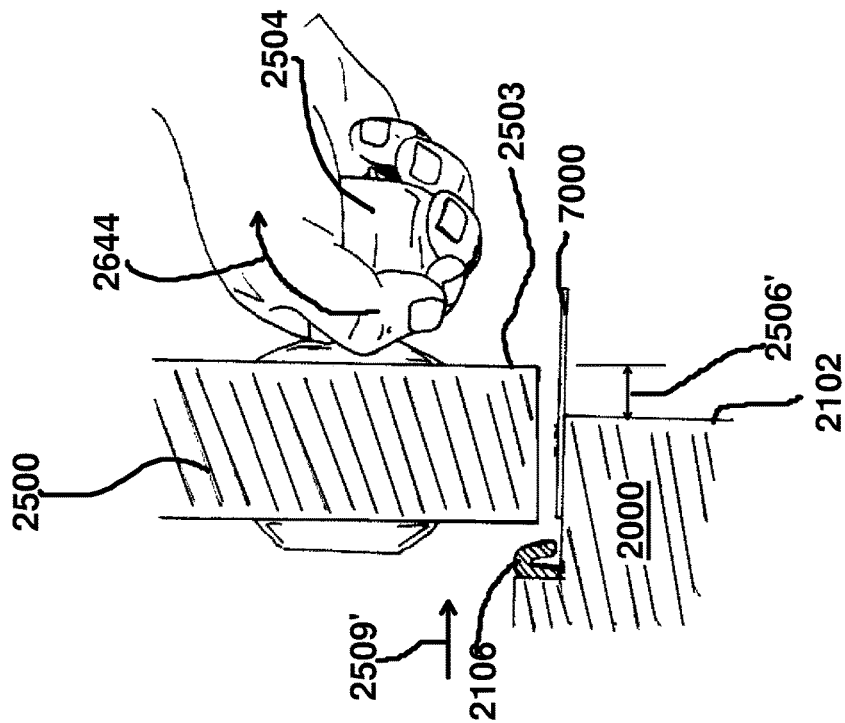

FIGS. 105 and 106 schematically, while door 2500 is at a third angular position relative to door frame 2000 (which third angular position is different from the first and second angular positions shown in FIGS. 101 through 104), show the steps of retracting (turning door handle 2504 in the direction of arrow 2644) and then extending in the direction of arrow 2508 (turning/allowing to turn door handle 2504 in the direction of arrow 2645) latch bolt 2600 to push (and adhesively attach) locator card 7000 onto door frame 2000. Dimension 2506' shows the amount of relative movement of latch bolt 2600 between its position shown in FIGS. 101/102 compared to its position shown in FIGS. 105/106.

In various embodiments the installer can use at least 2, 3, 4, 5, 6, 7, 8, 9, 10 or more different relative angular positions between door 2500 and door frame 2000 when having latch bolt 2600 push against locator card 7000. First, second, and third relative angular positions illustrated in FIGS. 101/102; 103/104; and 105/106 are shown where door 2500 is opened in increasing amounts for the second and third relative angular positions, but the installer can select any different relative angular positions—the goal being to firmly adhere locator card 7000 to door frame 2000. For example, the installer can go from the first to the third and then to the second relative angular positions illustrated in FIGS. 101/102; 103/104; and 105/106.

In various embodiments the installer can continue to hold locator card 7000 in its selected position relative to door frame 2000 while the installer causes latch bolt 2600 to push against locator card 7000 and adhere card 7000 to door frame 2000.

If desired, after performing one or more operations of using latch bolt 2600 to adhere locator card 7000 to door frame 2000 on at least two different latch bolt 2600 pushing locations, the installer can open door 2500 and then push by hand locator card 7000 onto door frame 2000 to more firmly adhere card 7000 to door frame 2000.

In various embodiments the steps illustrated in FIGS. 99 through 106 can also be applied to other locator card embodiments, and can also be used with deadbolts 2600 and hook bolts 2600' where the deadbolts 2600 and hook bolts 2600' are retracted and then extended to push the particular locator card against the door frame 2000 to cause it to adhere to the door frame 2000 at the aligned position.

In various embodiments after the particular locator card is adhered to the door frames at the aligned position, the installer then uses the other steps disclosed in this specification to install the strike plates or deadbolt receiving plates in a correctly positioned and aligned state.

Figure 109:
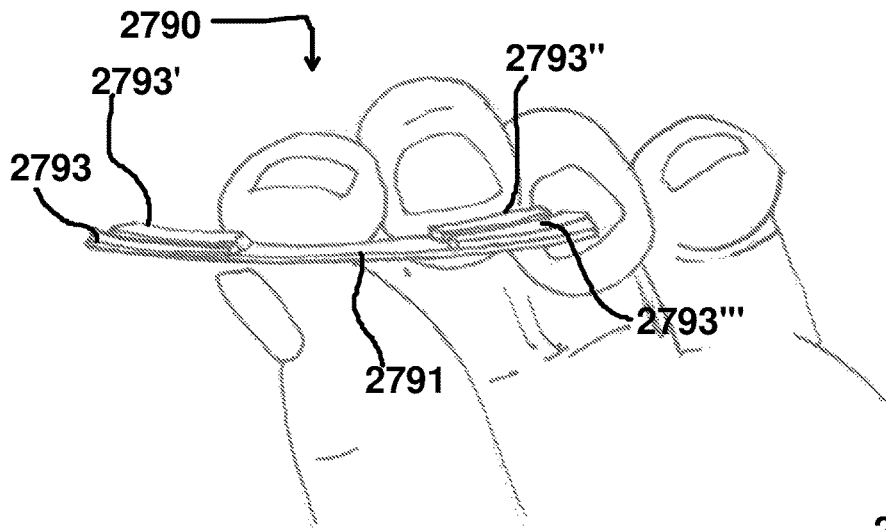
FIGS. 107 through 109 are a perspective views of a translucent or at least partially see thorough gap filler/reducer which can be trimmed by an installer to fill the gap left by existing mortised area with the removal of the non-aligned existing strike plate.
Figure 107:
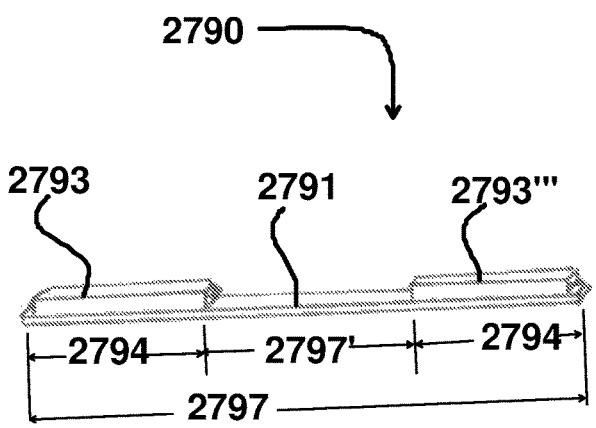
Figure 108:
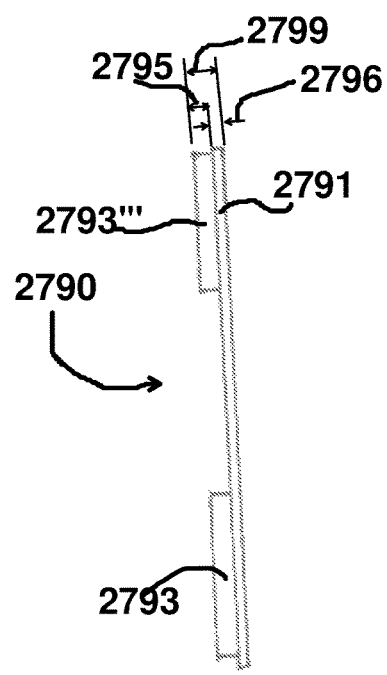
Figure 110:
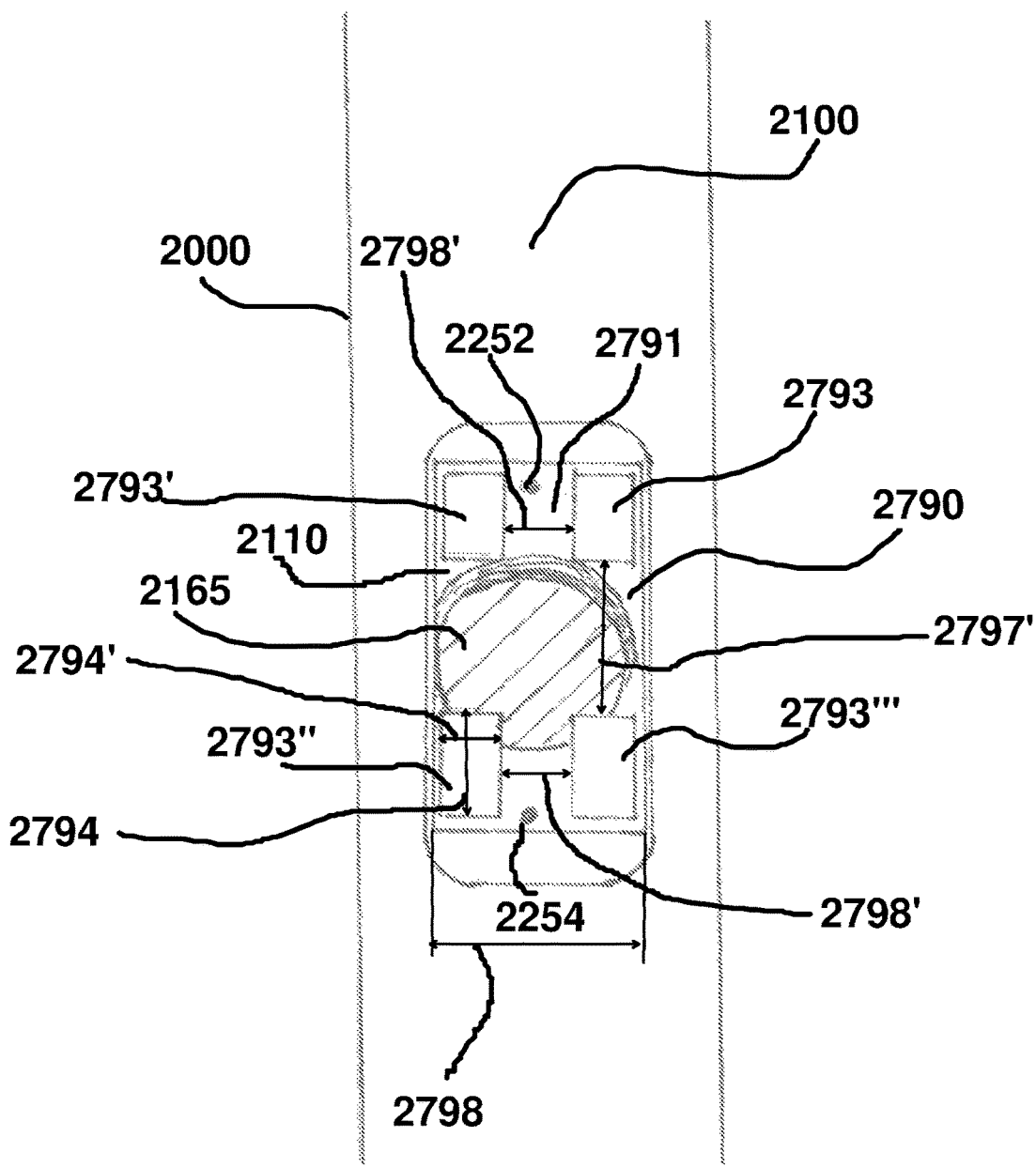
FIG. 110 shows the translucent or at least partially see thorough gap filler/reducer of FIGS. 107-109 now placed in an existing mortised area.

FIGS. 107 through 109 are a perspective views of a translucent or at least partially see thorough gap filler/reducer 2790 which can be trimmed by an installer to fill the gap left by existing mortised area 2110 with the removal of the non-aligned existing strike plate 2104. FIG. 110 shows the translucent or at least partially see thorough gap filler/reducer 2790 now placed in an existing mortised area 2110.

Translucent or at least partially see thorough gap filler/reducer 2790 can comprise translucent or at least partially see thorough base 2791 with a plurality of supporting connectors 2793. Base 2791 can have length 2797 and width 2798, along with a thickness 2796. Plurality of supporting connectors 2793 can have a thickness 2795, and be similarly shaped to each other—e.g., when rectangular having similar base and width dimensions (e.g., 2794 and 2794'), or having other shapes. Preferably, the overall thickness 2799 (made up by thickness 2795 and thickness 2796) of at least partially see thorough gap filler/reducer 2790 will substantially match the depth of existing mortised area 2110 so that the outer surface of gap filler/reducer 2790 is flush with the face 2100 of door frame 2000.

FIG. 110 illustrates how translucent or at least partially see thorough gap filler/reducer 2790, even after being installed in existing mortised area 2110, allows an installer to see the bore 2165 for the strike plate. The installer can see through gap filler/reducer 2790: (a) horizontally between connectors 2793/2793' and connectors 2793"/2793'"(schematically indicated by arrows 2798') and (b) vertically between connectors 2793/2793'" and connectors 2793'/2793" (schematically indicated by arrow 2798). This ability to see through/behind gap filler/reducer 2790 allows for better more accurate positioning of the strike plate 2104 using the various repositioning methods for installing strike plates disclosed in this specification. It is envisioned that translucent or at least partially see thorough gap filler/reducer 2790 can be used with any of the methods of plate repositioning (e.g., strike/latch/deadbolt receiving plates) disclosed herein, where the installer is faced with an existing mortised area 2110 which may cause marking problems using marking embodiments described in this specification, and the installer can avoid any problems by the existing mortised area 2110 by making the surface for marking and/or receiving positioning data substantially flush with the face 2100 of the door frame, and still allowing the installer to see the existing mortised area 2110 which includes the existing bore 2165 in the door frame 2000.

The four small pieces of connectors or gap reducers 2793 placed on each outer corner of the translucent or at least partially see thorough gap filler/reducer 2790 help stabilize the translucent or at least partially see thorough gap filler/reducer 2790 when attaching the translucent or at least partially see thorough gap filler/reducer 2790 to a doorframe 2000 on an unleveled mortised surface area 2110 and/or over and on top of a strike plate 2104 when the mounting screws are not completely screwed in flush with the strike plate 2104 (e.g., because their threads may be stripped).

Figure 111:
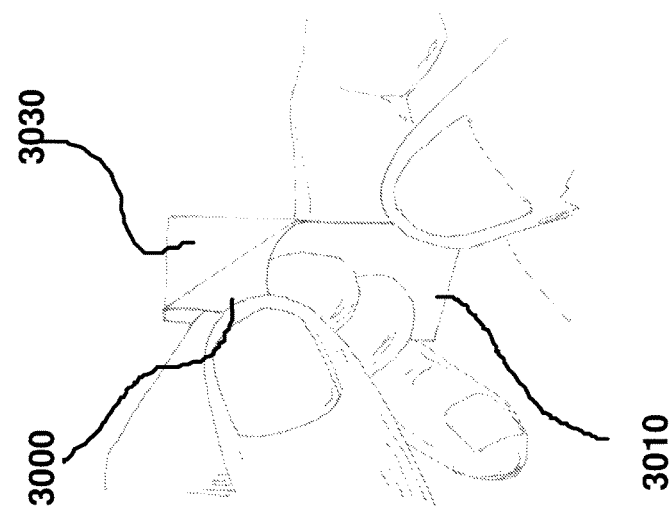
FIGS. 111 and 112 are perspective views showing a installing preparing a cover or marking tape to be placed over at least a substantial portion of the existing mortised area for a strike plate thereby providing a receiving surface in case a substantial portion of the transferable marking member lands interiorly to the receiving bore of the interior perimeter of the recessed area for the strike plate.
Figure 112:
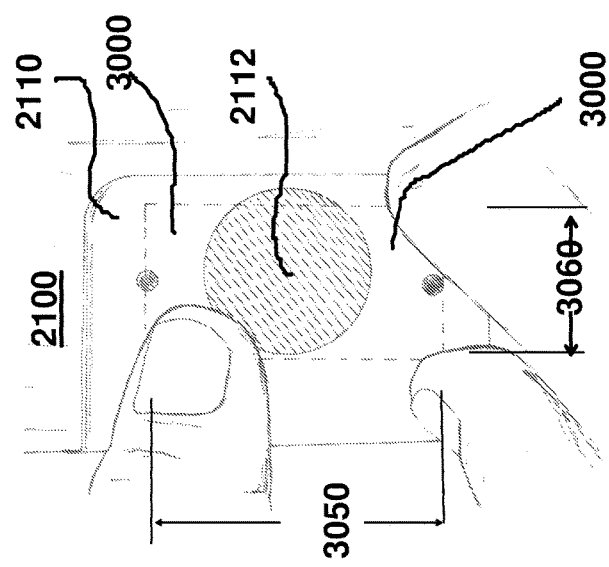

FIGS. 111 and 112 are perspective views showing a installing preparing a cover, spanning, or marking tape 3000 to be placed over at least a substantial portion of the existing mortised area 2110 for strike plate 2200 to provide a receiving surface in case a substantial portion of the transferable marking member 7000 lands interiorly to the receiving bore 2112 of the interior perimeter of the recessed area 2110 for strike plate 2200. In various embodiments the cover, spanning, or marking tape 3000 can be transparent and/or substantially translucent allowing a user to see behind the cover or marking tape 3000 when the cover or marking tape 3000 is placed on the door frame 2000. In various embodiments the cover, spanning, or marking tape 3000 can have adhesive on both faces or sides—one side facilitating attachment to the door frame 2000 and the other side facilitating connection to the transferable positioning member of any of the embodiments disclosed herein. In various the adhesive can take the place of the adhesive on the transferable positioning member of any of the embodiments. In various embodiments the adhesive on the face of the cover, spanning, or marking tape 3000 not attached to the door frame can also facilitate a temporary attachment of a strike plate 2200 when positioning and aligning the strike plate 2200 or deadbolt receiving plate 2204 on the door frame 2000 to make positioning tracings of the exterior and/or interior openings of these plates (e.g., tracings 2170 and/or 2180). In various embodiments the transparency and/or translucency of the cover or marking tape 3000 can be used by an installer in properly positioning the item being installed on the door frame 2000 relative to existing mortised areas by allowing the user to see the portions of the existing mortised areas located behind the cover, spanning, or marking tape 3000 (e.g., receiving bores 2112/2113 and/or screw holes 2114 and/or 2116). In various embodiments the cover or marking tape 3000 is strong enough to resist forces applied by the door strike during an extension of the door strike from the door when the positioning member is transferred by sliding over the door strike (and/or extension and retraction of the door strike to better cause transferable positioning member to stick to the door frame in an aligned condition as described in earlier embodiments).

Figure 113:
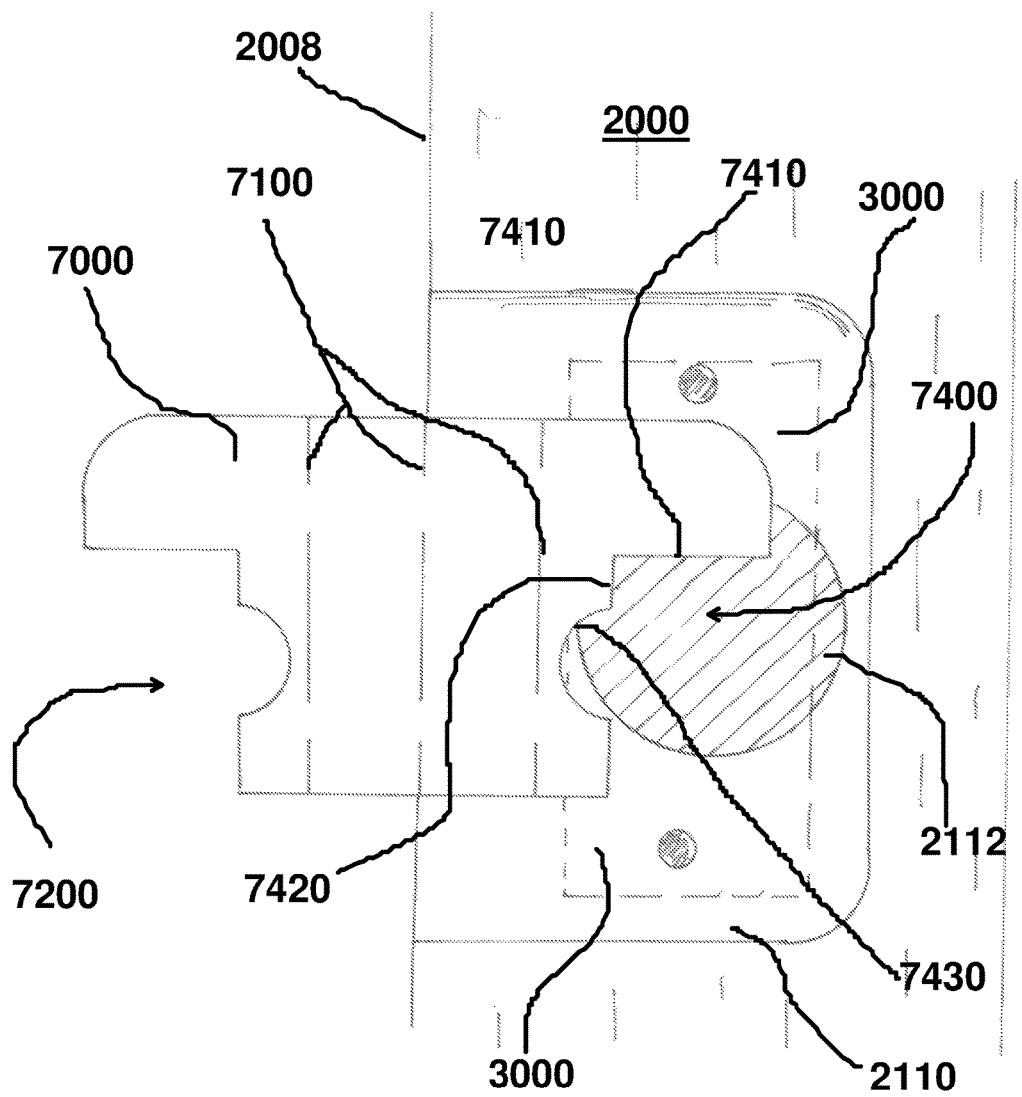
FIG. 113 shows a not properly positioned and aligned already installed existing mortised area for a strike plate on door frame after an "alignment testing" transferable positioning member placed on the door frame.

FIG. 113 shows a not properly positioned and aligned already installed existing mortised area 2110 for a strike plate 2200 on door frame 2000 after an "alignment testing" transferable positioning member 7000 placed on the door frame 2000 and being transferred using substantially the same steps as described above for positioning member 7000. Here portion 7410 of transferable positioning member lands on bore 2112, but translucent cover, spanning, or marking tape 3000 allows portion 7410 to still stick to door frame 2000 and not go into bore 2112—as tape 3000 substantially spans bore 2112.

Figure 114:
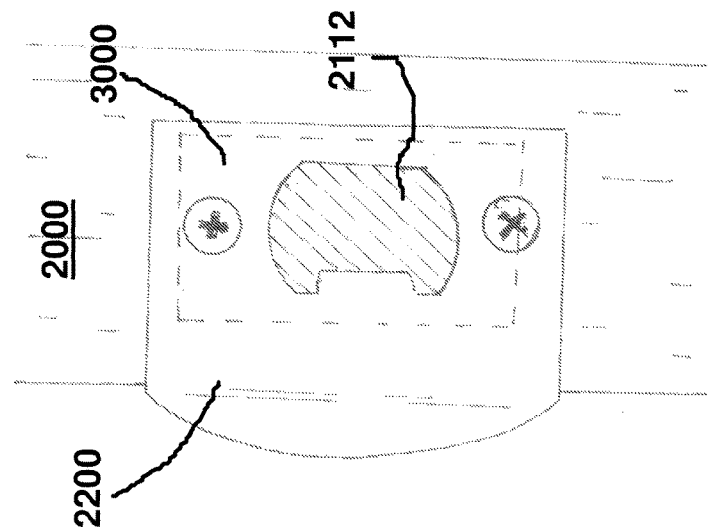
FIG. 114 is a perspective view showing an installer placing the cover tape over at least a substantial portion of the strike plate to provide a receiving surface in case a substantial portion of the transferable positioning member lands interior to the interior perimeter of the strike plate.

FIG. 114 is a perspective view showing an installer placing the cover, spanning, or marking tape 3000 over at least a substantial portion of the strike plate 2200 to provide a receiving surface in case a substantial portion of the transferable positioning member 7000 lands interior to the interior perimeter 2220 of the strike plate 2200.

Figure 115:
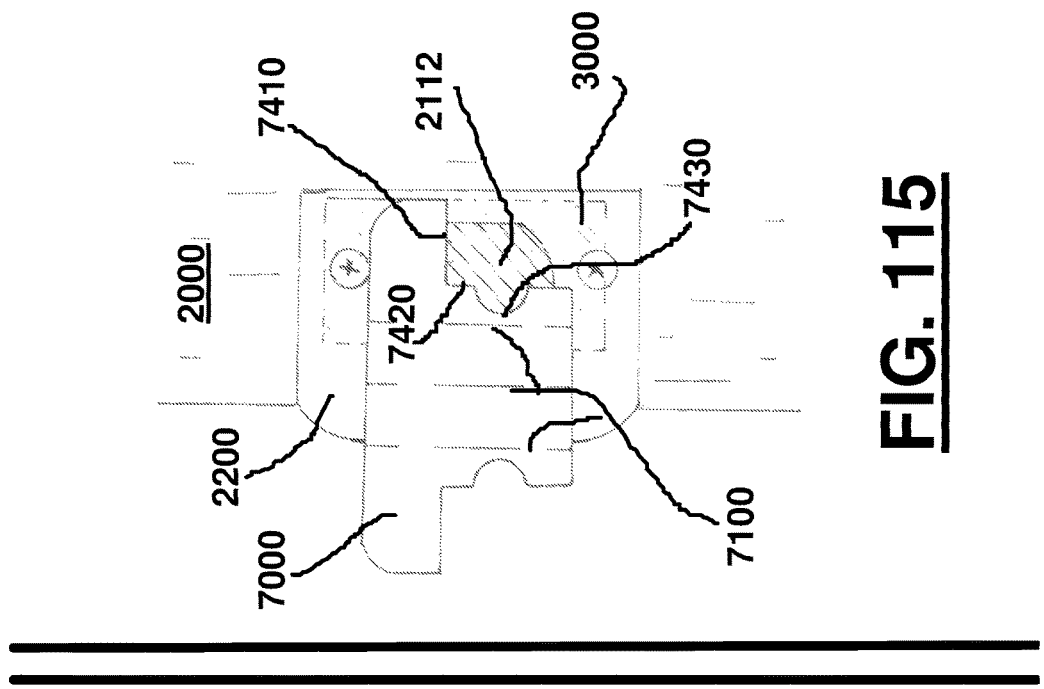
FIG. 115 shows properly positioned and aligned already installed strike plate on door frame after an "alignment testing" transferable positioning member placed on the strike plate and being transferred.

FIG. 115 shows properly positioned and aligned already installed strike plate 2200 on door frame 2000 after an "alignment testing" transferable positioning member 7000 placed on the strike plate 2200 and being transferred using substantially the same steps as described above.

The following is a list of reference numerals suitable for use in the present invention.

REFERENCE NUMERAL LIST

| Reference Number | Description |
|---|---|
| 5 | tool |
| 7 | pen/pencil/stencil |
| 20 | scissors |
| 100 | tool |
| 2000 | door frame |
| 2001 | center line |
| 2002 | front or exterior of door frame |
| 2004 | rear or interior of door frame |
| 2006 | door jam |
| 2008 | vertical line |
| 2010 | header |
| 2020 | opening |
| 2050 | gap |
| 2070 | arrow |
| 2072 | arrows |
| 2074 | plane |
| 2080 | arrow |
| 2084 | arrow |
| 2100 | side |
| 2102 | front of frame |
| 2104 | rear of frame |
| 2106 | weather stripping |
| 2110 | original strike plate recessed area |
| 2111 | depth |
| 2112 | bore in recessed area |
| 2113 | large dimension of bore |
| 2114 | screw hole |
| 2116 | screw hole |
| 2120 | modified strike plate recessed area |
| 2122 | modified bore in recessed area |
| 2124 | repositioned location of screw hole |
| 2126 | repositioned location of screw hole |
| 2130 | bore or opening in door frame or strike plate |
| 2150 | mark |
| 2152 | elongated mark/scratch |
| 2154 | mark |
| 2158 | elongated mark/scratch |
| 2160 | recessed area for strike plate |
| 2165 | strike plate bore |
| 2170 | outline made from strike plate from exterior perimeter |
| 2172 | arrow indicating tracing |
| 2180 | trace line for interior perimeter |
| 2182 | arrow indicating tracing |
| 2190 | trace line for installation opening |
| 2200 | strike plate |
| 2204 | deadbolt receiving plate |
| 2206 | positioning arrow |
| 2208 | positioning arrow |
| 2210 | outer perimeter of strike plate |
| 2220 | inner perimeter of strike plate |
| 2252 | mounting screw hole opening |
| 2256 | mounting screw hole opening |
| 2258 | spacing between mounting screw hole openings |
| 2260 | opening for deadbolt or door latch |
| 2262 | center point or center mark |
| 2268 | vertical center mark |
| 2500 | door |
| 2502 | face of door adjacent door frame face 2100 |
| 2503 | face of door facing exterior of building or home |
| 2504 | door knob |
| 2506 | gap |
| 2507 | arrow |
| 2510 | top |
| 2511 | arrow |
| 2520 | opening |
| 2530 | opening |
| 2570 | longitudinal center line on door |
| 2600 | door locking member |
| 2601 | longitudinal centerline |
| 2602 | height |
| 2605 | arrow |
| 2604 | width |
| 2607 | recessed area |
| 2610 | plate |

-continued

| Reference Number | Description |
|---|---|
| 2620 | first opening |
| 2622 | longitudinal centerline |
| 2624 | first screw |
| 2630 | second opening |
| 2632 | longitudinal centerline |
| 2634 | second screw |
| 2640 | deadbolt knob |
| 2642 | arrow |
| 2644 | arrow |
| 2700 | removable marking material |
| 2704 | gap reducer with adhesive |
| 2710 | thickness of marking material |
| 2720 | small markings |
| 2730 | first section/layer of marking material/gap reducer |
| 2732 | first side |
| 2734 | second side |
| 2736 | thickness |
| 2738 | removable/removed portion |
| 2740 | second section/layer of marking material/gap reducer |
| 2742 | first side |
| 2744 | second side |
| 2746 | thickness |
| 2748 | removable/removed portion |
| 2790 | gap filler or reducer |
| 2791 | translucent or at least partially see through base |
| 2793 | connector or adhesive base |
| 2794 | dimension |
| 2795 | dimension |
| 2796 | dimension |
| 2797 | dimension |
| 2798 | dimension |
| 2799 | dimension |
| 3000 | marking or supporting tape |
| 3010 | first side |
| 3020 | second side |
| 3030 | backing |
| 3050 | length |
| 3060 | width |
| 5000 | strip or plurality of transferable marking members |
| 5050 | backing of strip |
| 6000 | transferable marking member |
| 6004 | body |
| 6010 | first end |
| 6014 | adhesive |
| 6018 | removable backing |
| 6020 | second end |
| 6024 | adhesive |
| 6028 | removable backing |
| 6091 | thickness |
| 6092 | height |
| 6093 | reduction in height |
| 6094 | width |
| 6096 | attachment surface such as adhesive |
| 6104 | arrow |
| 7000 | transferable marking member |
| 7004 | body |
| 7005 | thickness |
| 7006 | top |
| 7007 | bottom |
| 7008 | first side |
| 7009 | second side |
| 7010 | first end |
| 7014 | adhesive |
| 7018 | removable backing |
| 7020 | second end |
| 7024 | adhesive |
| 7028 | removable backing |
| 7030 | dimension |
| 7032 | dimension |
| 7034 | dimension |
| 7050 | backing layer |
| 7054 | adhesive |
| 7092 | height |
| 7094 | width |
| 7100 | plurality of alignment indicia |
| 7200 | first area to fit on latch bolt |
| 7210 | first side |

-continued

| Reference Number | Description |
|---|---|
| 7220 | second side |
| 7230 | notch |
| 7400 | second area to fit on latch bolt |
| 7410 | first side |
| 7420 | second side |
| 7430 | notch |
| 7600 | marking indicia |
| 7610 | first portion |
| 7620 | second portion |
| 8000 | transferable positioning template |
| 8004 | body |
| 8005 | thickness |
| 8006 | top |
| 8007 | bottom |
| 8008 | first end |
| 8009 | second end |
| 8010 | first face |
| 8020 | second face |
| 8030 | dimension |
| 8034 | dimension |
| 8092 | height |
| 8094 | width |
| 8100 | plurality of alignment indicia |
| 8150 | arrow |
| 8160 | arrow |
| 8200 | first area to fit on latch bolt |
| 8210 | width |
| 8220 | depth |
| 8230 | curved section |
| 8230 | notch |
| 8400 | second area to fit on latch bolt |
| 8410 | width |
| 8420 | depth |
| 8430 | curved section |
| 8500 | middle section |
| 9000 | transferable positioning template |
| 9004 | body |
| 9005 | thickness |
| 9006 | top |
| 9007 | bottom |
| 9008 | first end |
| 9009 | second end |
| 9010 | first face |
| 9020 | second face |
| 9030 | dimension |
| 9034 | dimension |
| 9092 | height |
| 9094 | width |
| 9100 | plurality of alignment indicia |
| 9200 | first area to fit on latch bolt |
| 9210 | width |
| 9220 | depth |
| 9230 | curved section |
| 9230 | notch |
| 9400 | second area to fit on latch bolt |
| 9410 | width |
| 9420 | depth |
| 9430 | curved section |
| 9500 | middle section |

The invention claimed is:

1. A method of installing a latch or bolt plate on a door frame having a door attached to the frame with an extendable and retractable deadbolt with a deadbolt cross sectional shape, comprising the steps of:
(a) providing a marking apparatus, the marking apparatus including a marking apparatus shape;
(b) placing the marking apparatus on the latch or deadbolt and aligning the marking apparatus shape with the latch or deadbolt cross sectional shape;
(c) while the marking apparatus is on the latch or deadbolt, closing the door in the door frame;
(d) while the door is closed, causing the latch or deadbolt to extend causing the marking apparatus to be transposed from attachment to the latch or deadbolt to attachment to the door frame;
(e) opening the door and exposing the marking apparatus now attached to the door frame at a location;
(f) using the location of the transposed marking apparatus on the door frame to install a plate on the door frame for receiving the latch or dead bolt.

2. The method of claim 1, further comprising the step of using a positioning template in combination with the marking apparatus to install the plate on the door frame.

3. The method of claim 2, wherein a template is the plate to be installed on the door frame.

4. The method of claim 1, wherein the door frame has an opening, and before step "d" a cover or marking tape is placed on the door frame to at least partially cover the opening, and during step "d" the marking apparatus at least partially attaches to the cover or marking tape and at least partially extends over the opening in the door frame.

5. The method of claim 1, wherein in step "b", the deadbolt has a cross sectional size and shape and the marking apparatus has a perimeter size and shape, and the perimeter shape and size of the marking apparatus generally matches the cross sectional shape and size of the deadbolt.

6. The method of claim 1, wherein in step "a" the marking apparatus has first and second faces with adhesive bonding on the first and second faces, but with the adhesive bonding on the first face being substantially stronger than the adhesive bonding on the second face.

7. The method of claim 6, wherein the adhesive bonding on the first face is at least 25 percent stronger than the adhesive bonding on the second face.

8. The method of claim 1, wherein in step "f" both interior and exterior perimeters of a latch or deadbolt plate are substantially traced on the frame.

9. A method of installing a latch or door plate on a door frame attached to a door, comprising the steps of:
(a) providing a positioning member, the positioning member having a perimeter with a perimeter shape and size;
(b) partially opening the door, the door including a latch or deadbolt having a cross sectional shape and size;
(c) placing the positioning member in contact with the latch or deadbolt;
(d) after step "c", while the door is closed in the door frame, causing the positioning member in contact with the latch or deadbolt to slide relative to the latch or deadbolt and towards the door frame to become attached to the door frame at an attached position and alignment state;
(e) after step "d", causing the latch or deadbolt to at least partially retract so that the positioning member is no longer in contact with the latch or deadbolt;
(f) after step "e", using the attached position and alignment state of the positioning member as a basis for installing the latch or door plate on the frame.

10. The method of claim 9, wherein in step "d" the positioning member remains in continuous contact with the deadbolt.

11. The method of claim 10, wherein in step "d" the positioning member is supported by the latch or deadbolt.

12. The method of claim 10, wherein in step "d" vertical movement of the positioning member is restricted by the latch or deadbolt.

13. The method of claim 12, wherein in step "d" horizontal movement of the positioning member in at least one direction is restricted by the latch or deadbolt.

14. The method of claim 12, wherein in step "d" horizontal movement of the positioning member in two directions is restricted by the latch or deadbolt.

15. The method of claim 10, wherein a template is the plate to be installed on the door frame and the plate having an exterior perimeter and interior receiving opening, wherein the step "e" the plate is used to create an outline of the perimeter of the plate on the door frame.

16. The method of claim 9, wherein in step "d" the positioning member is located below the latch or deadbolt.

17. The method of claim 9, wherein in step "d" the positioning member has a deadbolt receiving area which fits snugly around the latch or deadbolt.

18. The method of claim 9, wherein the positioning member has a vertical locating indicia, and during step "d" the vertical locating indicia is used by a user to align the positioning member with the door frame.

19. The method of claim 18, wherein the vertical locating indicia includes a plurality of vertical parallel lines.

20. The method of claim 9, wherein in step "f" a user traces around at least part of the deadbolt receiving area to mark the door frame.

21. The method of claim 9, wherein in step "f" a user traces around at least 50 percent of the latch or deadbolt receiving area to mark the door frame, using this traced marking on the door frame as a basis for installing the latch or door plate on the frame.

22. The method of claim 9, wherein in step "f" a user traces around all of the latch or deadbolt receiving area to mark the door frame, using this traced marking on the door frame as a basis for installing the latch or door plate on the frame.

23. The method of claim 9, further comprising the step of using a positioning template in combination with the positioning member to install the plate on the door frame.

24. The method of claim 9, wherein the door frame has an opening, and before step "d" a cover or marking tape is placed on the door frame to at least partially cover the opening, and during step "d" the positioning member at least partially attaches to the cover or marking tape and at least partially extends over the opening in the door frame.

25. The method of claim 9, wherein in step "f" both interior and exterior perimeters of a latch or deadbolt plate are substantially traced on the frame.

26. The method of claim 9, wherein in step "f" an exterior perimeter of latch or deadbolt plate is substantially traced on the frame.

27. The method of claim 9, wherein after step "d" the positioning member being supported by the door frame in a first positioned and aligned state places the door in a first locked state and subsequently the positioning member is detached from being supported by the door frame, and steps "c" and "d" are repeated to where the positioning member is then supported by the door frame at a second positioned and aligned state, which is different from the first positioned and aligned state, and the positioning member being supported by the door frame in the second positioned and aligned state places the door in a second locked state wherein the relative positions between the door and the door frame are different when in the first locked state and when in the second locked state.

* * * * *